United States Patent [19]

Asami et al.

[11] Patent Number: 5,604,088

[45] Date of Patent: Feb. 18, 1997

[54] SILVER HALIDE PHOTOGRAPHIC MATERIAL

[75] Inventors: Masahiro Asami; Ken Kawata, both of Minami-ashigara, Japan

[73] Assignee: Fuji Photo Film Co., Ltd., Kanagawa, Japan

[21] Appl. No.: 504,543

[22] Filed: Jul. 20, 1995

Related U.S. Application Data

[63] Continuation of Ser. No. 205,738, Mar. 4, 1994, abandoned.

[30] Foreign Application Priority Data

Mar. 4, 1993 [JP] Japan ................... 5-067352

[51] Int. Cl.⁶ ................................................. G03L 1/20
[52] U.S. Cl. ........................... 430/584; 430/588; 430/607; 430/611; 430/613
[58] Field of Search ....................... 430/584, 588, 430/611, 613, 607, 567

[56] References Cited

U.S. PATENT DOCUMENTS

| | | | |
|---|---|---|---|
| 4,584,266 | 4/1986 | Hirose et al. . | |
| 4,997,752 | 3/1991 | Sasaki et al. . | |
| 5,077,179 | 12/1991 | Abe et al. . | |
| 5,187,053 | 2/1993 | Hayashi | 430/584 |
| 5,223,389 | 6/1993 | Matsunaga et al. | 430/584 |
| 5,290,675 | 3/1994 | Hioki et al. | 430/584 |
| 5,429,920 | 7/1995 | Hioki et al. | 430/584 |

FOREIGN PATENT DOCUMENTS

| | | |
|---|---|---|
| 0289273 | 11/1988 | European Pat. Off. . |
| 0313022 | 4/1989 | European Pat. Off. . |
| 0330093 | 8/1989 | European Pat. Off. . |
| 0367227 | 5/1990 | European Pat. Off. . |
| 0474047 | 3/1992 | European Pat. Off. . |
| 4-67033 | 3/1992 | Japan . |

*Primary Examiner*—Thorl Chea
*Attorney, Agent, or Firm*—Birch, Stewart, Kolasch & Birch, LLP

[57] ABSTRACT

A silver halide color photographic material comprising a support having thereon at least one light-sensitive silver halide emulsion layer, wherein the silver halide emulsion layer contains a silver halide emulsion sensitized by a methine dye represented by following formula (I) and the total content of calcium in the photographic constituting layers on the support is not more than 10 mg/m²;

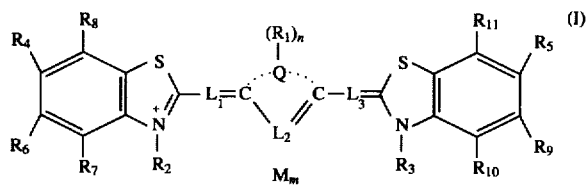

wherein Q represents a non-metallic atomic group necessary for forming a 5-membered or 6-membered ring; $R_1$ to $R_{11}$ each represents a hydrogen atom or a substituent, however, at least one of $R_1$ to $R_3$ represents a group containing an aromatic group and $R_4$ and $R_5$ are not a hydrogen atom; $L_1$ to $L_3$ each represents a methine group; n represents an integer of from 0 to 6; M represents a counter ion neutralizing an electrostatic charge; and m represents 0 or 1;

The material provides an excellent stability showing less deviation of the performance at the production thereof and provides an excellent processing stability and less depositions in processing liquids and thus forms less streaks even in continuous processing.

16 Claims, No Drawings

SILVER HALIDE PHOTOGRAPHIC MATERIAL

This application is a continuation, of application Ser. No. 08/205,738 filed on Mar. 4, 1994, now abandoned.

FIELD OF THE INVENTION

The present invention relates to a silver halide photographic material, and more particularly to a silver halide photographic material having excellent stability with less deviation of performance at the production thereof. Also, the invention relates to a silver halide photographic material having excellent processing stability with less streak formation and less depositions in processing liquids in continuous processing in a market.

BACKGROUND OF THE INVENTION

Color photographs which have been widely popularized at present have progressed to the extent that they can be obtained more quickly and easily in any place by the progress of the light-sensitive materials themselves and the photographic processing techniques. In particular, in the field of color prints, the production of color prints has been practiced according to various purposes by the development of a concentrated processing system called color laboratory having a production place where high-speed printers, large-scale photographic processors, etc., for mass production are disposed, and a dispersed processing system using small-sized printer processors each called "mini-labo." or a miniature laboratory disposed in store. Recently, by the practical use of a photographic light-sensitive material using a high silver chloride emulsion and the processing process disclosed in PCT WO 88/04534, photographic processing has been quickened more and more.

Simulatneously with such an investigation of quickening photographic processing, the improvement of the stability of the image quality of prints obtained has always been required for increasing the production efficiency of color prints.

For this purpose, the stabilized performance of color photographic papers being used for producing color prints is important.

Considering the actual circumstances of the markets of color prints as described above, the requirement for the performance stability of color photographic papers has been more increased. That is, in the large laboratory making a mass production of color prints, if the performance of each color photographic paper is stabilized, color prints can be produced by establishing the printing condition of a high-speed printer at a constant, whereby the efficiency is greatly increased. Also, in the production of color prints using a "mini-labo." disposed in a store, etc., it is frequently difficult to obtain a skilled operator and hence the stabilized performance of color photographic papers directly relates to the improvement of the quality and the yield of the color prints.

Accordingly, the performance stabilization of photographic light-sensitive materials at the production thereof was a very important theme for providing the photographic light-sensitive materials capable of producing color prints of a high quality at a high efficiency.

In the photographic light-sensitive material for color photographs, a blue-sensitive emulsion layer, a green-sensitive emulsion layer, and a red-sensitive emulsion layer are formed for the purpose of carrying out a color reproduction of a subtractive color process, and the construction that each emulsion layer contains a compound capable of coloring into a dye corresponding to the complementary color of the light sensitive to the emulsion layer is used.

The silver halide emulsion which is a light-sensitive element is spectrally sensitized for imparting sensitivity to the light of a desired wavelength region to the silver halide emulsion. In general, the spectral sensitization is carried out by adsorbing a so-called spectral sensitizing dye, i.e., the dye having an absorption in the desired wavelength region, to the silver halide grains.

The stability of the performance of a photographic light-sensitive material is greatly influenced by the stability of the spectral sensitization. That is, if the spectral sensitization is unstable, the performance change caused by the change of the adsorbed state of spectral sensitizing dyes occurs by the deviation of the conditions at the production of the photographic light-sensitive materials and by storing the products for a long period of time. In particular, such a problem severely occurs in the case of using a silver halide emulsion having a high silver chloride content, which is advantageously used for quickening the processing time and for reducing the replenishing amounts, and hence the development of the technique for solving the problem has been desired. Also, for preventing the occurrence of putrefaction, etc., in the production steps of photographic light-sensitive materials, the use of various antiseptics is disclosed in JP-A-61-233743 (the term "JP-A" as used herein means an "unexamined published Japanese patent application") but it has been found that when the antiseptics are used, the foregoing unstability is further increased and the technique for solving the problem has been desired.

On the other hand, from the requirement of lowering waste liquids in photographic processing, the attempt of reducing the replenishing amounts of the processing liquids has been continued and a so-called low replenishing type processing system has been increased. However, in such a low-replenishing processing, there is a problem that when continuous processing of photographic light-sensitive materials is carried out for a long period of time, depositions frequently form in processing liquids and by attaching the depositions onto rollers, etc., a stripe-like defect called streaks is formed on the prints obtained.

JP-A-1-303438 describes that for preventing the occurrence of such depositions, the reduction of the content of calcium in the photographic light-sensitive materials is effective. Therefore, it has been attempted to produce light-sensitive materials using materials having a low content of calcium. However, when the content of calcium in light-sensitive materials is reduced, the photographic performance of the light-sensitive materials during production as described above is more liable to deviate, and hence the development of of a technique capable of obtaining both the processing stability and the production stability has been strongly pursued.

SUMMARY OF THE INVENTION

As is clear from the above descriptions, the object of the present invention is to provide a silver halide photographic material having an excellent stability showing less deviation of the performance at the production thereof.

A further object of the present invention is to provide a silver halide photographic material having an excellent processing stability and giving less depositions in processing liquids and thus forming less streaks even in continuous processing in a market.

It has now been discovered that the above object can be achieved by the present invention described hereinbelow.

That is, according to the 1st embodiment of the present invention, there is provided a silver halide photographic material comprising a support having thereon at least one light-sensitive silver halide emulsion layer, wherein the silver halide emulsion layer contains a silver halide emulsion sensitized by a methine dye represented by following formula (I) and the total calcium content in the photographic constituting layers formed on the support is not more than 10 mg/m².

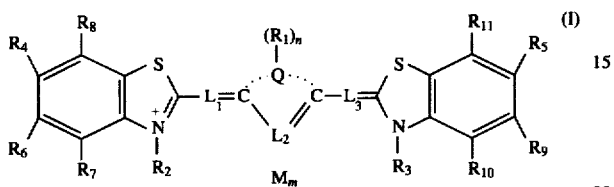

(I)

wherein, Q represents a non-metallic atomic group necessary for forming a 5-membered or 6-membered ring; $R_1$ to $R_{11}$ each represents a hydrogen atom or a substituent, however, at least one of $R_1$ to $R_3$ represents a group containing an aromatic group and $R_4$ and $R_5$ are not a hydrogen atom; $L_1$ to $L_3$ each represents a methine group; n represents an integer of from 0 to 6; M represents a counter ion neutralizing an electrostatic charge; and m represents 0 or 1.

According to the 2nd embodiment of the present invention, there is provided a silver halide photographic material comprises a support having thereon at least one silver halide emulsion layer, wherein the silver halide emulsion layer contains a silver halide emulsion sensitized by the methine dye represented by the formula (I) described above and one of the photographic layers formed on the support contains at least one of compounds represented by following formulae (II) to (X);

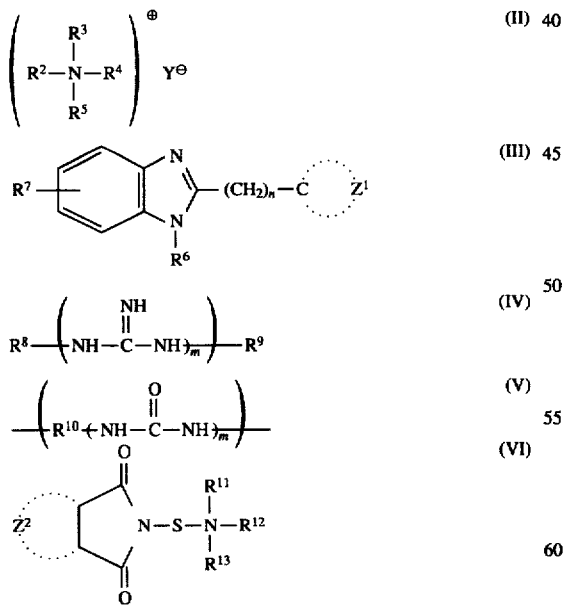

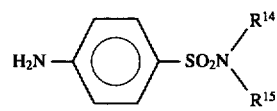

(VII)

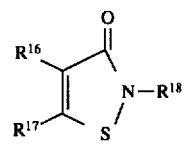

(VIII)

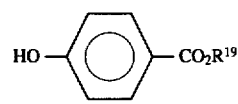

(IX)

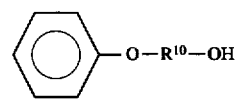

(X)

wherein $R^2$, $R^3$, $R^4$, $R^5$, $R^6$, $R^8$, and $R^9$ each represents a hydrogen atom, an alkyl group, or an aryl group; $R^7$ represents a hydrogen atom, an alkyl group, an aryl group, a nitro group, a carboxy group, a sulfo group, a sulfamoyl group, a hydroxy group, a halogen group, an alkoxy group, or a thiazolyl group; $R^{10}$ represents an alkylene group or an arylene group; $R^{11}$, $R^{12}$, and $R^{13}$ each represents a halogen atom or an alkyl group; $R^{14}$ and $R^{15}$ each represents a hydrogen, an alkyl group, an aryl group, or a nitrogen-containing heterocyclic residue; $R^{16}$ and $R^{17}$ each represents a hydrogen atom, a halogen atom, an alkyl group, an aryl group, or an aralkyl group, said $R^{16}$ and $R^{17}$ may combine to each other to form a benzene ring; $R^{18}$ represents a hydrogen atom or an alkyl group; $R^{19}$ represents an alkyl group or an aryl group; Y represents a halogen atom; $Z^1$ represents a non-metallic atomic group necessary for forming a thiazolyl ring; $Z^2$ represents a non-metallic atomic group necessary for forming a 6-membered ring; n represents 0 or 1; and m represents 1 or 2.

According to the 3rd embodiment of the present invention, there is provided the silver halide photographic material of the 2nd embodiment described above, wherein the total calcium content in the photographic constituting layers formed on the support is not more than 10 mg/m².

According to the 4th embodiment of the present invention, there is provided a silver halide photographic material comprises a support having thereon at least one light-sensitive silver halide emulsion layer, wherein the silver halide emulsion layer contains at least one of compounds represented by one of following formula (XI) or (XII);

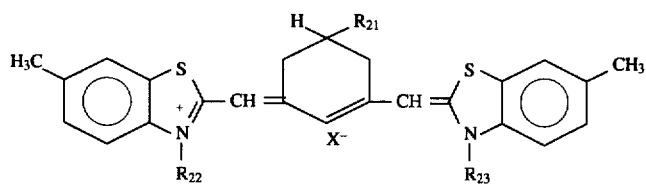

(XI)

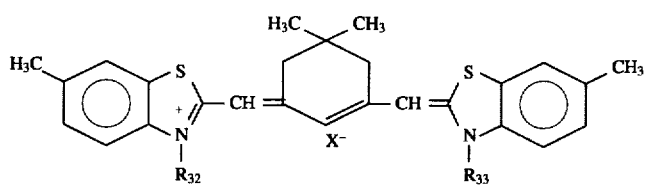

(XII)

wherein $R_{21}$ represents a phenyl group or a 1-naphthyl group, $R_{22}$ and $R_{23}$ each represents a methyl group or an ethyl group, $X^-$ represents $I^-$, $Br^-$ or an arylsulfonate ion, $R_{32}$ represents a 2-phenoxyethyl group, a 2-(1-naphthoxy-)ethyl group, a 2-(2-naphthoxy)ethyl group or a 2-(4-phenylphenoxy)ethyl group and $R_{33}$ represents a methyl group or an ethyl group.

DETAILED DESCRIPTION OF THE INVENTION

Then, the present invention is described in detail.

First, the spectral sensitizing methine dye shown by the formula (I) described above is explained.

In the formula (I), Q represents a non-metallic group necessary for forming a 5-membered or 6-membered carbon ring or heterocyclic ring, such as

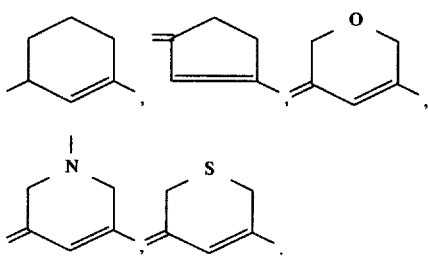

Q is preferably a propylene group substituted by $(R_1)_n$ described later.

In the formula (I), $R_1$ represents a hydrogen atom or a substituent such as an alkyl group having not more than 18 carbon atoms {e.g., methyl, ethyl, propyl, isopropyl, allyl, butyl, isobutyl, hexyl, octyl, dodecyl, and octadecyl each group may be further substituted [examples of the substituent are a carboxy group, a sulfonic acid group, a cyano group, a nitro group, a halogen atom, a hydroxy group, an alkoxy group having not more than 8 carbon atoms (e.g., methoxy, ethoxy, benzyloxy, and phenthyloxy), an aryloxy group having not more than 15 carbon atoms (e.g., phenoxy and 1-naphthyloxy), an acyloxy group having not more than 8 carbon atoms (e.g., acetyloxy), an acyl group having not more than 8 carbon atoms, a sulfamoyl group, a carbamoyl group, and an aryl group having not more than 15 carbon atoms (e.g., phenyl, 4-methylphenyl, 4-chlorophenyl, and 1-naphthyl)}, an aryl group having not more than 18 carbon atoms {e.g., phenyl, 2-naphthyl, and 1-naphthyl each group may be further substituted [examples of the substituent are a carboxy group, a sulfonic acid group, a cyano group, a nitro group, a halogen atom, a hydroxy group, an alkyl group having not more than 8 carbon atoms (e.g., methyl and ethyl), an alkoxy group having not more than 8 carbon atoms (e.g., methoxy and ethoxy), an aryloxy group having not more than 15 carbon atoms (e.g., phenoxy), an acyloxy group having not more than 8 carbon atoms (e.g., acetyloxy), an acyl group having not more than 8 carbon atoms, a sulfamoyl group, a carbamoyl group, and an aryl group having not more than 15 carbon atoms (e.g., phenyl)]}, a heterocyclic group having not more than 18 carbon atoms {e.g., 2-pyridyl, 2-thiazolyl, and 2-furyl each group may be further substituted}, an alkenyl group having not more than 10 carbon atoms {e.g., vinyl which may be further substituted [examples of the substituent are methyl and phenyl]}, or an alkynyl group having not more than 6 carbon atoms {e.g., ethynyl which may be further substituted [examples of the substituent are methyl and phenyl]}.

$R_1$ is preferably an unsubstituted alkyl group (e.g., methyl, ethyl, propyl, and butyl) or an unsubstituted aryl group (e.g., phenyl and 1-naphthyl) and is particularly preferably methyl, ethyl, phenyl or naphthyl.

In the formula (I), n represents an integer of from 0 to 6, when $R_1$ is methyl, n is preferably 2, and when $R_1$ is an aromatic group such as phenyl, naphthyl, etc., n is preferably 1.

$R_2$ and $R_3$ each independently represents an alkyl having not more than 18 carbon atoms {e.g., methyl, ethyl, propyl, isopropyl, allyl, butyl, isobutyl, hexyl, octyl, dodecyl, and octadecyl, each group may be further substituted substituents, there are those described as the substituents of the alkyl group shown by $R_1$]}.

Spcific examples of the unsubstituted alkyl group shown by $R_2$ or $R_3$ are methyl and ethyl and specific examples of the substituted alkyl group are phenoxyethyl, 1-naphthoxyethyl, 2-naphthoxyethyl, 4-phenylphenoxyethyl, and methoxyethyl.

In the present invention, it is necessary that at least one of $R_1$ to $R_3$ contains an aromatic group. Examples of the preferred aromatic group are carbon ring groups and heterocyclic groups such as phenyl, naphthyl, pyridyl, thienyl, pyrrolyl, biphenyl, phenoxyphenyl, etc. These groups may be further substituted. The groups shown by $R_4$ and $R_5$ are not a hydrogen atom, and each preferably represents a hydroxy group, a cyano group, a halogen atom, a sulfonic acid group, a carboxy group, a nitro group, an alkyl group which may be substituted, an alkenyl group which may be substituted, an acyl group which may be substituted, an acyloxy group which may be substituted, an alkoxycarbonyl group which may be substituted, a carbamoyl group which may be substituted, a sulfamoyl group which may be substituted, an acylamino group which may be substituted, an alkoxy group which may be substituted, an aryloxy group which may be substituted, an alkylthio group which may be substituted, an arylthio group which may be substituted, an alkylsufonamido group which may be substituted, an arylsulfonamido group which may be substituted, a ureido group which may be substituted, an alkylsulfonyl group which may be substituted, an arylsulfonyl group which may be substituted, an aryl group which may be substituted, or a heterocyclic group which may be substituted.

$R_4$ and $R_5$ are more preferabley a hydroxy group, a cyano group, an alkyl group having not more than 18 carbon atoms (e.g., methyl, ethyl, propyl, and 2-methoxyethyl), an alkenyl group having not more than 18 carbon atoms (e.g., vinyl and styryl), a halogen atom (e.g., chlorine and bromine), an acyl group having not more than 8 carbon atoms (e.g., acetyl), an acyloxy group having not more than 8 carbon atoms (e.g., acetyloxy), an alkoxycarbonyl group having not more than 8 carbon atoms (e.g., methoxycarbonyl), a carbamoyl group having not more than 8 carbon atoms (e.g.,N-methylcarbamoyl), a sulfamoyl group having not more than 8 carbon atoms, a carboxy group, an alkylsulfonamido group having not more than 8 carbon atoms (e.g., methanesulfonamido), an acylamino group having not more than 8 carbon atoms (e.g., acetylamino), an alkoxy group having not more than 15 carbon atoms (e.g., methoxy, ethoxy, benzyloxy, and phenethyloxy), an aryloxy group having not more than 15 carbon atoms (e.g., phenoxy), an alkylthio group having not more than 8 carbon atoms (e.g., methylthio and ethylthio), an arylthio group having not more than 15 carbon atoms (e.g., phenylthio), an arylsulfonamido group having not more than 12 carbon atoms (e.g., benzenesulfonamido), a ureido group, an alkylsulfonyl group having not more than 8 carbon atoms (e.g., methanesulfonyl and ethylsulfonyl), an arylsulfonyl group having not more than 15 carbon atoms (e.g., benzenesulfonyl and p-toluenesulfonyl), an aryl group having not more than 15 carbon atoms (e.g., phenyl, 4-methylphenyl, 4-chlorophenyl, and 2-naphthyl), a nitro group, a sulfonic acid group, or a heterocyclic group having not more than 15 carbon atoms (e.g., morpholino and 2-pyridyl). These groups may be further substituted.

$R_4$ and $R_5$ are preferably methyl, ethyl, methoxy, or ethoxy and particularly preferably methyl.

$R_6$ to $R_6$ each also represents a hydrogen atom in addition to the foregoing groups shown by $R_4$ and $R_5$.

Said $R_{11}$ and $R_6$ or $R_8$, or said $R_5$ and $R_9$ or $R_{11}$ may combine to each other to form a cyclohexane ring, an aromatic ring or a heterocyclic ring.

$R_6$ to $R_{11}$ each is preferably a hydrogen atom, methyl, ethyl, methoxy, or ethoxy and particularly preferably a hydrogen atom.

In the formula (I), $L_1$, $L_2$, and $L_3$ each represents a methine group which may be substituted [examples of the substituent are an alkyl group (e.g., methyl, ethyl, and 2-carboxyethyl), an aryl group (e.g., phenyl), a halogen atom (e.g., chlorine), an alkoxy group (e.g., methoxy and ethoxy), and an amino group (e.g., N,N-diphenylamino, N-methyl-N-phenylamino, and N-methylpiperadino)]. Also, for example, $L_1$ and $L_2$, $L_2$ and $L_3$, $L_1$ and Q, or $L_3$ and Q may combine with other methine group or an atomic group to form a ring, and $L_1$ and $R_2$, or $L_3$ and $R_3$ each may form a ring.

$L_1$, $L_2$, and $L_3$ are preferably an unsubstituted methine group.

In the formula (I), Mm are included in the formula for showing the existence or absence of a cation or an anion when the existence of such an ion is necessary for neutralizing the ion charge of the dye. Whether a dye is a cation or an anion or a dye has a true ion charge or not depends on the auxochrome and the substituent.

A typical cation is an ammonium ion and an alkali metal ion and on the other hand, an anion may be an inorganic anion or an organic anion such as, for example, a halide anion (e.g., a fluoride ion, a chloride ion, a bromide ion, and an iodide ion), a substituted arylsulfonate ion (e.g., a p-toluenesulfonate ion and a p-chlorobenzenesulfonate ion), an aryldisulfonate ion (e.g., a 1,3-benzenesulfonate ion, a 1,5-naphthalenedisulfonate ion, and a 2,6-naphthalenedisulfonate ion), an alkylsulfate ion (e.g., a methylsulfate ion), a sulfate ion, a thiocyanate ion, a perchlorate ion, a tetrafluoroborate ion, a picrate ion, an acetate ion, and a trifluoromethanesulfonate ion.

M may be 2 or more kinds of charge neutralizing ions.

Also, when a carboxy group or a sulfonic acid group is substituted to a part of the groups shown by $R_1$ to $R_{11}$, the substutuent itself acts as a function of the anion M and hence in this case, m may be 0.

Examples of the preferred anion are a perchlorate ion, an iodide ion, a bromide ion, and a substituted arylsulfonate ion (e.g., a p-toluenesulfonate ion).

Of the compounds represented by formula (XI) abd (XII), the compound represented by formula (XI) is preferred.

In the compound of formula (XI), when $R_{21}$ represents a phenyl group, at least one of $R_{22}$ and $R_{23}$ is preferably a methyl group, and when $R_{21}$ represents a 1-naphthyl group, $R_{22}$ and $R_{23}$ each preferably represents a methyl group or an ethyl group. Most preferred compound represented by formula (XI) is one in which $R_{21}$ represents a phenyl group or a 1-naphthyl group, and both $R_{22}$ and $R_{23}$ represents a methyl group.

X⁻ preferably represents I⁻ or an arylsulfonate ion, and most preferably a substituted or unsubstituted benzenesufonate ion, such as p-toluenesufonate ion.

Then, specific examples of the compound shown by the formula (I), (XI) and (XII) being used in the present invention are shown below but the invention is not limited thereto.

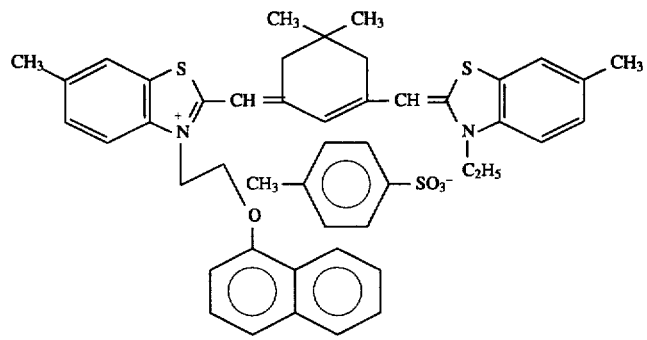

A-1

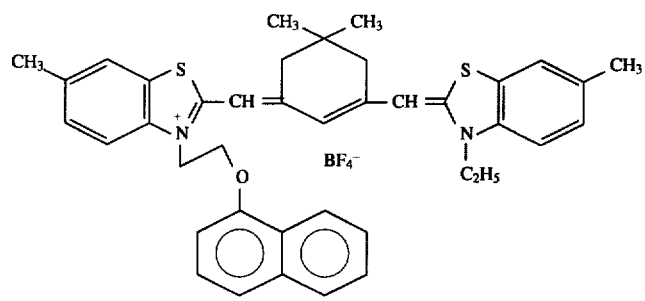
A-2
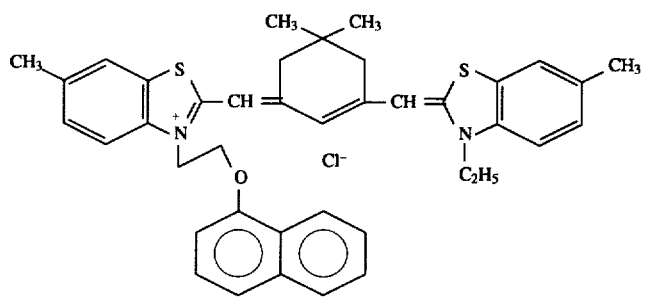
A-3
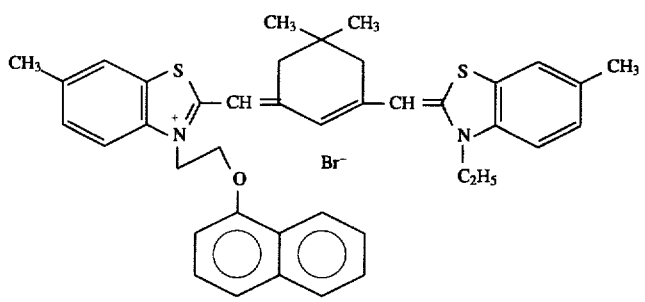
A-4
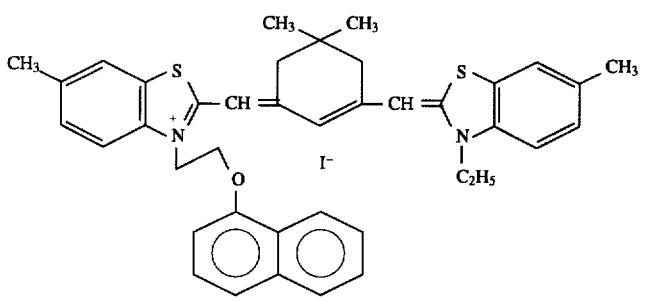
A-5
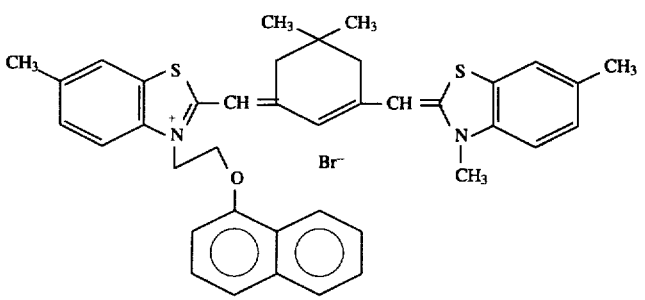
A-6

-continued
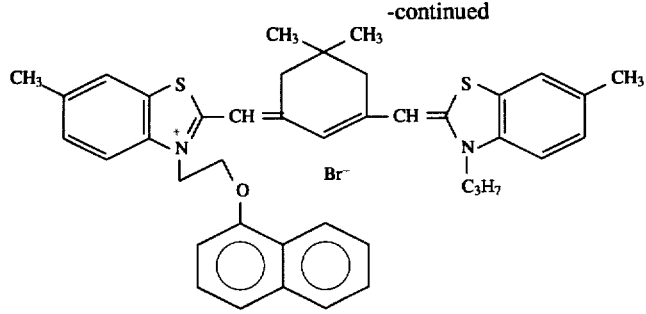
A-7
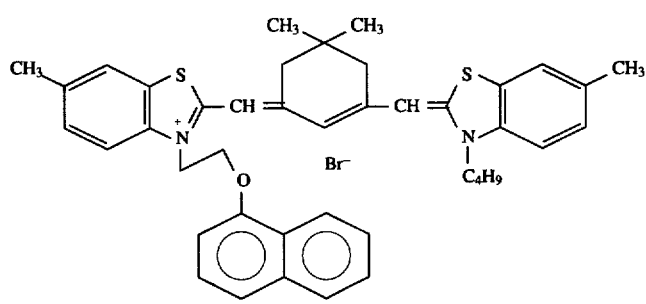
A-8
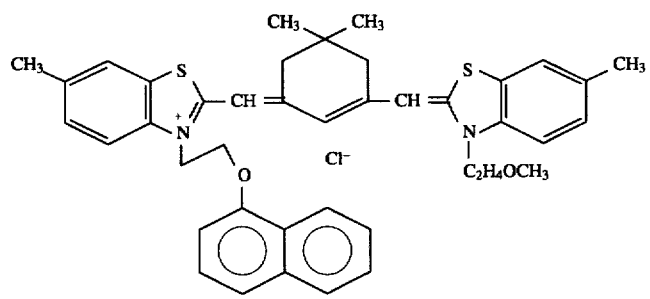
A-9
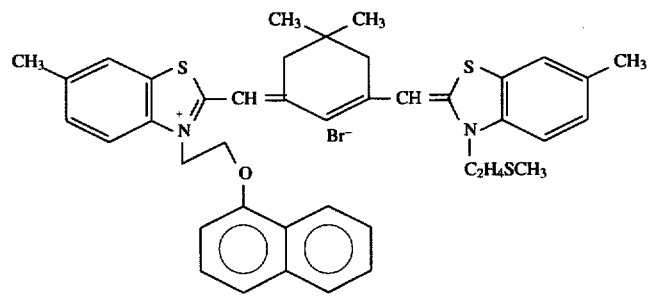
A-10
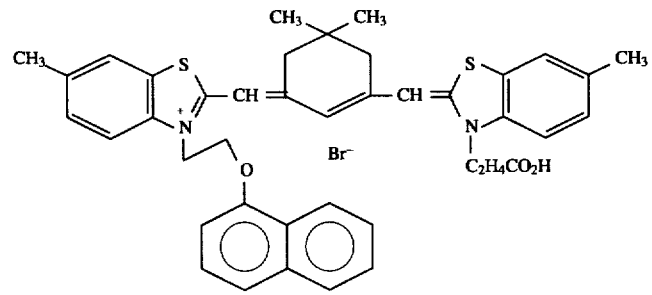
A-11

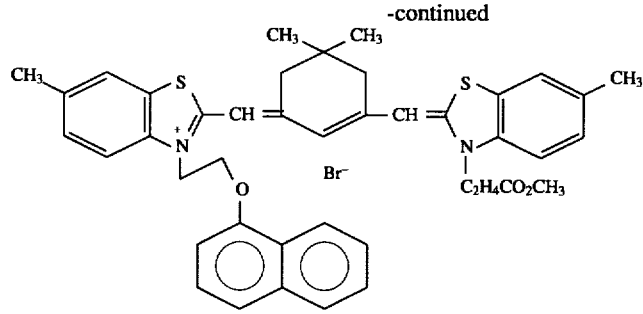
A-12
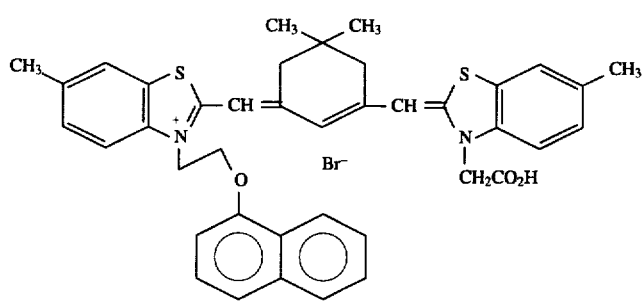
A-13
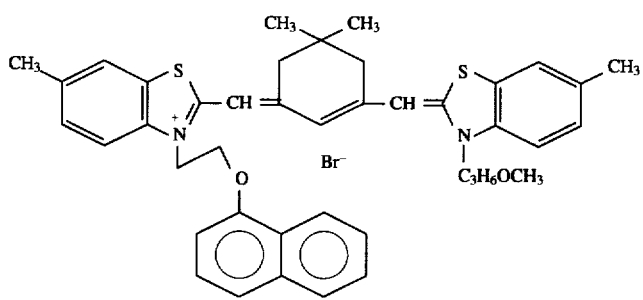
A-14
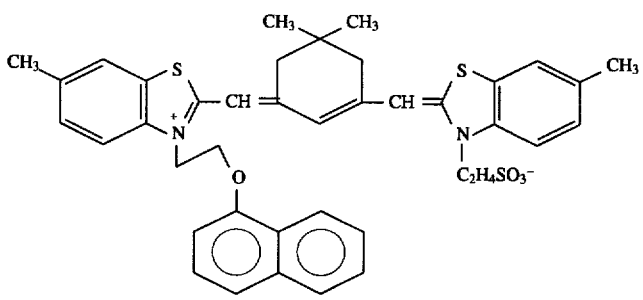
A-15
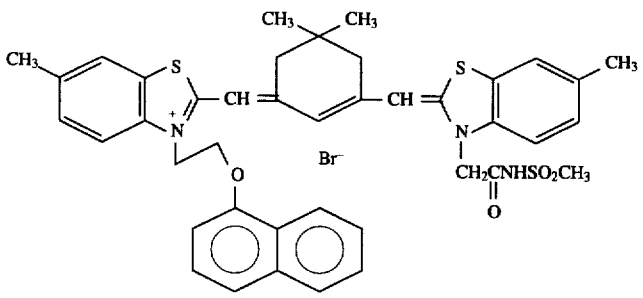
A-16

-continued
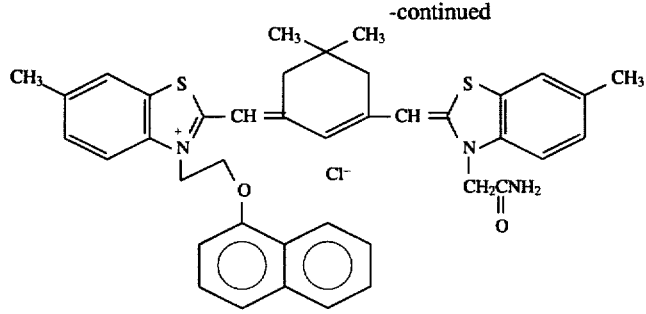
B-1
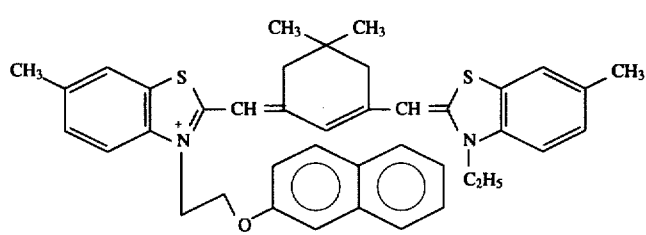
B-2
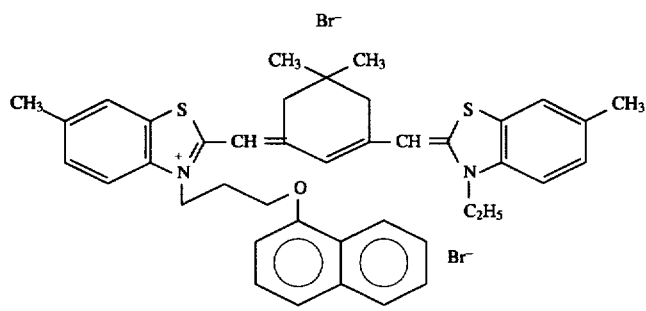
B-3
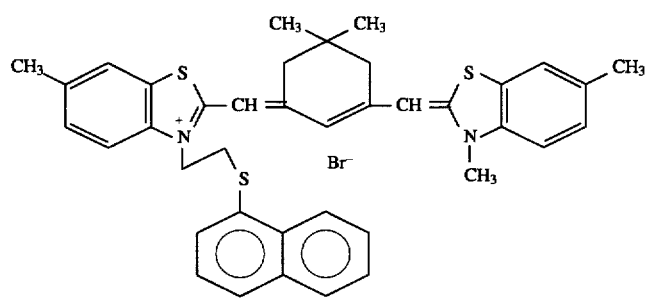
B-4
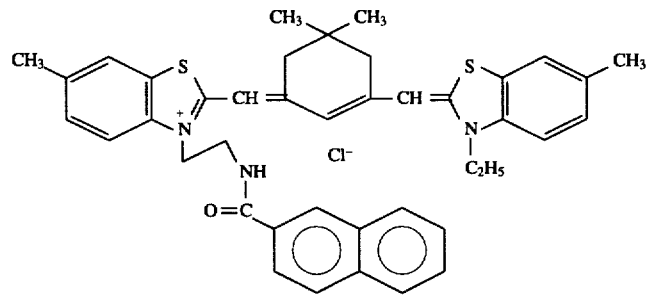
B-5

B-6
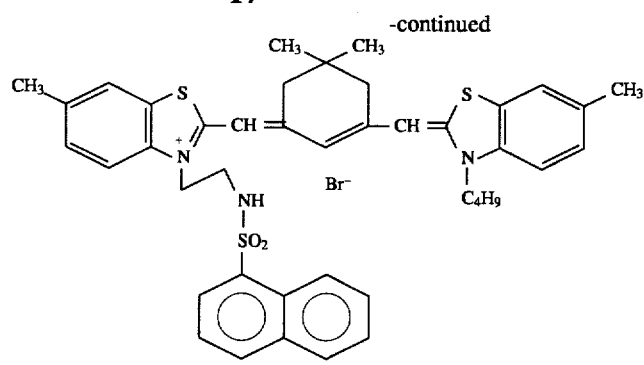
B-7
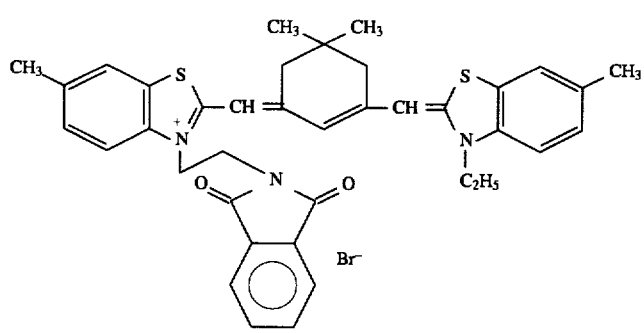
B-8
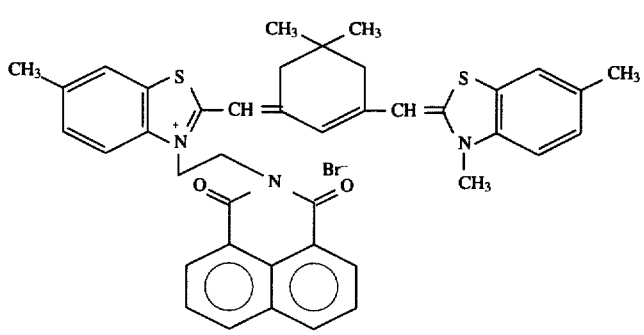
B-9
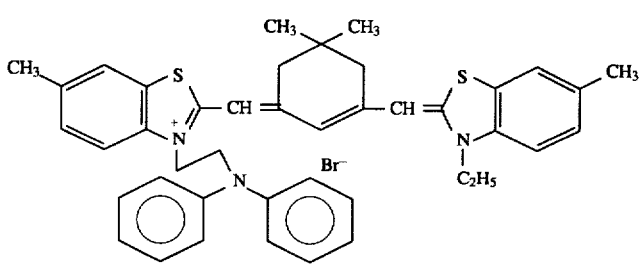
B-10
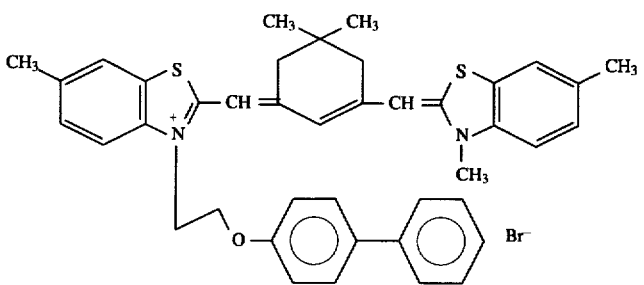

B-11
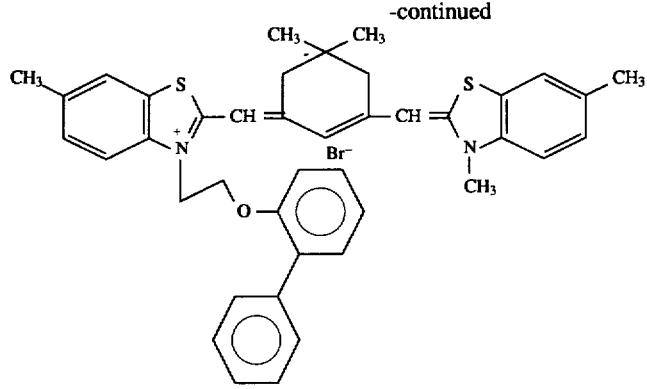
B-12
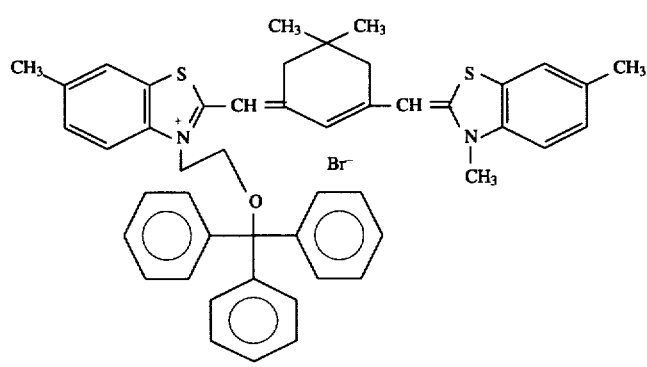
B-13
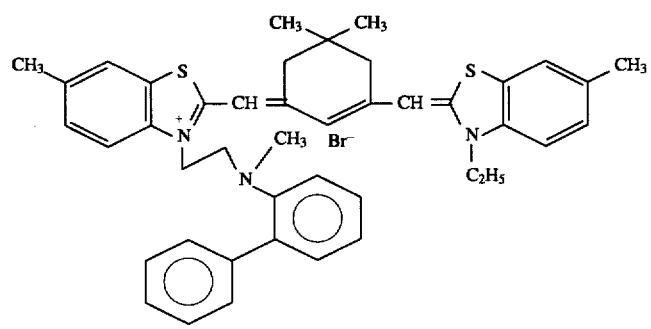
B-14
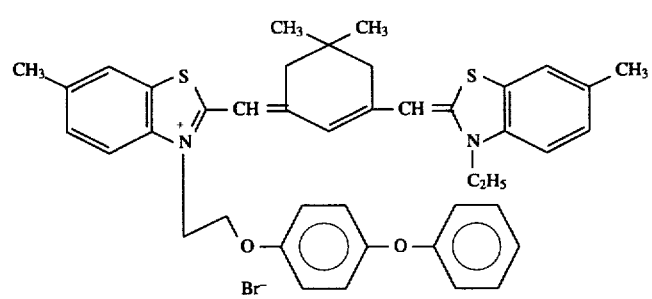
B-15
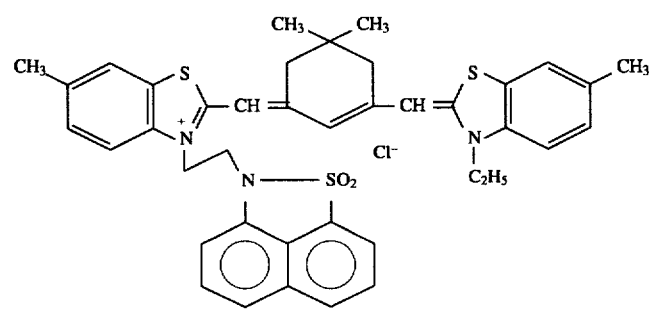

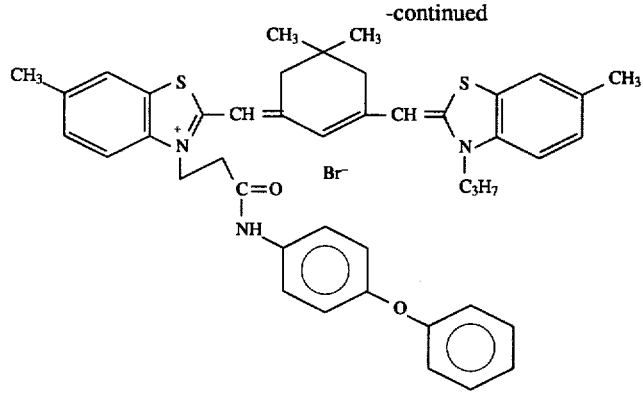
B-16
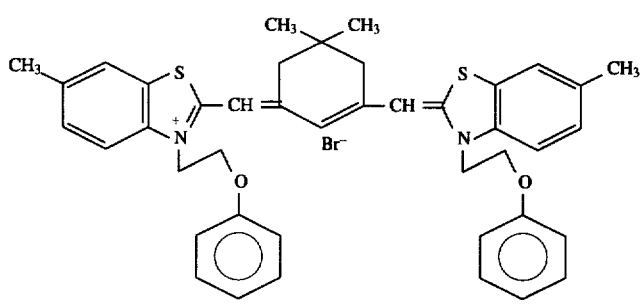
C-1
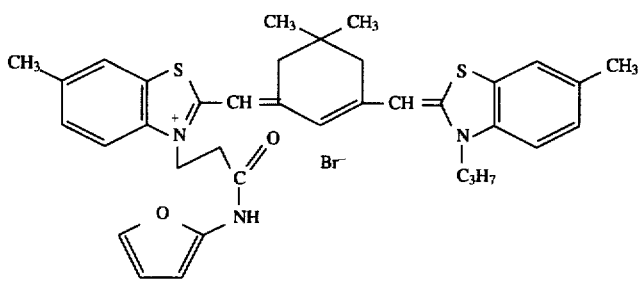
C-2
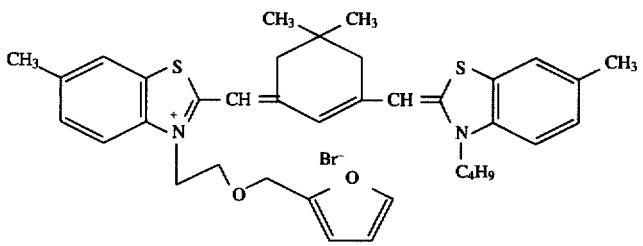
C-3
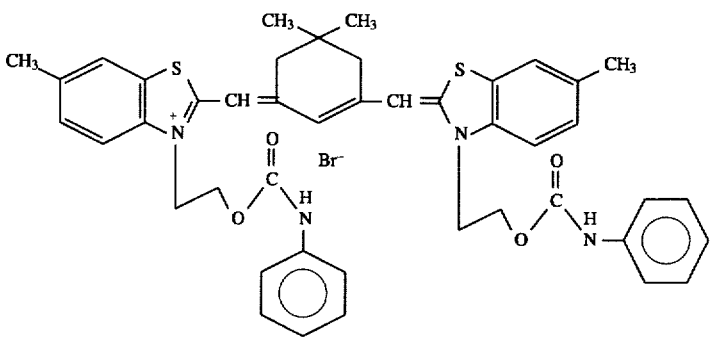
C-4

-continued
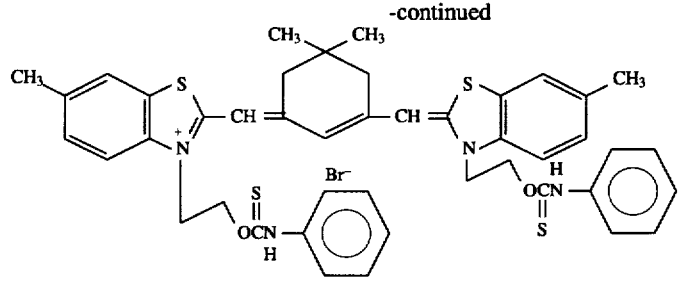 C-5
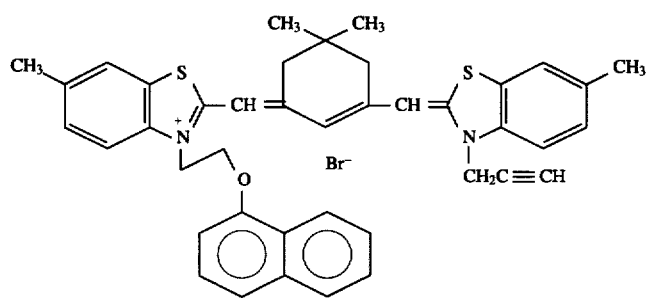 C-6
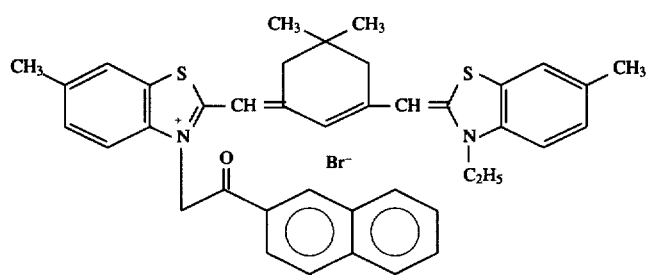 C-7
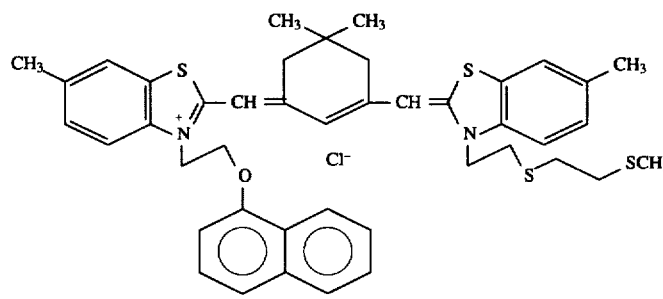 C-8
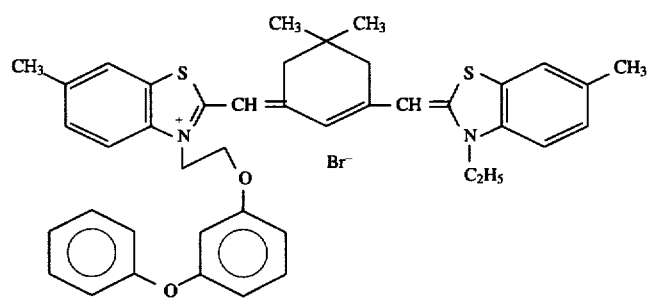 C-9

-continued
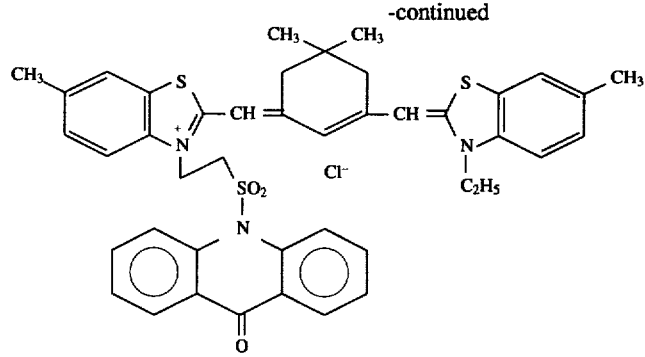
C-10
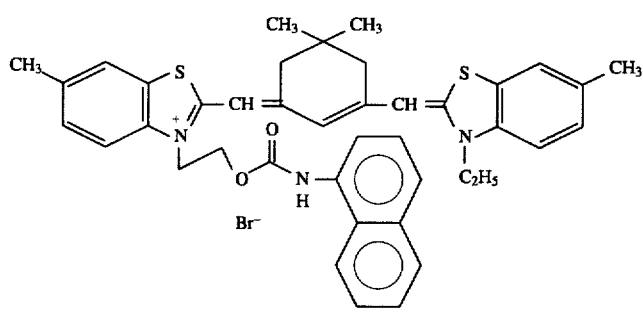
C-11
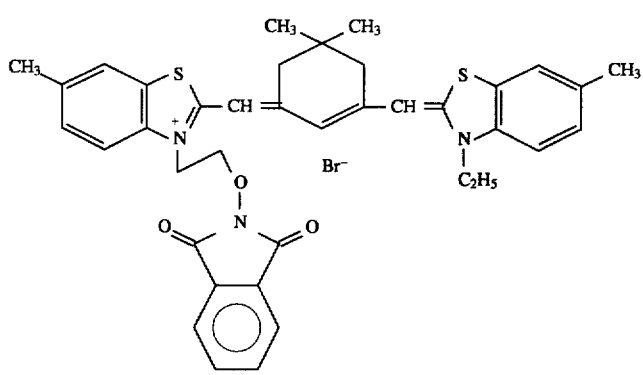
C-12
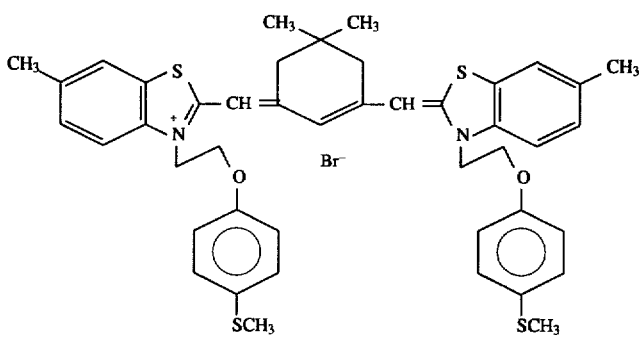
C-13
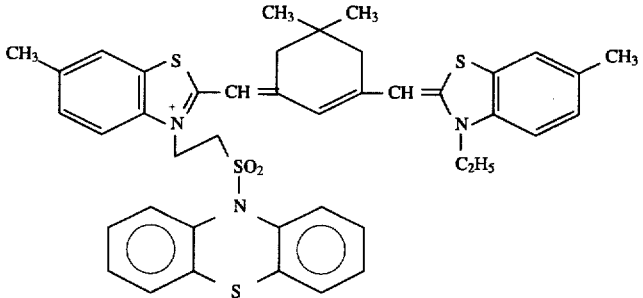
C-14

C-15
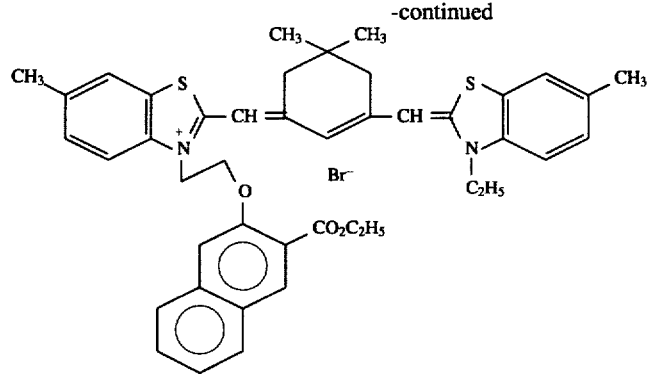
C-16
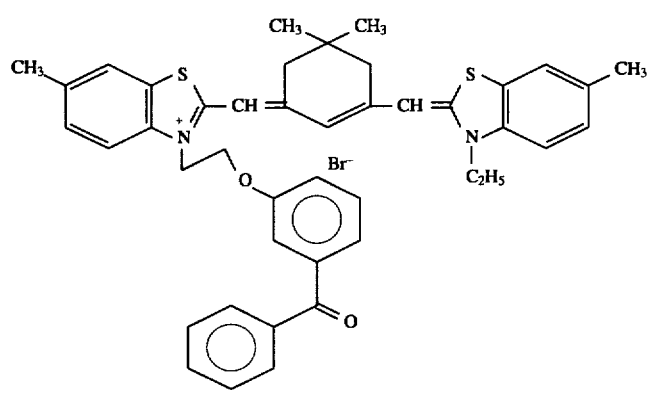
D-1
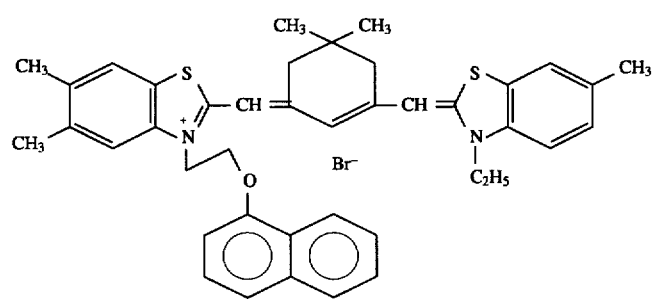
D-2
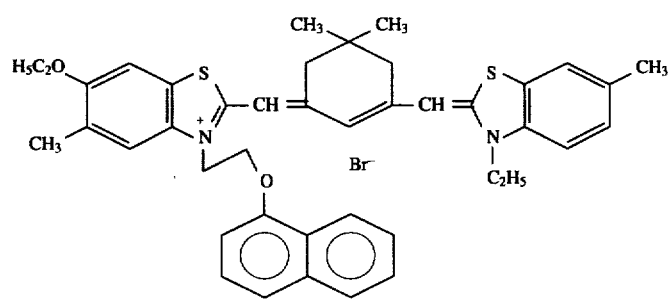

-continued
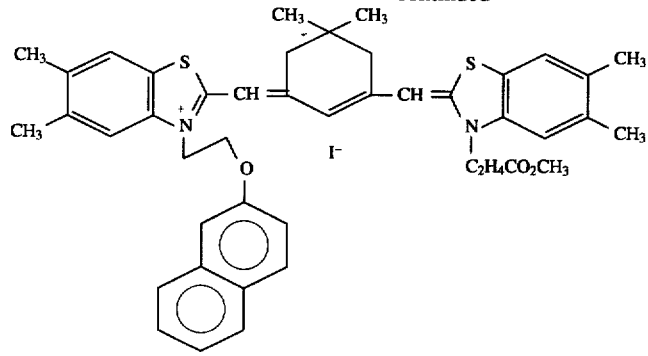
D-3
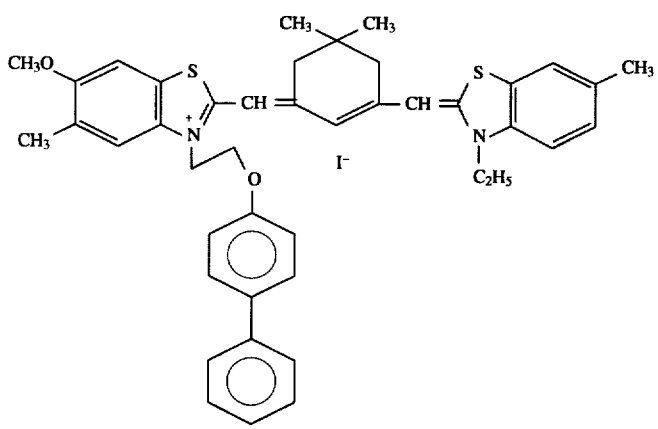
D-4
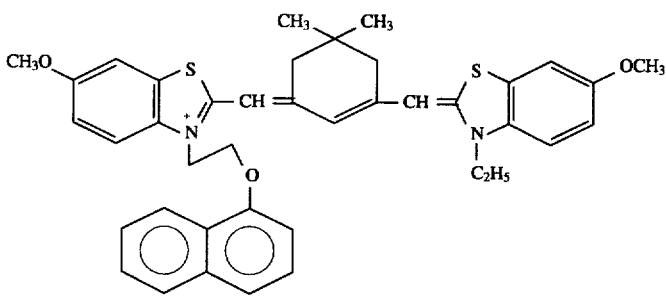
D-5
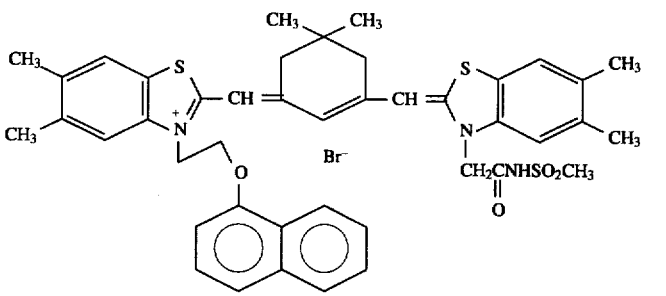
D-6

D-7
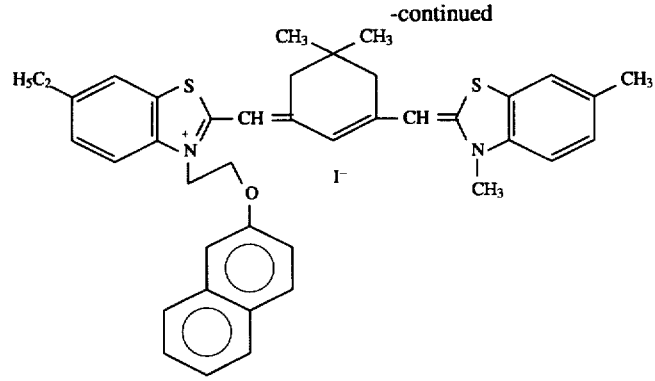
D-8
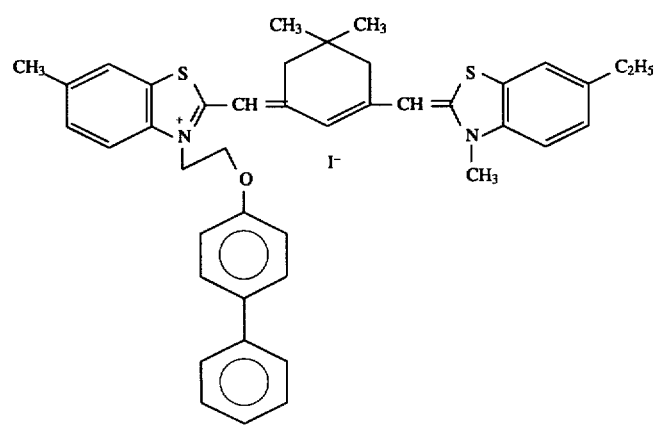
D-9
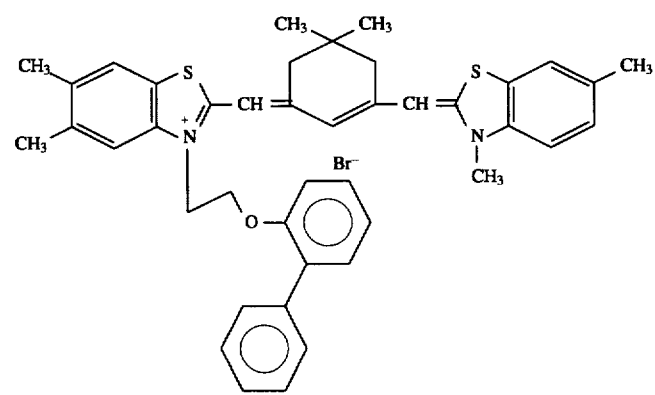
D-10
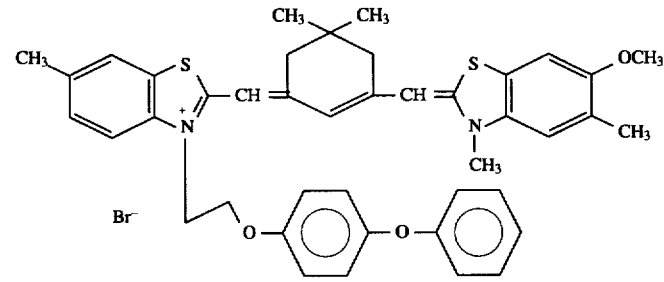

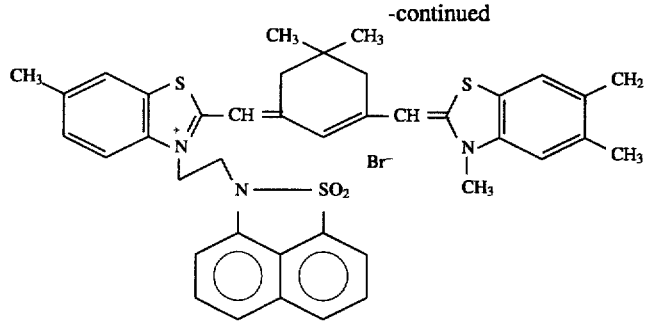
D-11
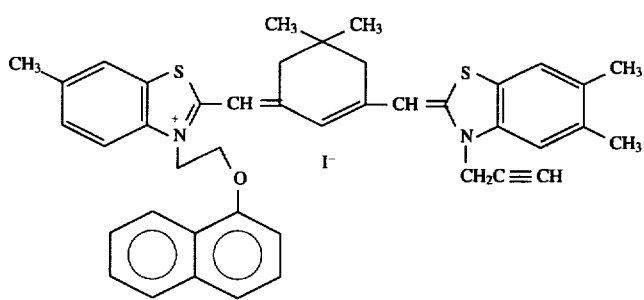
D-12
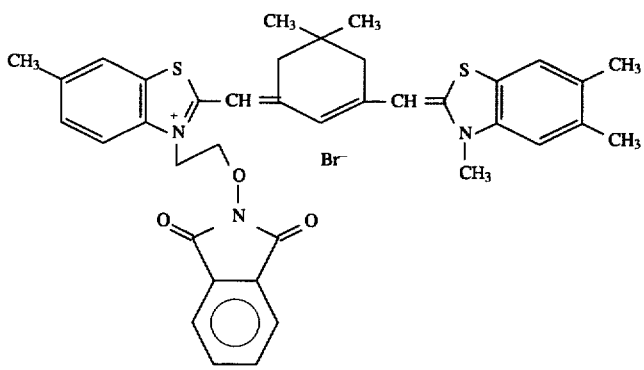
D-13
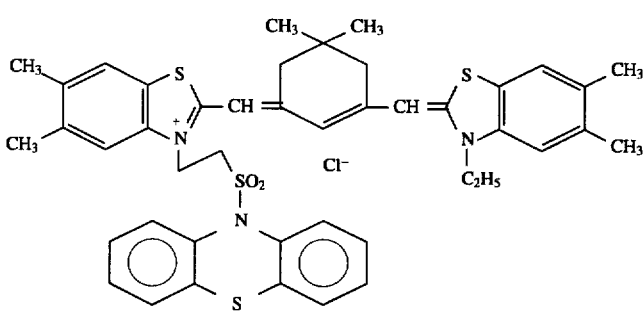
D-14
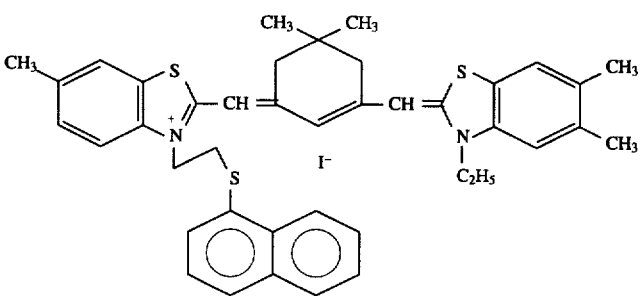
D-15

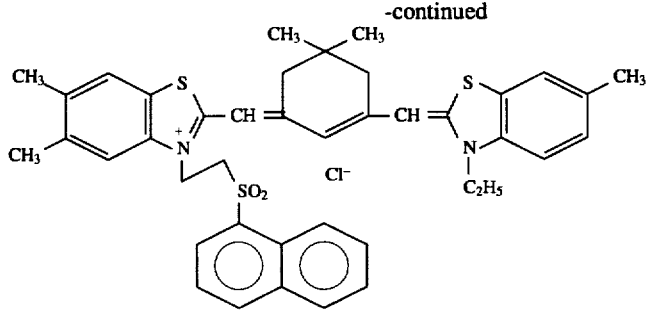
D-16
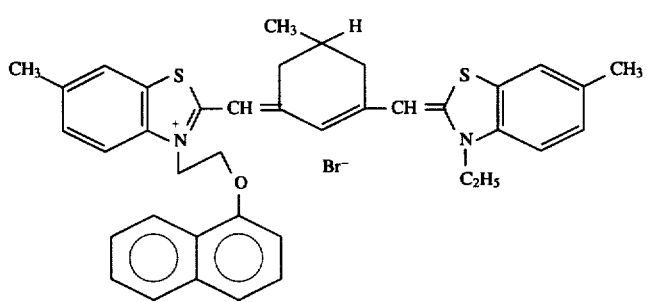
E-1
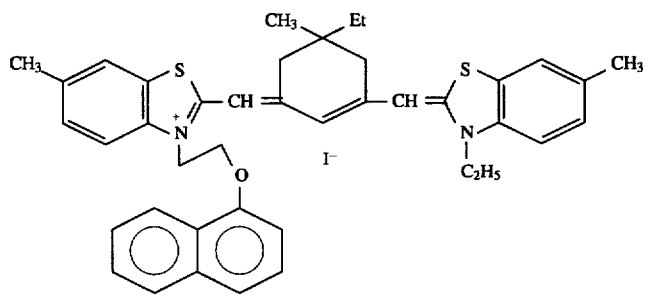
E-2
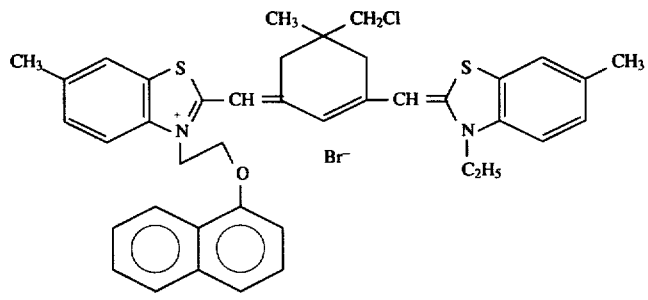
E-3
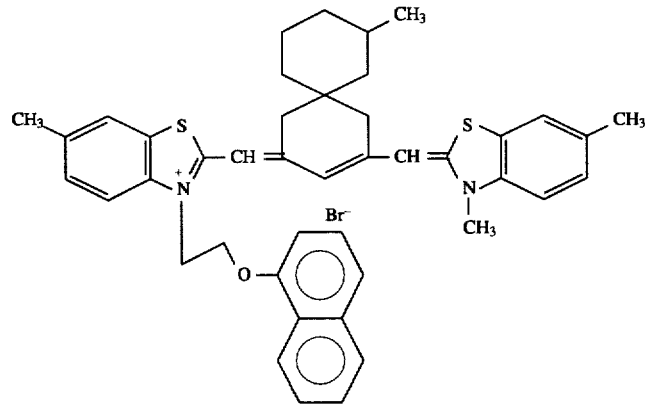
E-4

-continued
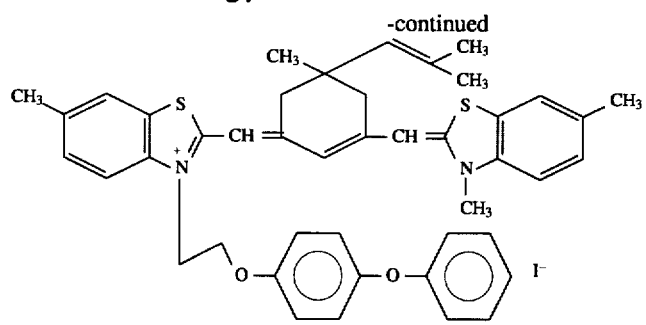
E-5
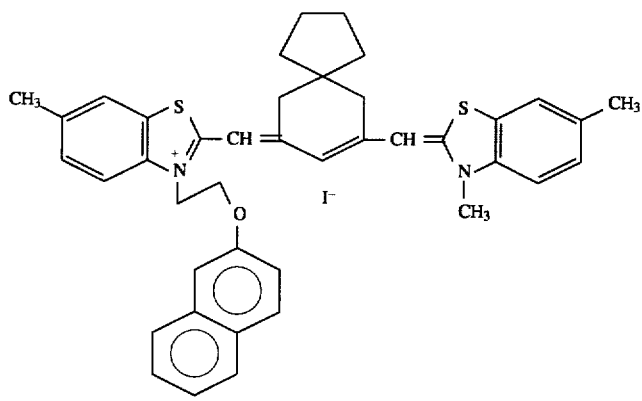
E-6
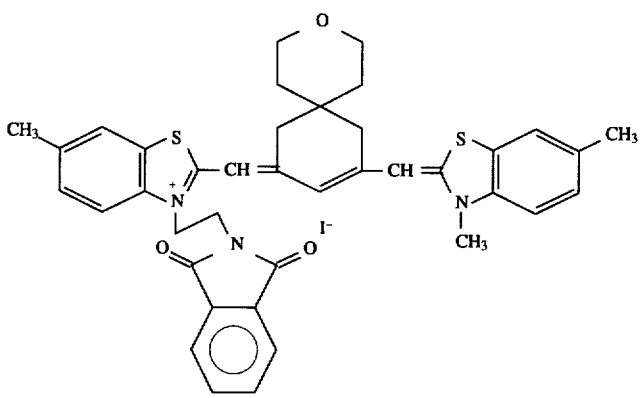
E-7
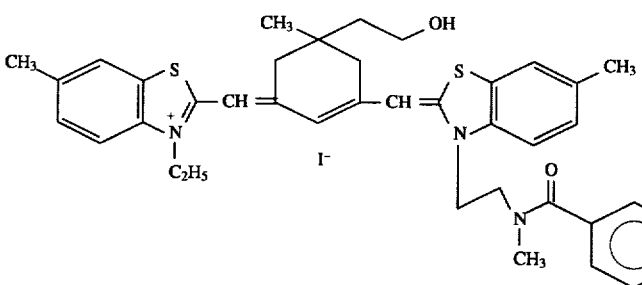
E-8
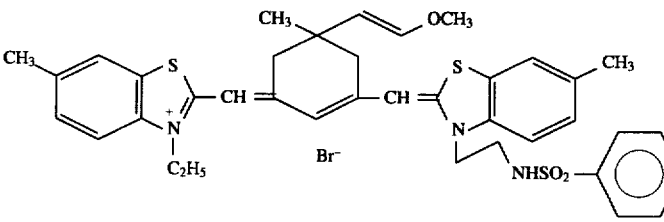
E-9

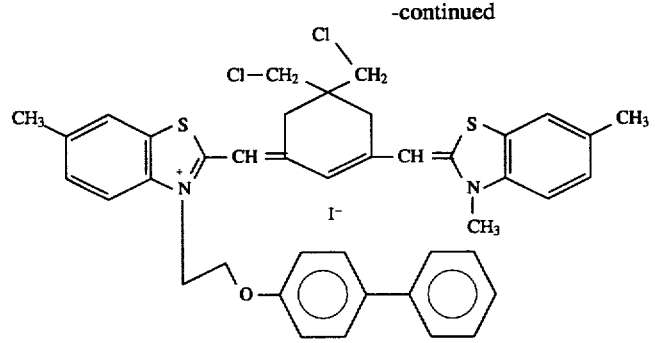
E-10
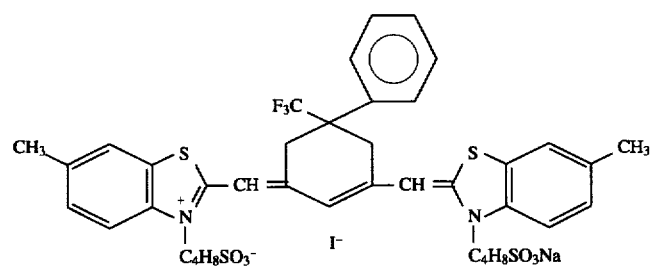
E-11
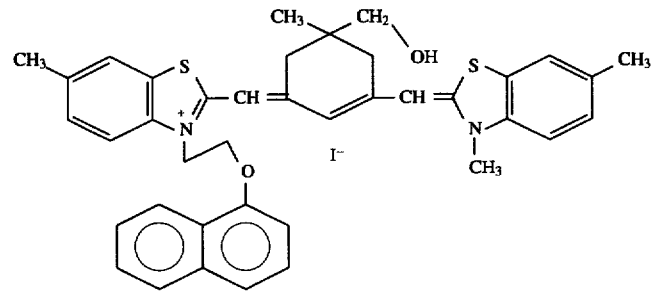
E-12
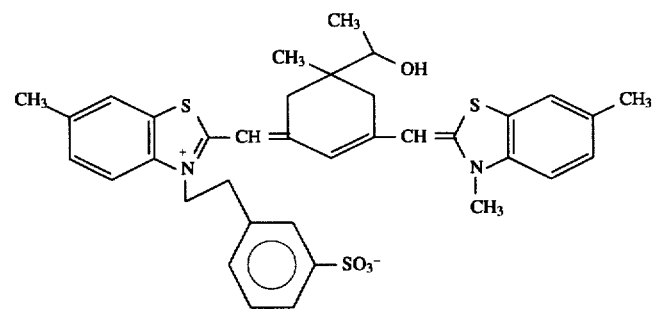
E-13
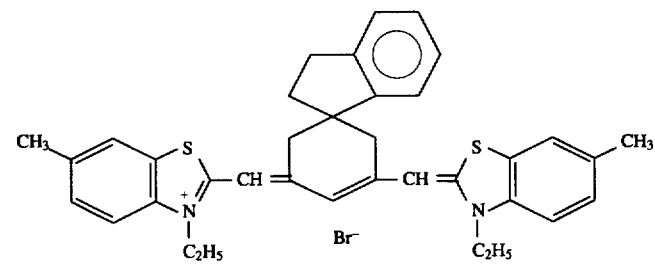
E-14

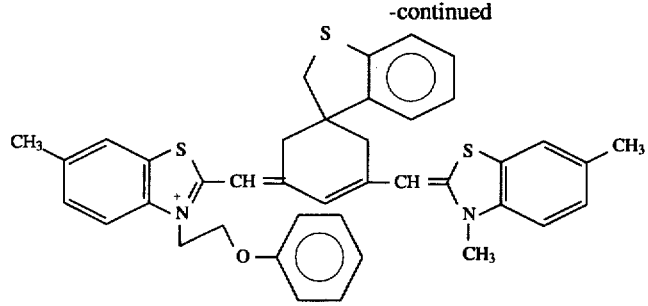
E-15
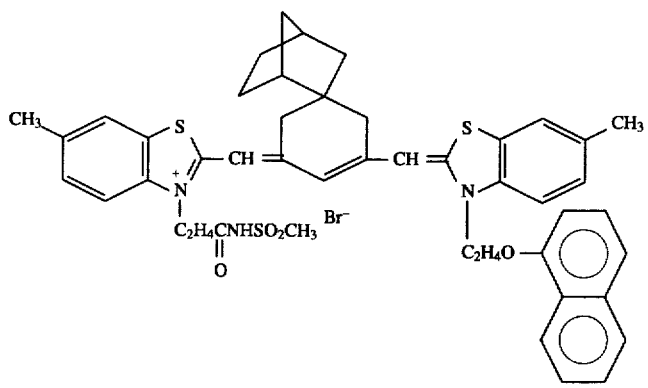
E-16
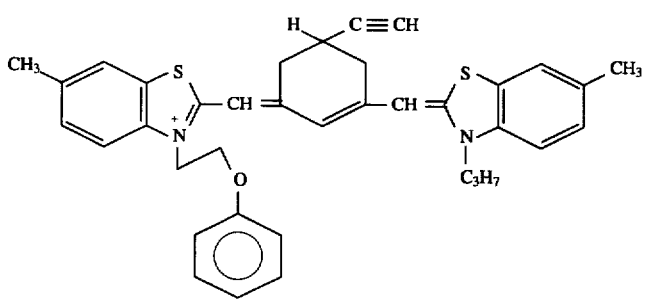
F-1
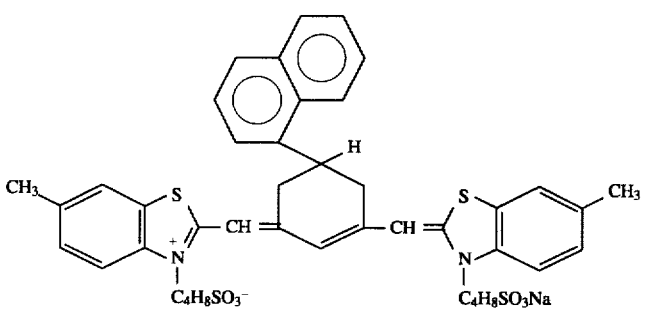
F-2
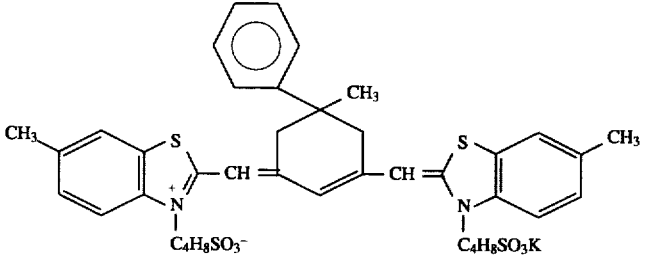
F-3

-continued
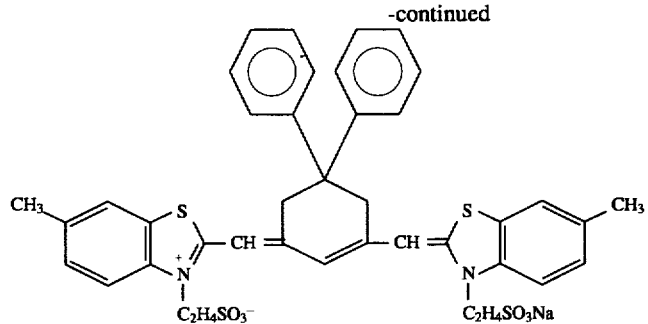
F-4
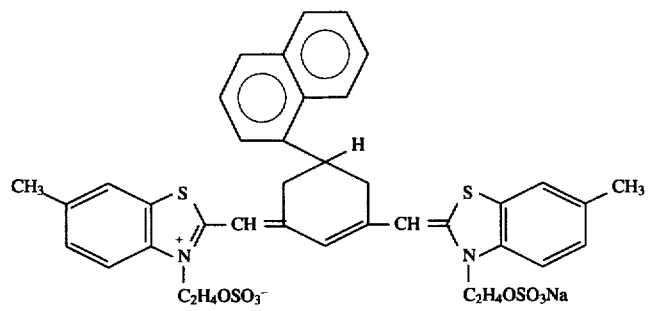
F-5
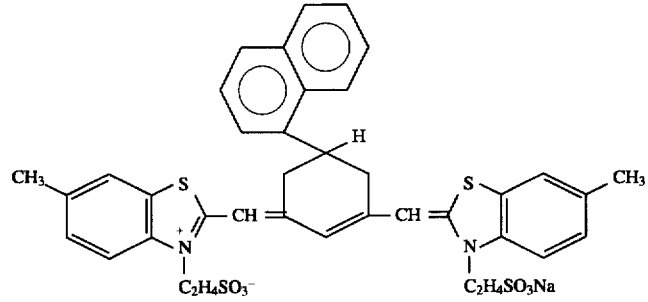
F-6
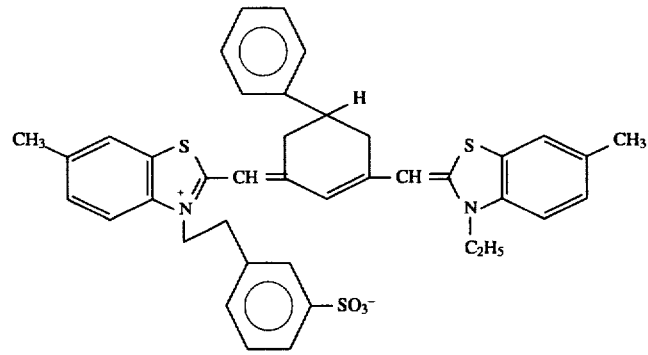
F-7
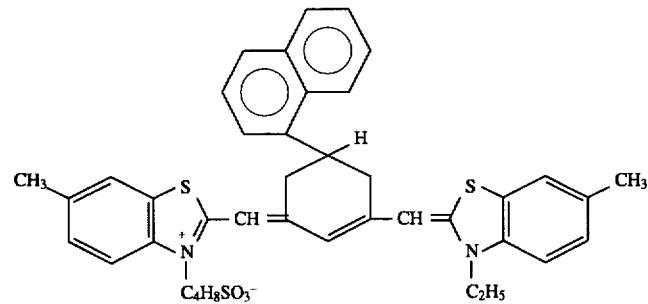
F-8

F-9
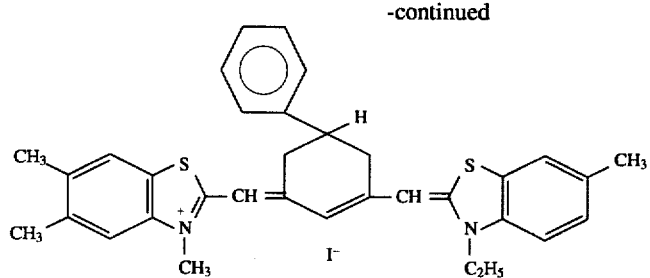
F-10
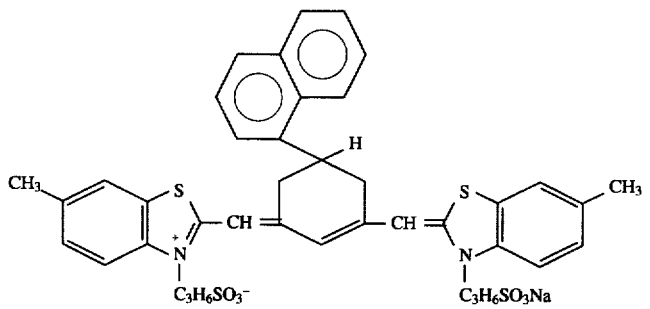
F-11
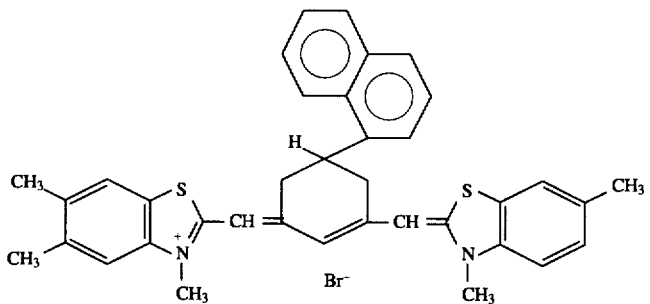
F-12
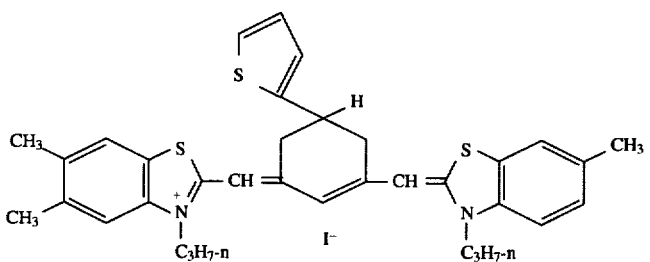
F-13
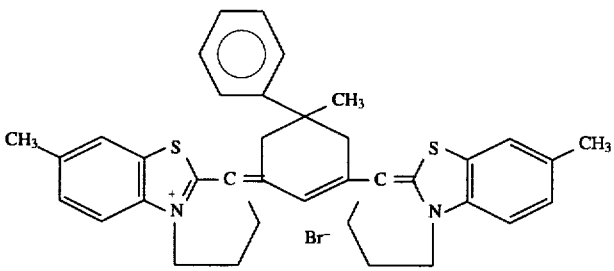

F-14
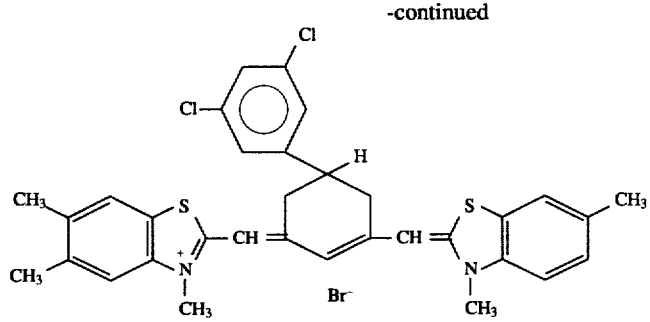
F-15
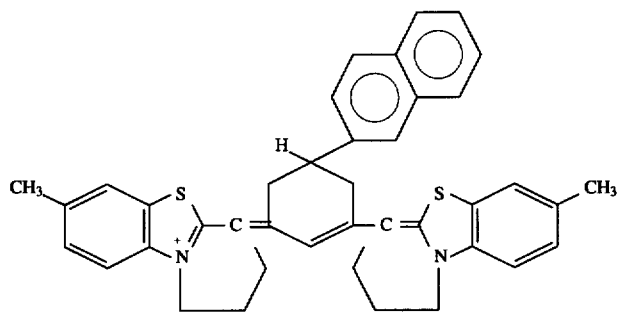
F-16
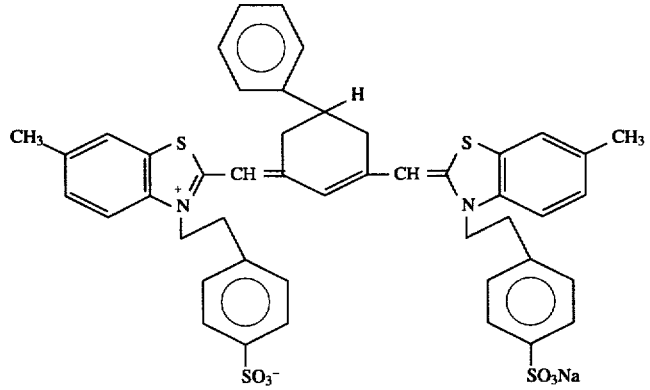
G-1
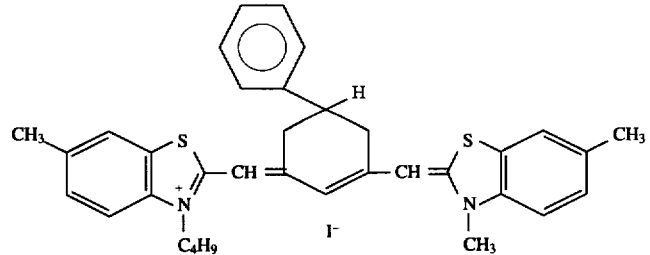
G-2
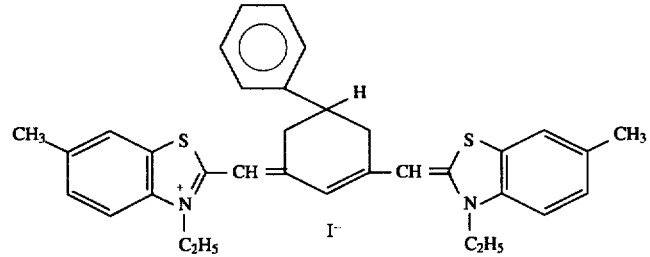

-continued
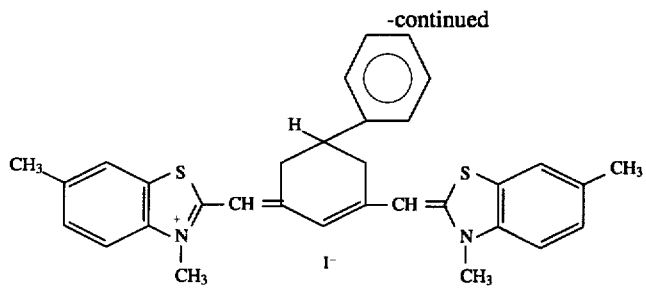
G-3
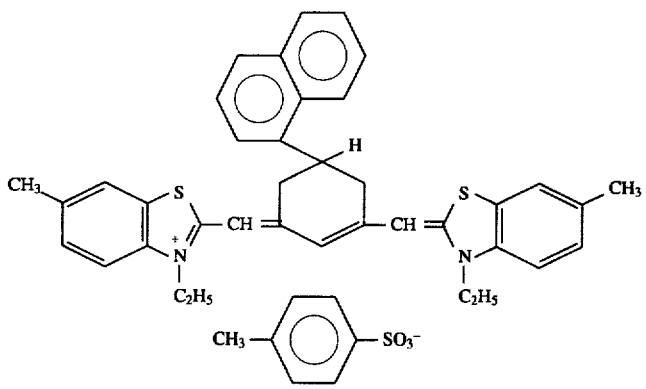
G-4
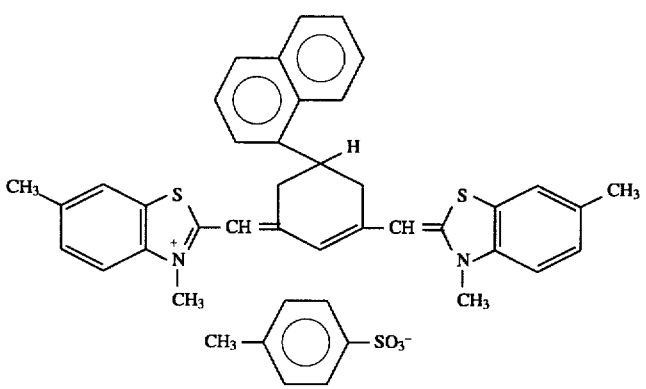
G-5
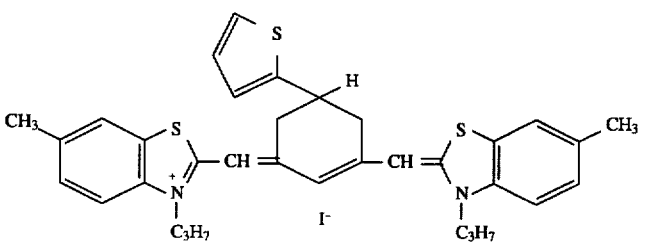
G-6
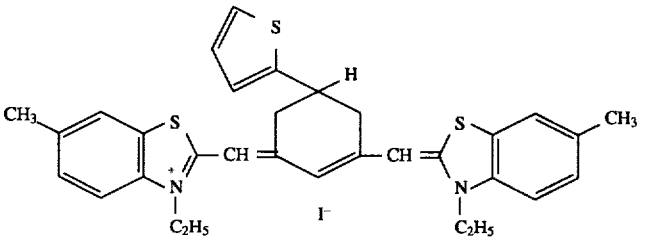
G-7

-continued
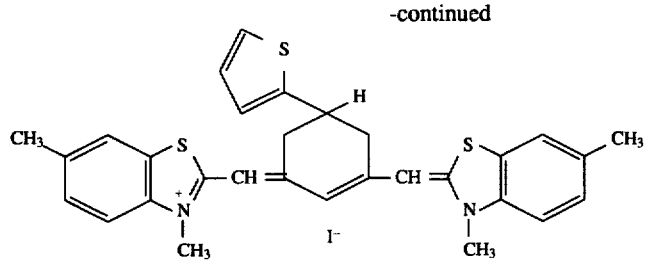
G-8
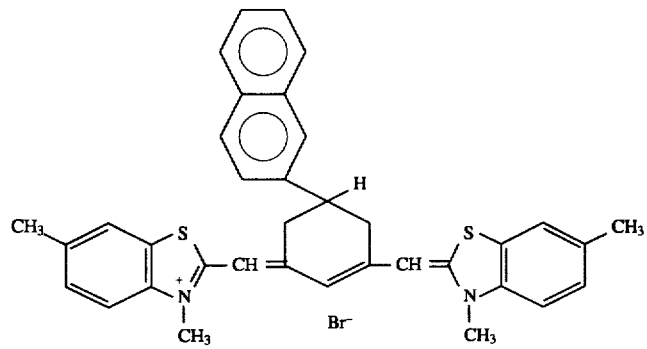
G-9
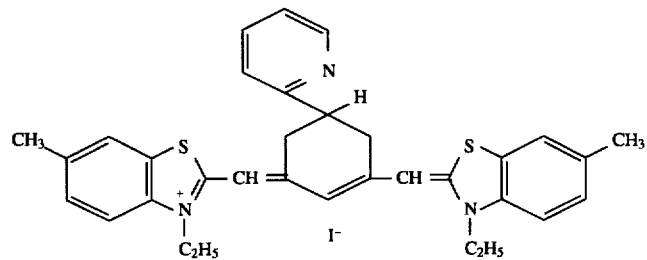
G-10
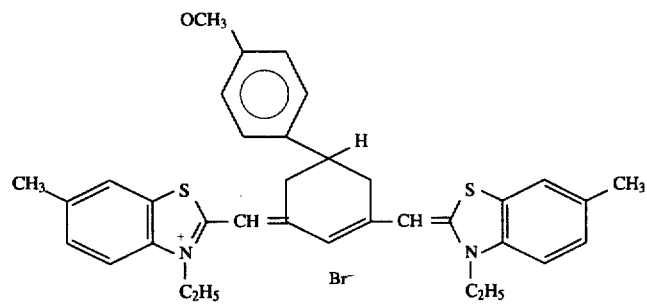
G-11
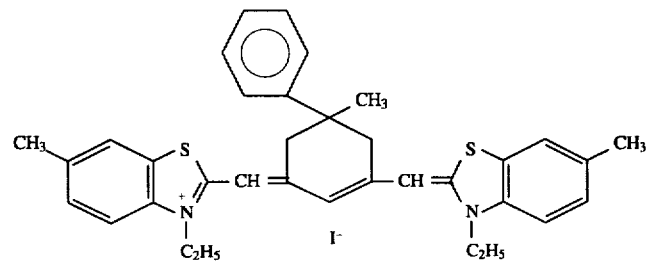
G-12
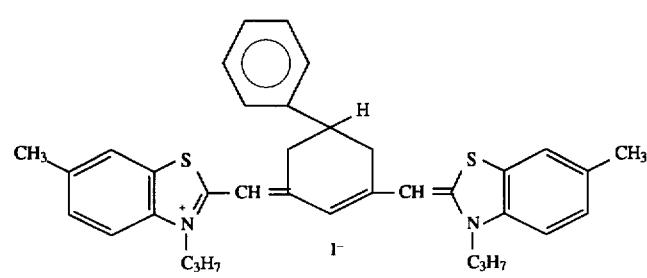
G-13

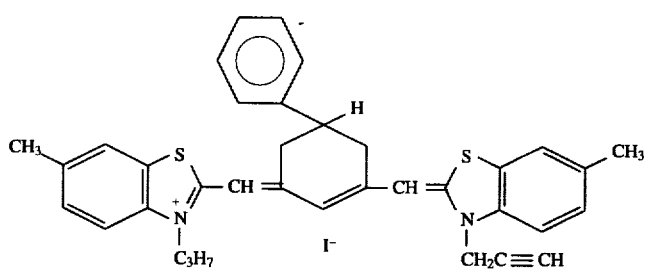 G-14
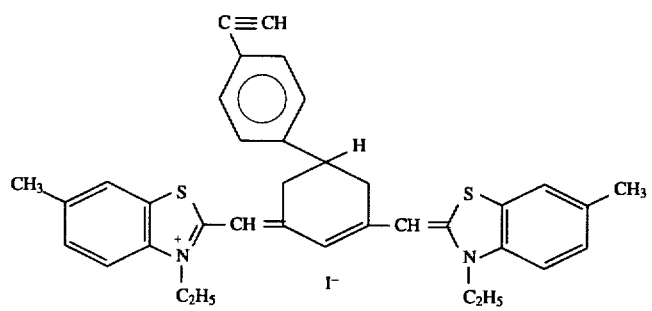 G-15
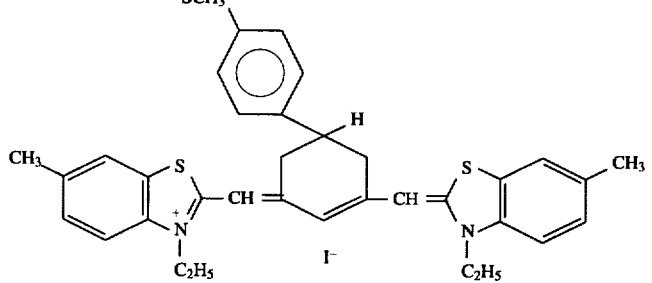 G-16
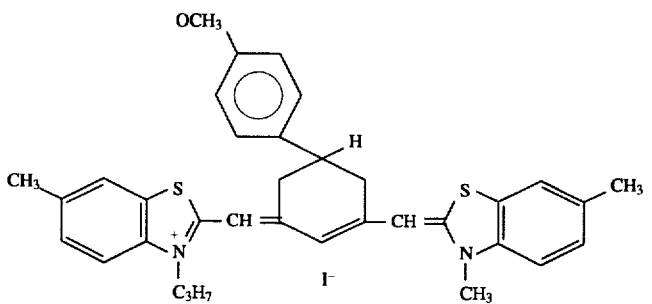 H-1
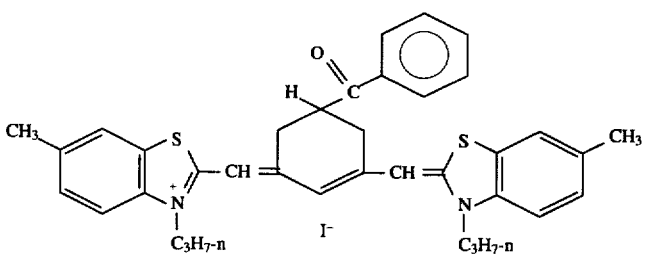 H-2

-continued
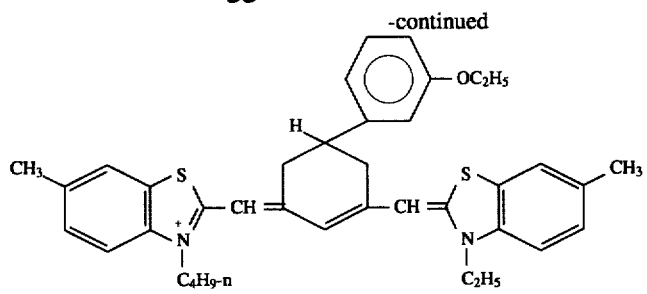 H-3
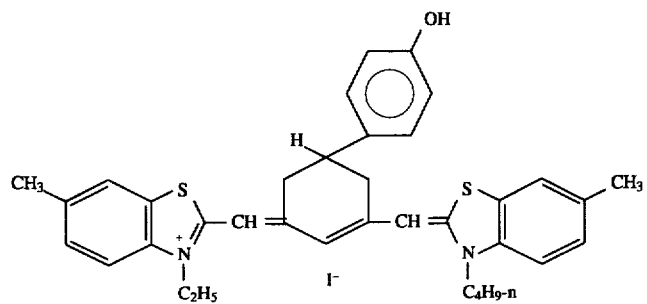 H-4
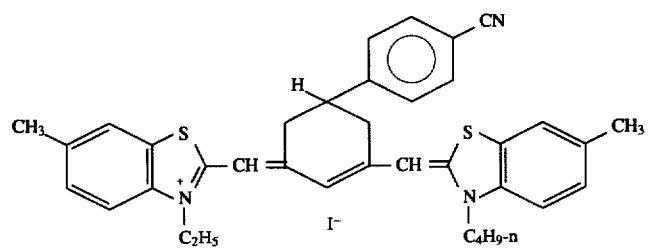 H-5
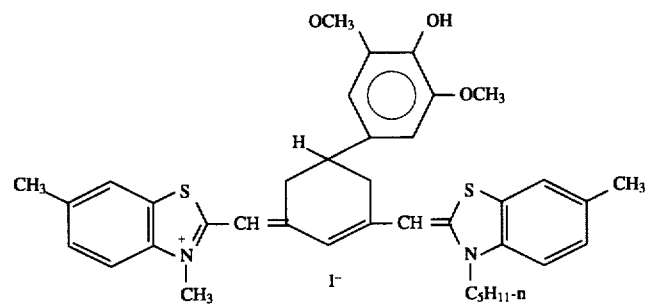 H-6
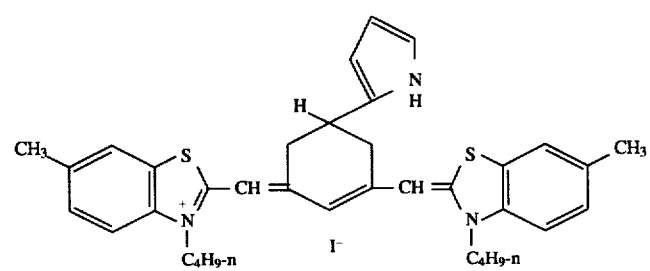 H-7
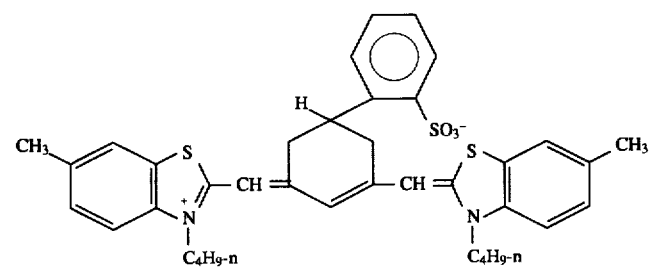 H-8

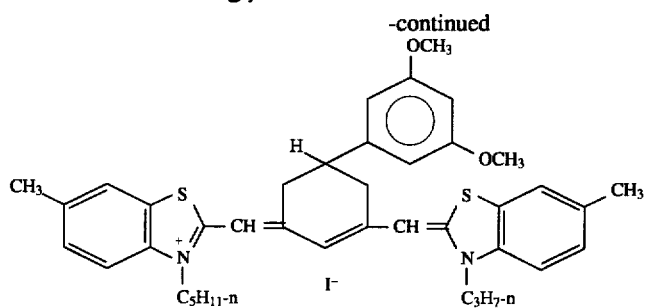
H-9
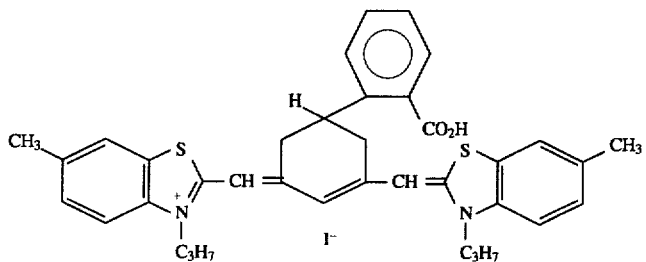
H-10
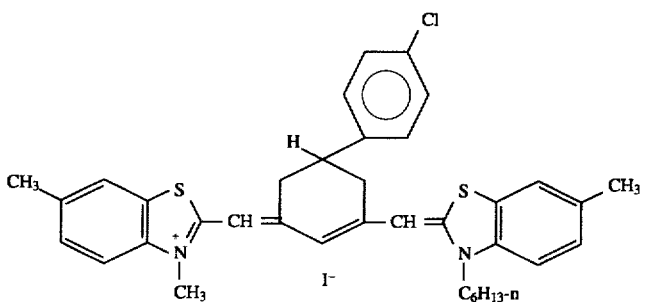
H-11
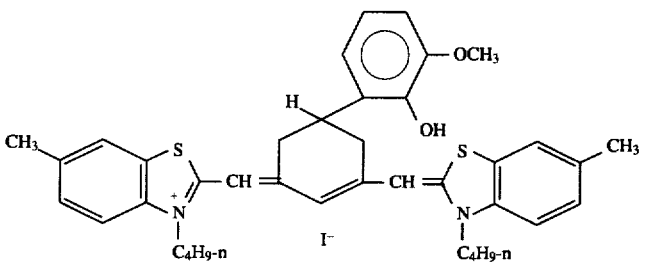
H-12
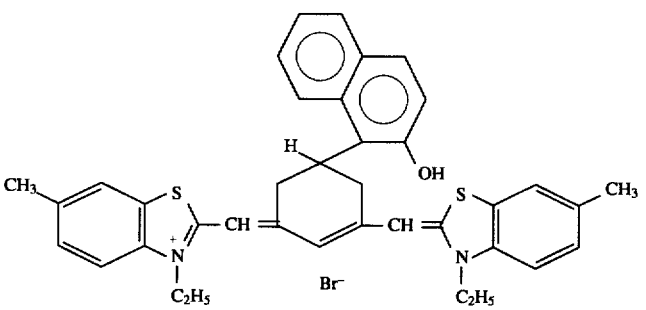
H-13

-continued
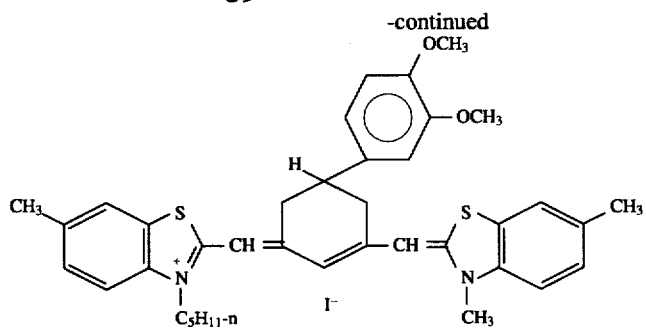
H-14
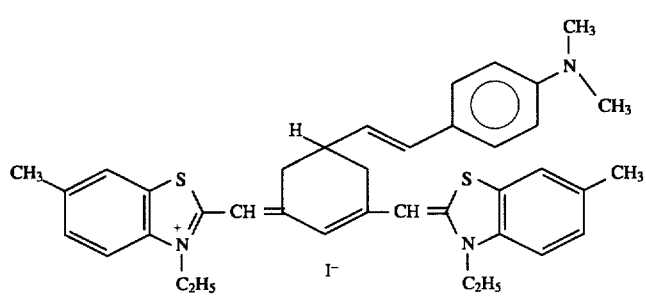
H-15
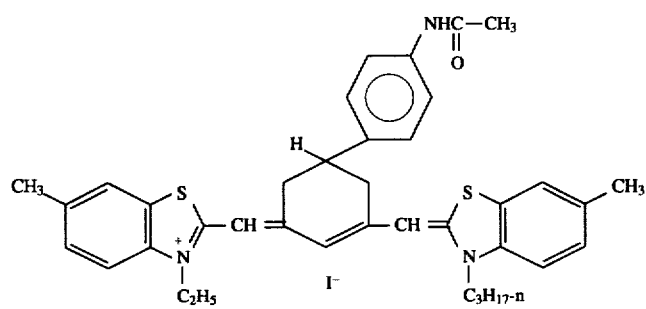
H-16
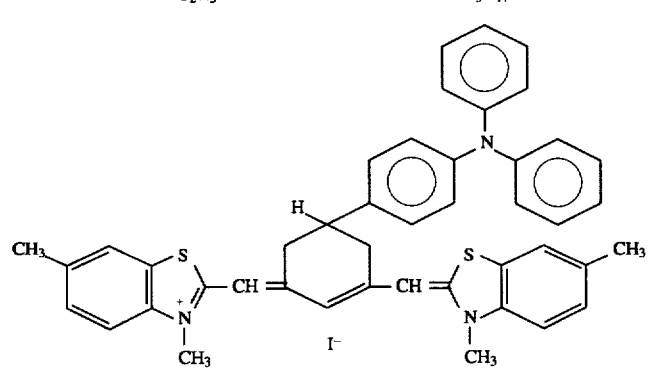
I-1
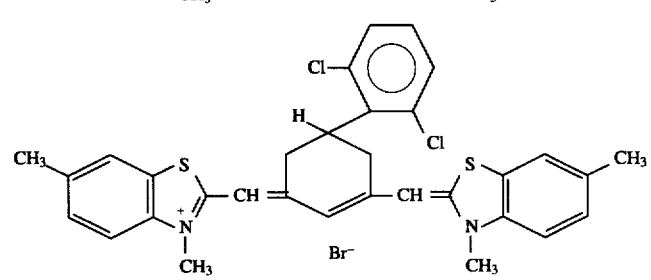
I-2

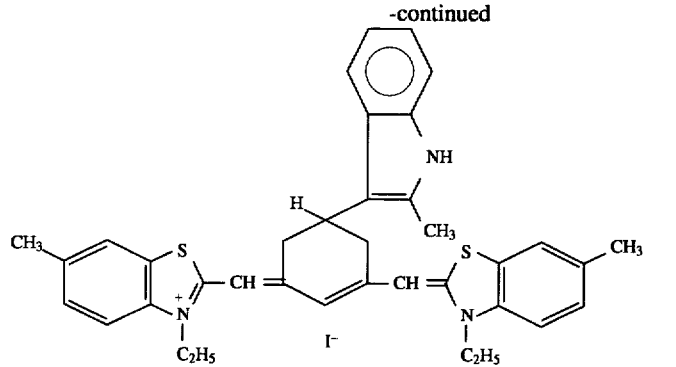
I-3
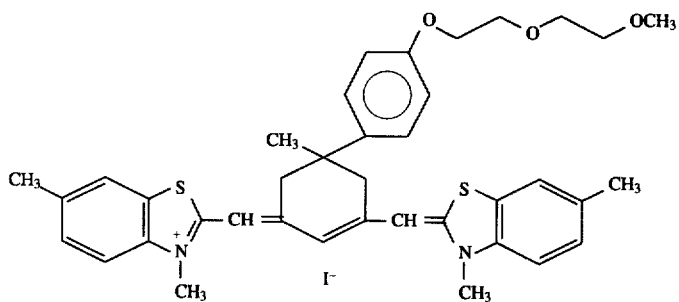
I-4
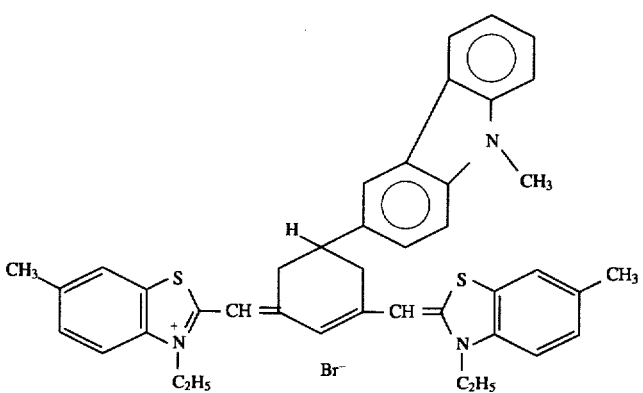
I-5
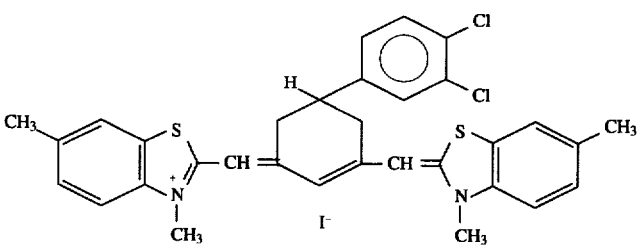
I-6
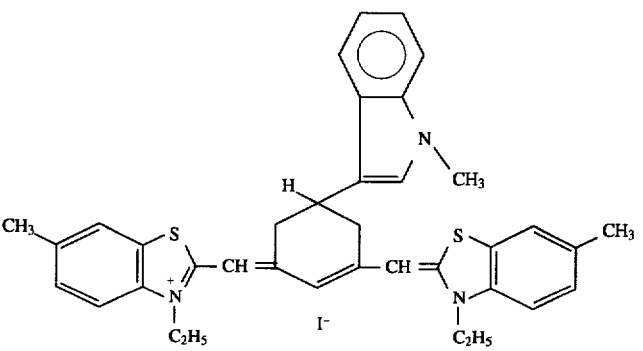
I-7

-continued
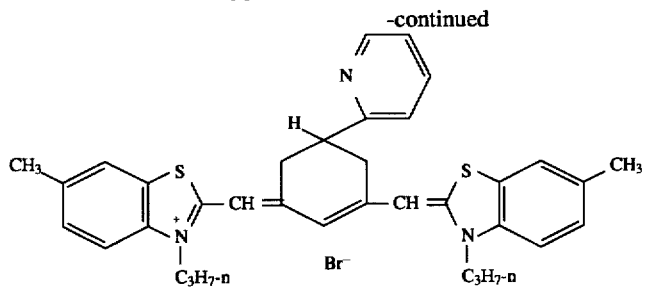
I-8
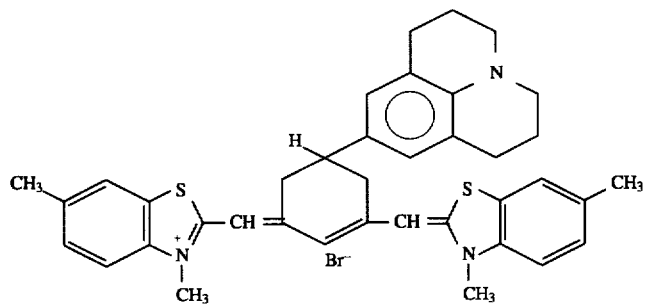
I-9
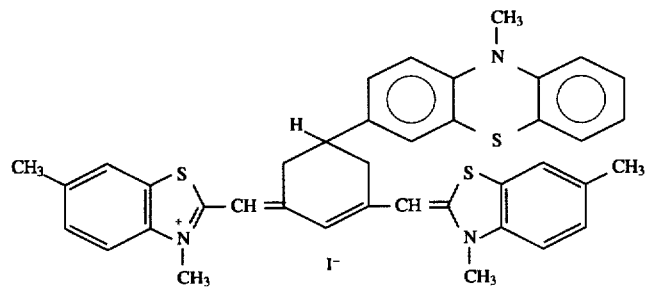
I-10
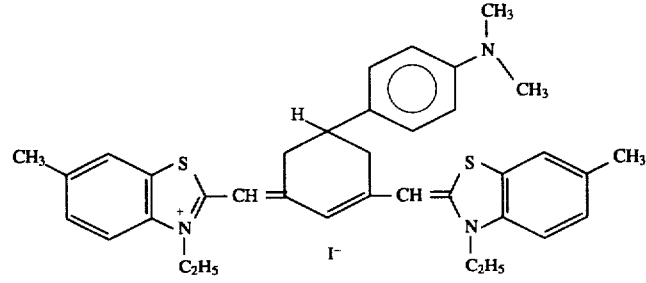
I-11
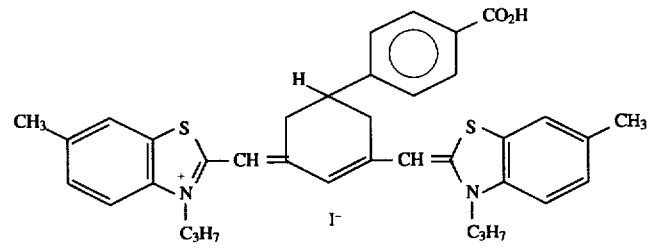
I-12
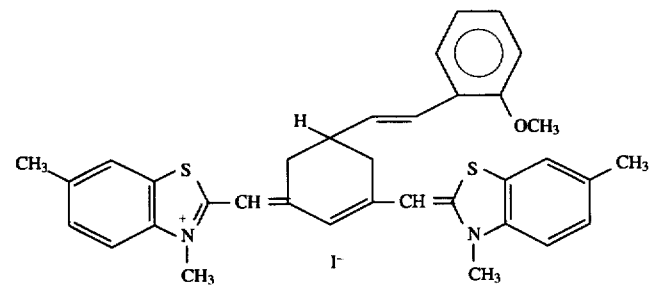
I-13

-continued
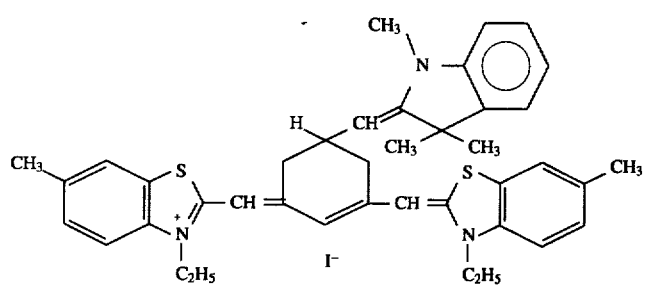
I-14
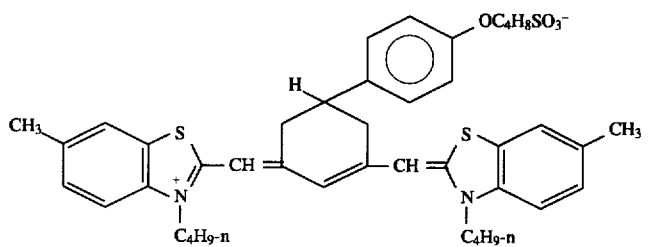
I-15
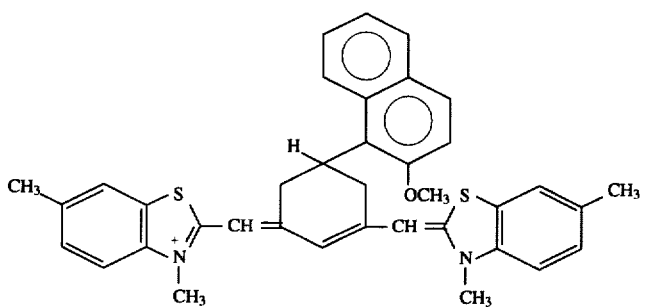
I-16
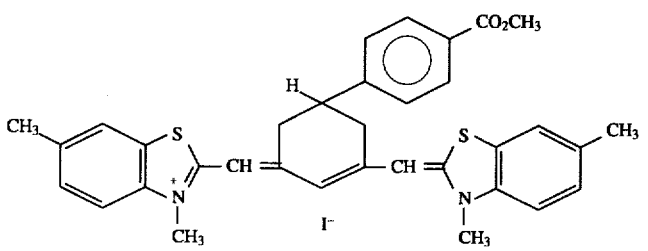
J-1
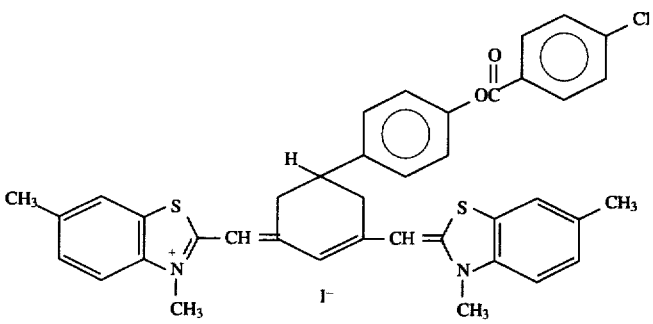
J-2

-continued
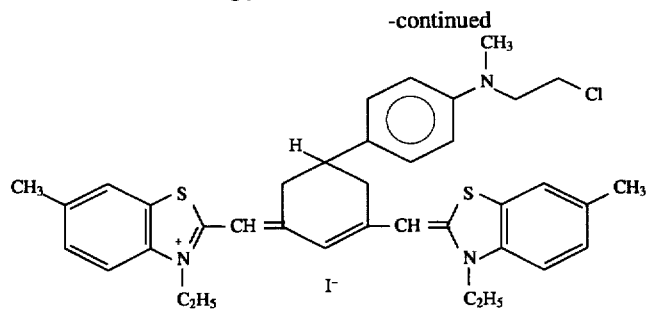 J-3
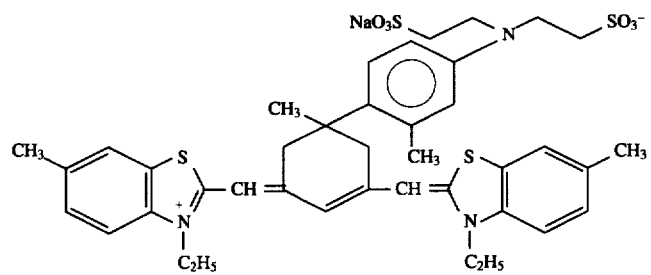 J-4
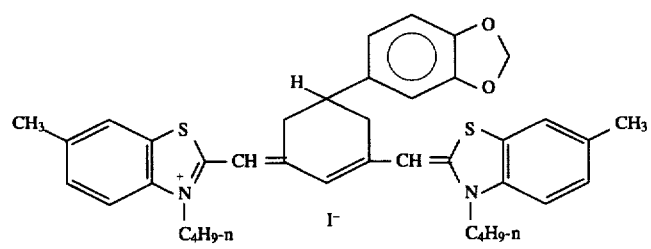 J-5
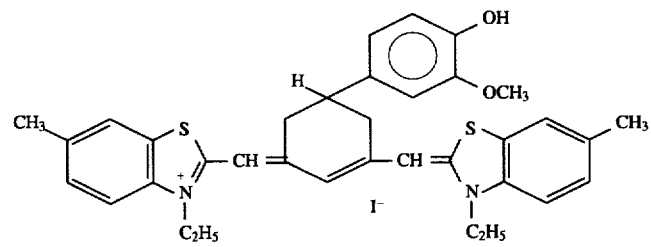 J-6
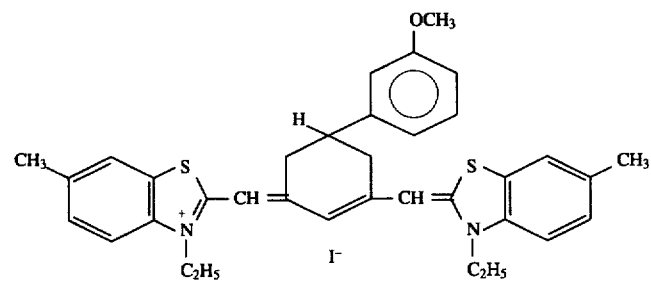 J-7
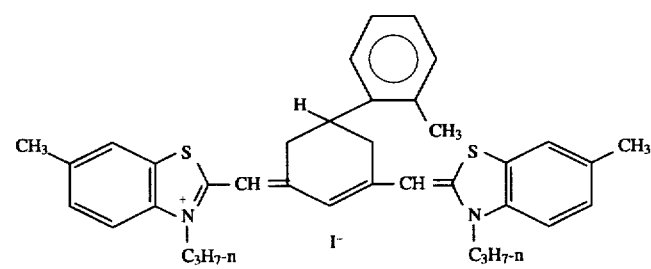 J-8

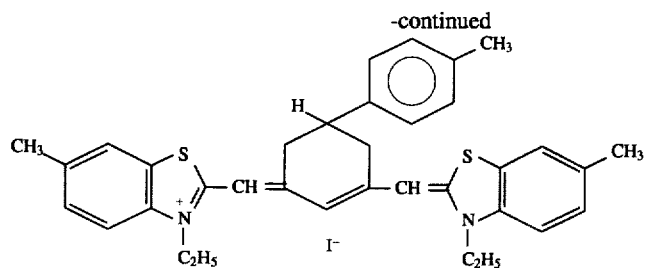
J-9
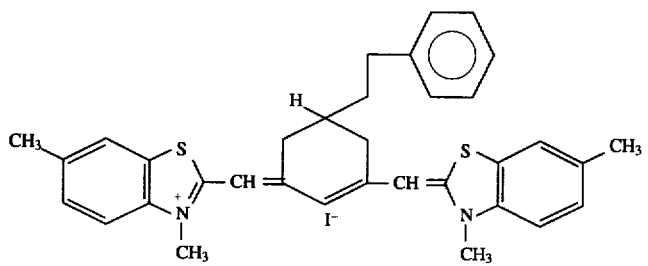
J-10
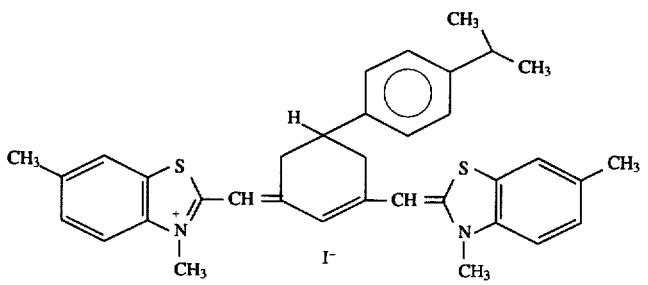
J-11
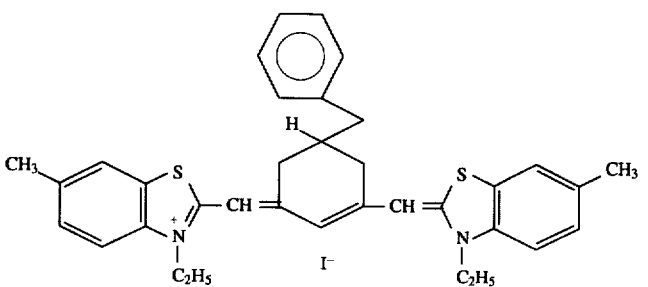
J-12
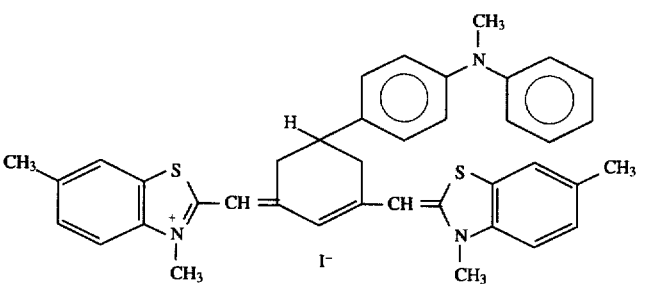
J-13
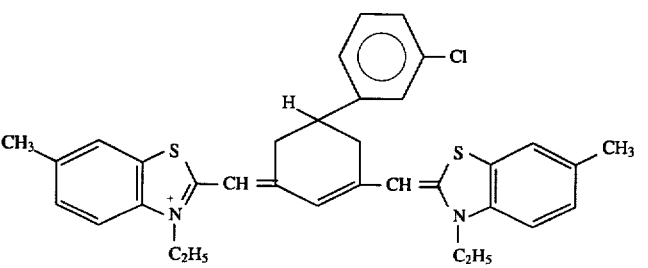
J-14

-continued
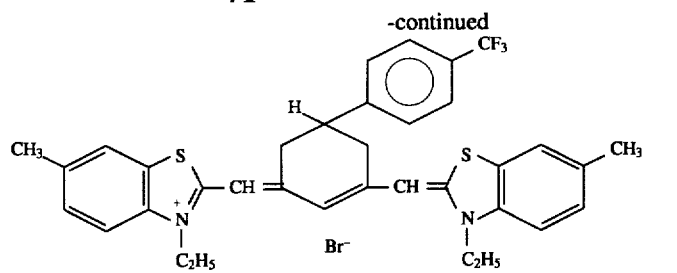
J-15
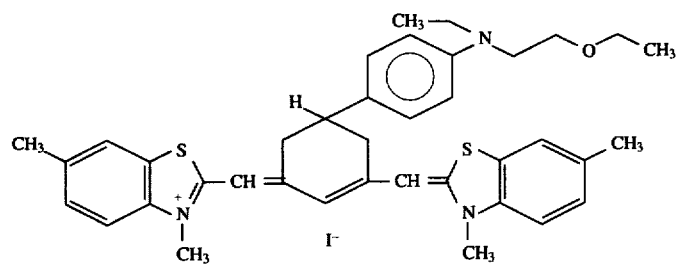
J-16
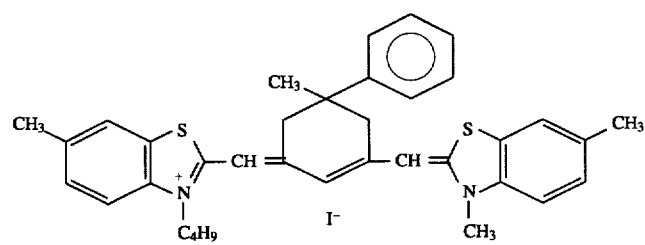
K-1
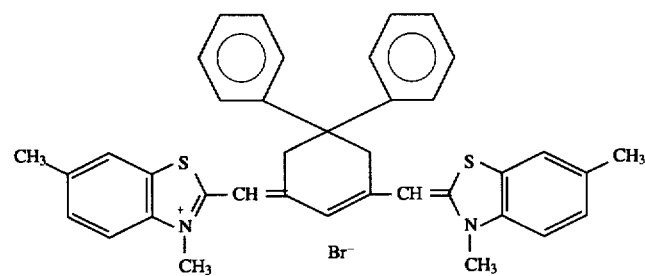
K-2
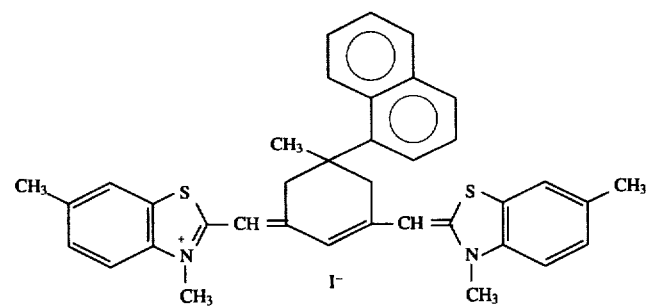
K-3
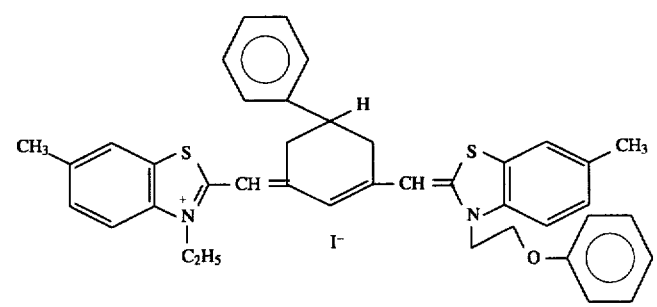
K-4

-continued
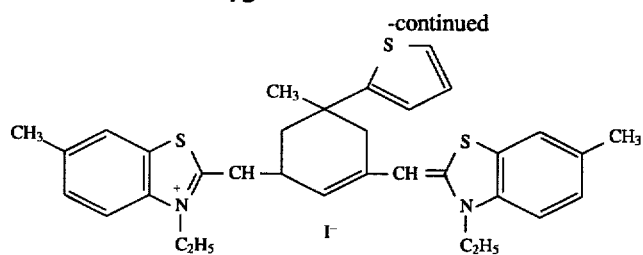
K-5
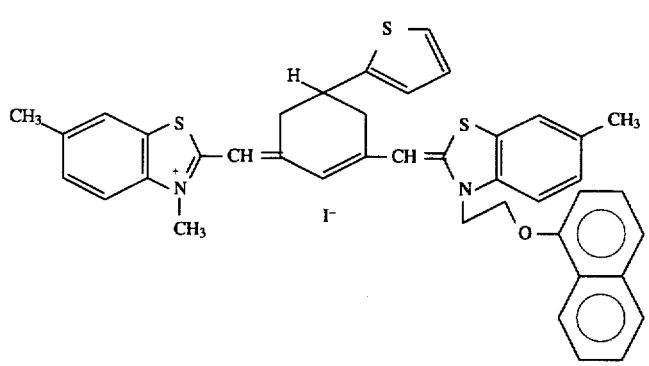
K-6
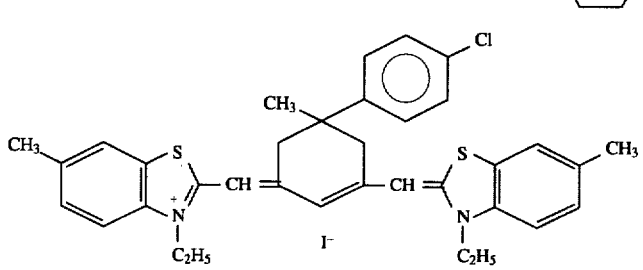
K-7
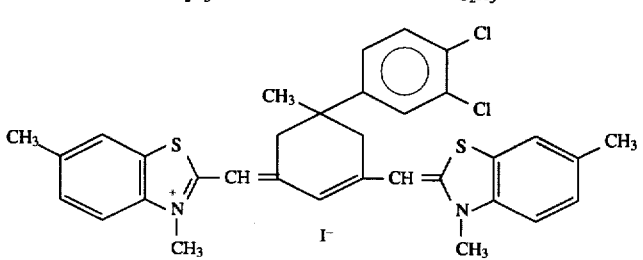
K-8
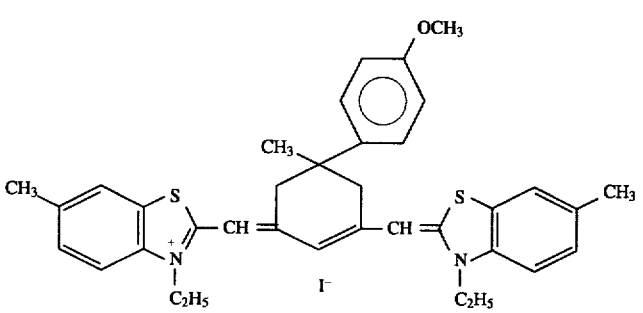
K-9
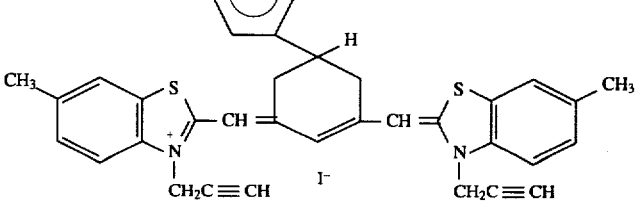
K-10

K-11
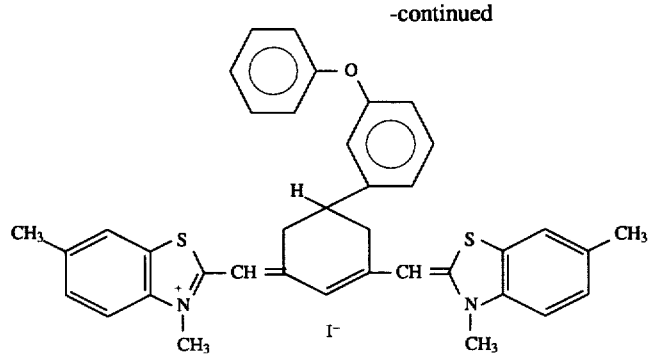
K-12
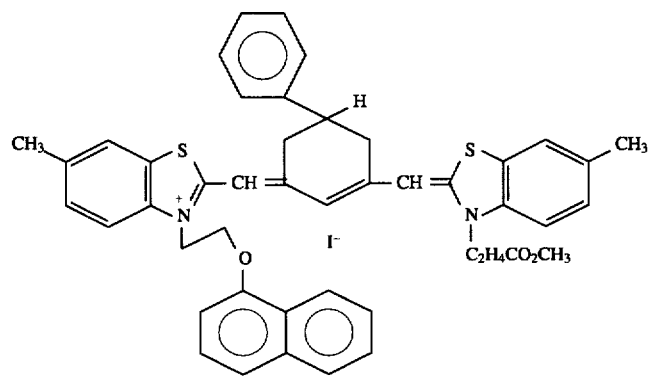
K-13
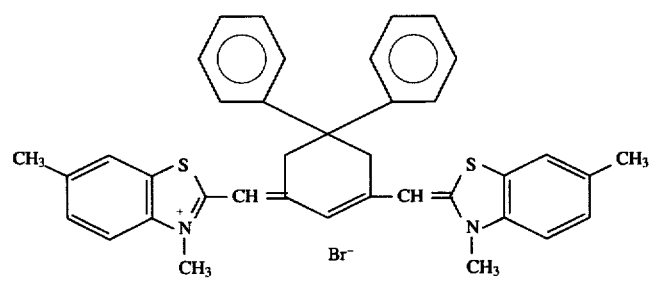
K-14
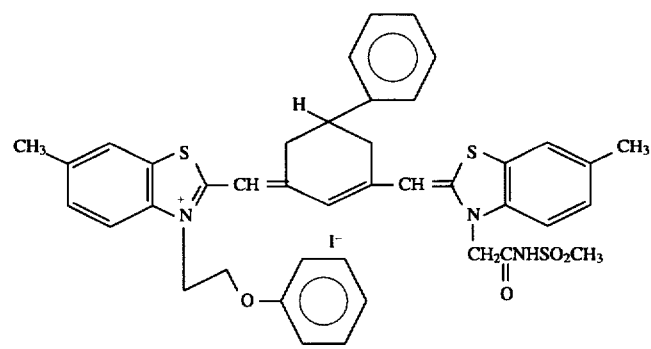

-continued
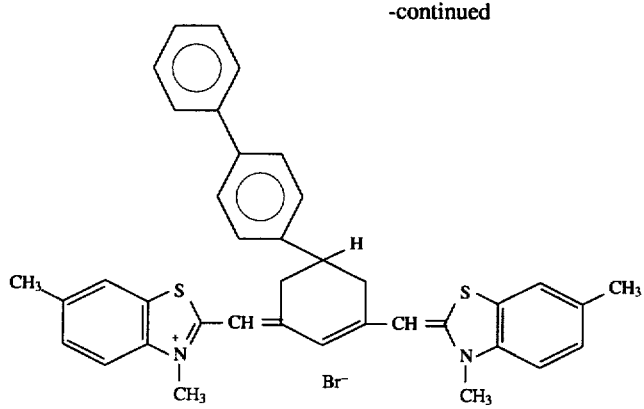
K-15
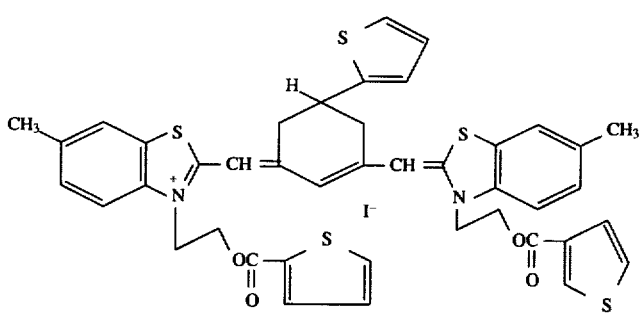
K-16
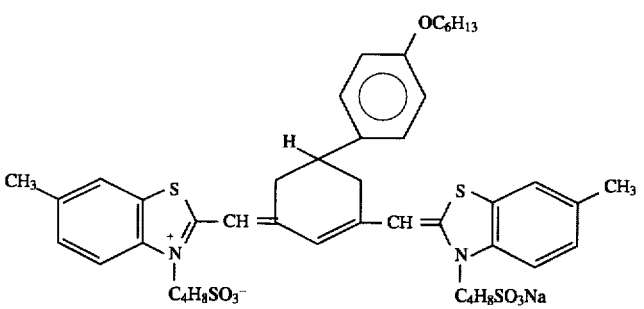
L-1
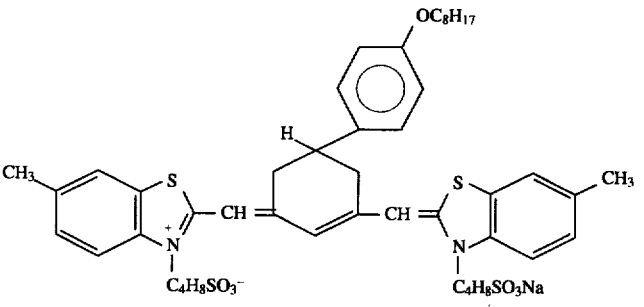
L-2
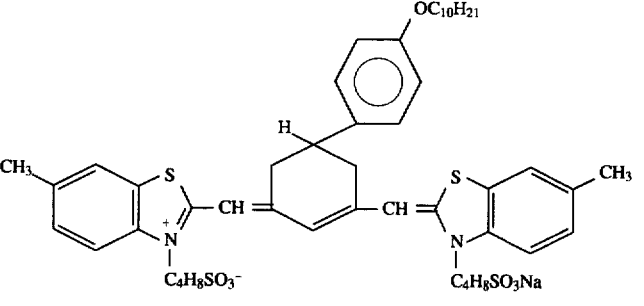
L-3

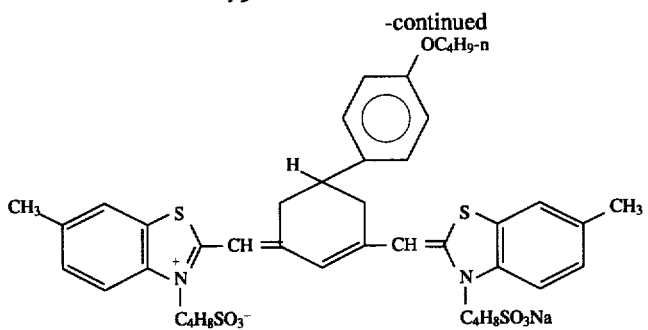
L-4
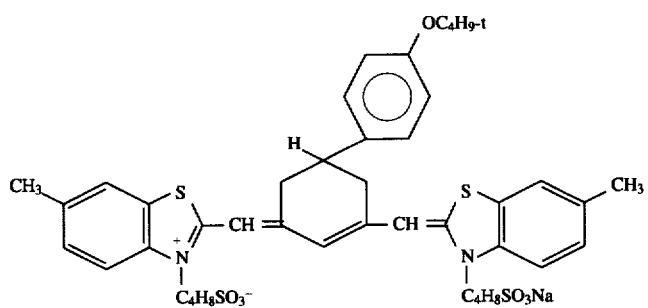
L-5
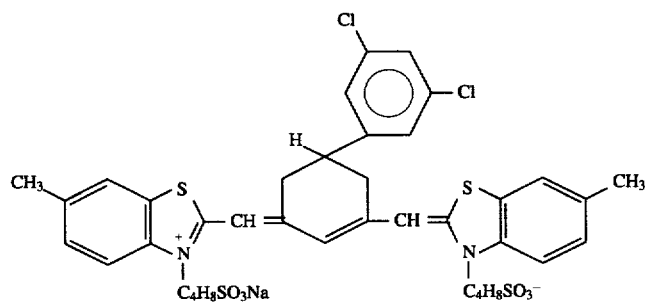
L-6
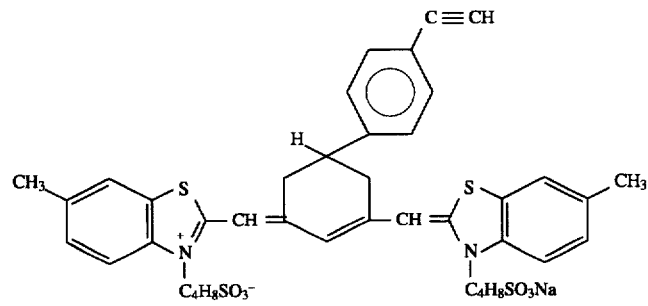
L-7
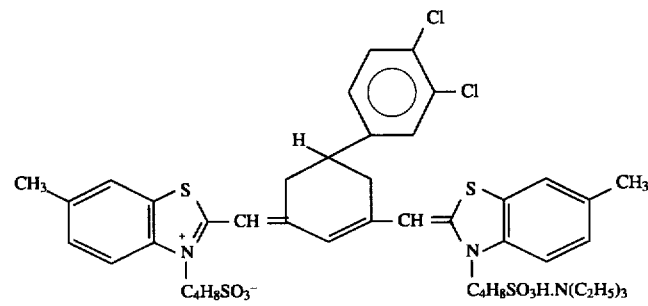
L-8

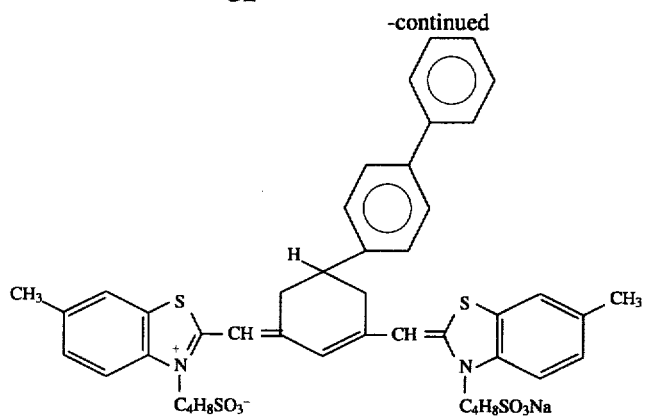
L-9
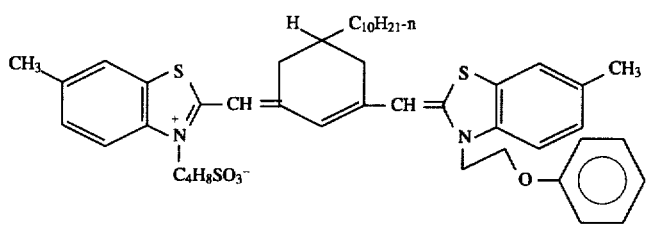
L-10
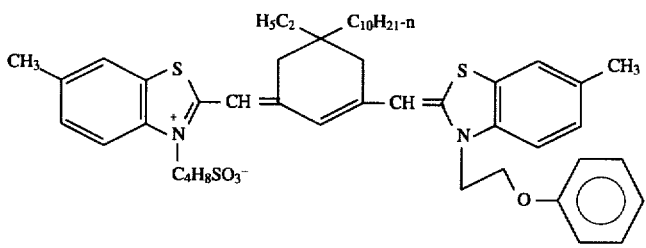
L-11
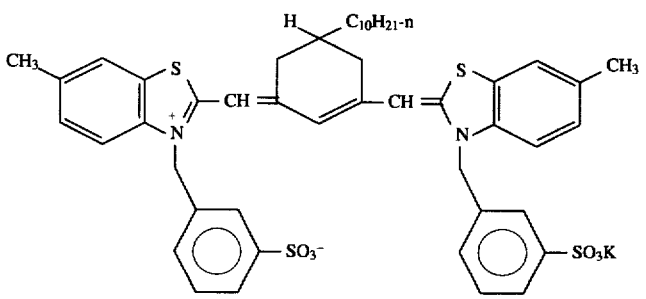
L-12
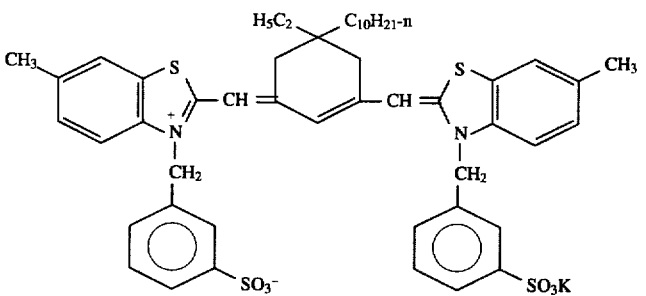
L-13

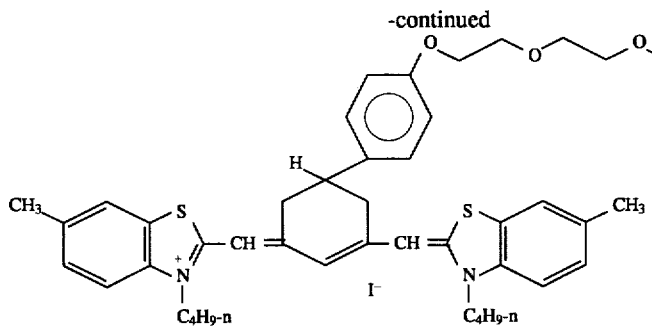

L-14

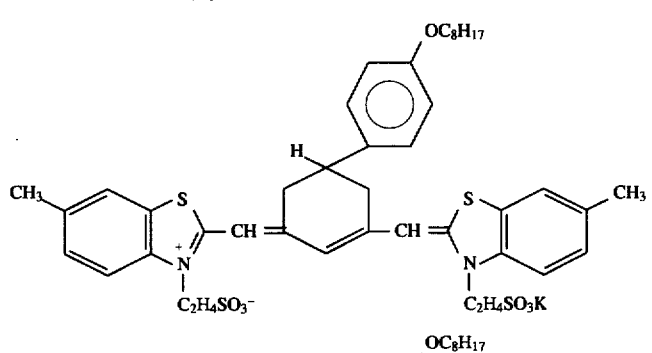

L-15

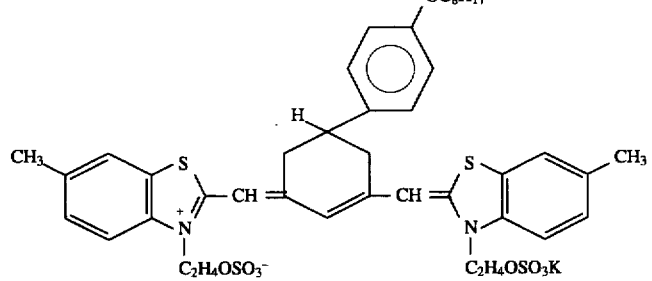

L-16

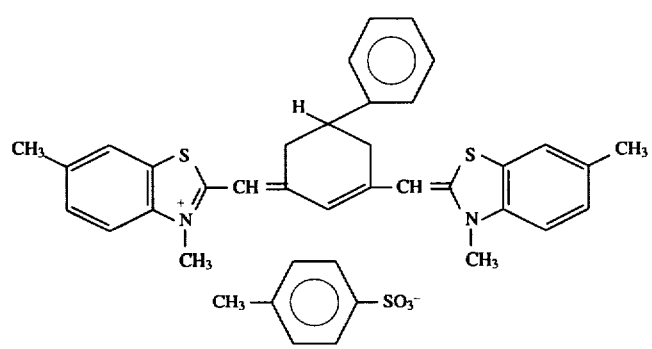

L-17

The polymethine dyes shown by formula (I) being used in the present invention can be synthesized by referring to the methods described in the following literatures.

a) F. M. Hamer, *Heterocyclic Compounds—Cyanine dyes and related compounds*, John Wikey & Sons, New York, London, 1964.

b) D. M. Sturmer, *Heterocyclic Compounds—Special topics in heterocyclic chemistry*, Chapter 8, Paragraph 4, pages 482 to 515, John Wiley & Sons, New York, London, 1977.

c) *Zh. Org. Khim.*, Vol. 17, No. 1, 167–169(1981), ibid., Vol. 15, No. 2, 400–407(1979), ibid., Vol. 14, No. 10, 2214–2221(1978), ibid., Vol. 13, No. 11, 2440–2443(1977), ibid., Vol. 19, No. 10, 2134–2142(1983), *UKr. Khim. Zh.*, Vol. 40, No. 6, 625–629(1974), *Khim. Geterotsikl. Soedin.*, No. 2, 175–178(1976), Russian Patent Nos. 420,643 and 341,823, JP-A-59-217761, U.S. Pat. Nos. 4,334,000, 3,671,648, 3,623,881, and 3,573,920, European Patent Publication Nos. 288,261A1, 102,781A1, and 102,782A2, and JP-B-48-46930 (the term "JP-B" as used herein meas an "examined Japanese patent publication").

d) JP-A-3-243944 (Examples).

Then, few examples of the synthesis of the methine dyes of formula (I) being used in the present invention are described below.

SYNTHESIS EXAMPLE 1

[Synthesis of Compound (A-1)]

85 86
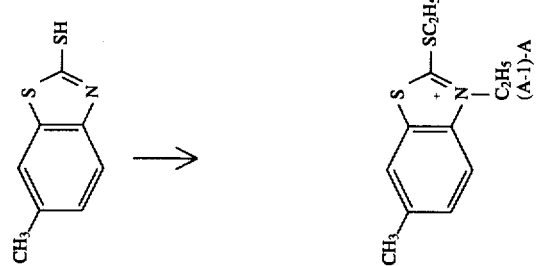
Formula 1
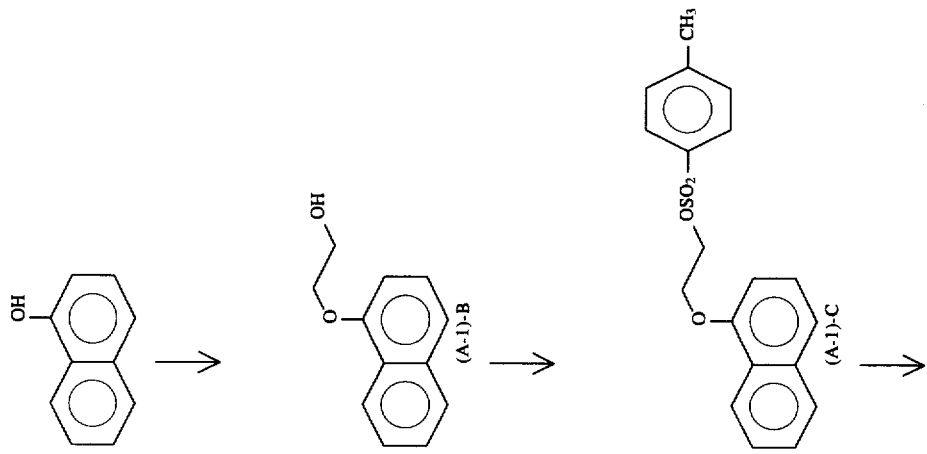

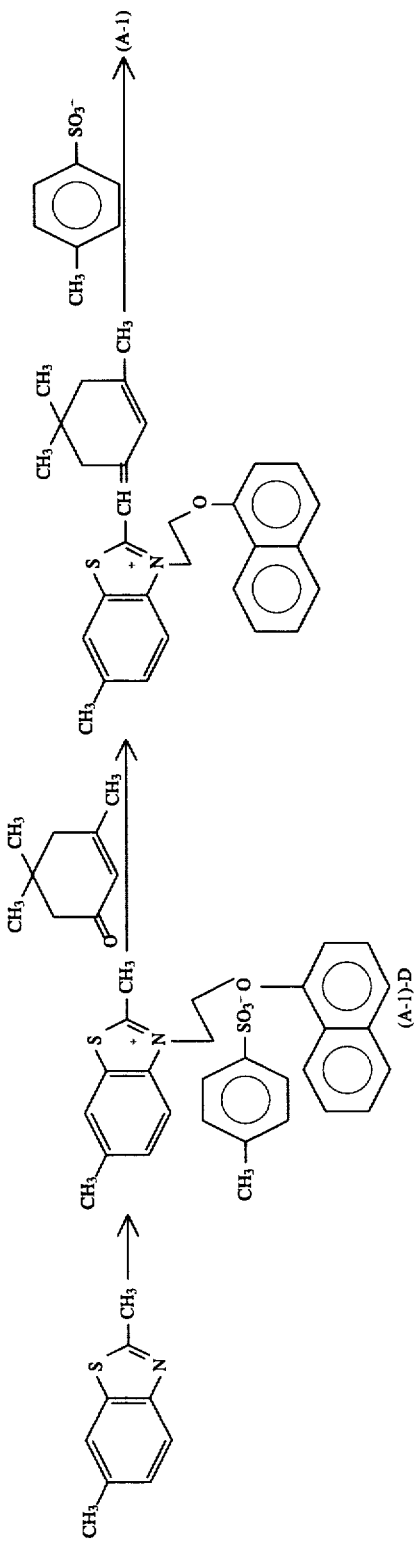

1) Synthesis of Compound (A-1)-A:

A mixture of 18.1 g of 2-mercapto-6-methylbenzothiazole and 25 g of ethyl p-toluenesulfonate was heated to 140° C. and stirred for 3 hours. Then, the temperatue of the mixture was lowered to 100° C., 30 ml of dimethylformamide was added to the mixture and the resultant mixture was gradually added to a mixed solvent of 50 ml of acetone and 200 ml of ethyl acetate with stirring to deposit crystals, which were collected by filtration and dried to provide 25 g (yield 66%) of compound (A-1)-A.

2) Synthesis of Compound (A-1)-B:

After suspending 28.8 g of 1-naphthol, 40.0 g of ethylenebromohydrin, and 120 g of anhydrous potassium carbonate, the suspension thus formed was refluxed for 5 hours under stirring vigorously. After cooling, the suspension was filtered by a glass filter and the filtrate was gradually poured into 1 liter of n-hexane with stirring to deposit crystals, which were collected by filtration and dried to propvide 21.0 g (yield 56%) of compound (A-1)-B.

3) Synthesis of Compound (A-1)-C:

After ice-cooling a mixture of 12.9 g of compound (A1)-B, 10.5 g of p-toluenesulfonic acid chloride, and 60 ml of dioxane, 9.6 ml of triethylamine was added dropwise to the mixture with stirring. After further stirring the resultant mixture for 2 hours at room temperature, the mixture was poured into ice-water to deposit crystals, which were collected by filtration and dried to provide 15.0 g (yield 79%) of compound (A-1)-C.

4) Synthesis of Compound (A-1)-D:

After heating a mixture of 14.9 g of compound (A-1)-C and 10 g of 2,6-dimethylbenzothiazole at 160° C. for 6 hours with stirring, the reaction mixture was cooled to 60° C. and then 10 ml of methanol, 10 ml of acetonitrile, and 100 ml of ethyl acetate were successively poured to the mixture to deposite crystals, which were collected by filtration and dried to provide 18.7 g (yield 78%) of compound (A-1)-D.

5) Synthesis of Compound (A-1):

After refluxing a mixture of 12.0 g of compound (A-1)-D, 4.6 g of isophorone, 2.4 g pf ammonium acetate, 8 ml of acetic acid, and 80 ml of toluene for 40 minutes, the reaction mixture was cooled and concentrated to dryness under a reduced pressure. To the concentrated mixture were added 100 ml of dichloromethane and 100 ml of water followed by stirring vigorously and the organic layer was concentrated to dryness under a reduced pressure. To the concentrated product were added 7 g of compound (A-1)-A, 80 ml of acetonitrile, and 12 ml of triethylamine and the resultant mixture was refluxed for 2 hours. After cooling the reaction mixture, crystals thus deposited were collected by filtration and recrystallized from methanol to provide 5.4 g (yield 28%) of compound (A-1).

$\lambda_{max}$(methanol)656 nm $\epsilon^{max}1.60 \times 10^5$

SYNTHESIS EXAMPLE 2

[Synthesis of Compound (G-2)]

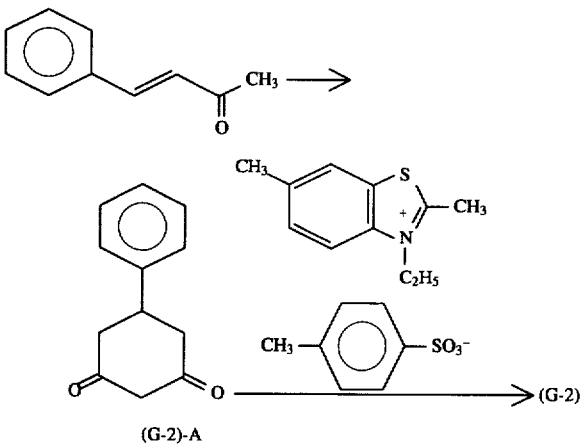

(G-2)-A

1) Synthesis of Compound (G-2)-A:

To a mixed liquid of 10 ml of methanol and 11 ml of a methanol solution of 28% sodium methylate was gradually added 9.25 g of diethyl malonate. The mixture was kept at 60° C., and after adding thereto 8.2 g of benzalacetophenone over a period of 10 minutes, the mixture was refluxed for 4 hours. After cooling the mixture to 40° C., 20 ml of an aqueous solution of 4.9 g of sodium hydroxide was added dropwise to the refluxed mixture and the resultant mixture was further heated to 80° C. for 40 minutes. To the resultant mixture was added 19.3 ml of concentrated hydrochloric acid under ice-cooling followed by stirring to deposit crystals, which were collected by filtration and dried to provide 10.0 g (yield 94%) of compound (G-2)-A.

2) Synthesis of Compound (G-2):

A mixture of 7.3 g of 3-ethyl-2,6-dimethylbenzothiazolium p-toluenesulfonate, and 1.9 g of compound (G-2)-A was heated to 160° C. for 5 hours with stirring. Then, after adding to the mixture 20 ml of methanol and 20 ml of acetonitrile, 1.5 g of sodium iodide was added to the mixture with stirring to deposit crystals, which were collected by filtration and recrystallized from ethanol to provide 1.5 g (yield 23%) of compound (G-2).

$\lambda_{max}$(methanol)652 nm $\epsilon^{max}1.66 \times 10^5$

Synthesis Example 3

[Synthesis of Compound (L-17)]

1) Synthesis of Compound (L-17)-A (Synthesis of 2,3,6-trimethylbezothiazolium p-toluenesulfonate):

A mixture of 28.29 of 2,6-dimethylbenzothiazole and 36.29 (0.195 mol) of methyl p-toluenesulfonate was kept at 165° C. for 5 hours. To the resultant mixture, 100 ml of acetone was added with stirring while cooling to deposit crystals, which were collected by filtration and washed with 50 ml of acetone to provide 51.39 (85%) of compound (L-17-A).

2) Synthesis of Compound (L-17):

A mixture of 1.87 g (0.01 mol) of 5-phenyl-1,3-dimedone, 8.38 g (0.024 mol) of L-17-A and 1.879 of trimethylborate was kept at 165° C. for 8 hours. To the resultant mixture, 25 ml of ethanol was added with stirring while cooling followed by adding 5 ml of aqueous solution of sodium carbonate (10%) under room temperature to deposit crystals, which was collected by filtaration 6 hours after addition of the aqueous solution of sodium carbonate and dried to provide 4.5 g (60%) of crude crystals.

The crystals thus obtained were refined using silica gel chromathography to obtain 4.07g (60%) of L-17.

Then, the compounds shown by the formulae (II) to (X) described above are explained.

In these formuale, the alkyl group, the alkylene group, the aryl group, the arylene group, the alkoxy group, the aryloxy group, the sulfamoyl group, the thiazolyl group, and other nitrogen-containing heterocyclic residue shown by $R^2$ to $R^9$ and $R^{11}$ to $R^{19}$ may be further substituted.

Specific examples of the foergoing groups and halogen atoms are shown below but the groups and halogen atoms are not limited to them.

That is, they are a halogen atom (e.g., fluorine, chlorine, and bromine), an alkyl group (e.g., methyl, ethyl, n-propyl, isopropyl, n-butyl, t-butyl, n-octyl, dodecyl, cyclopentyl, cyclohexyl, benzyl, and phenethyl), an aryl group (e.g., phenyl, naphthyl, and 4-methylphenyl), a nitrogen-containing heterocyclic residue (e.g., pyridyl, imidazolyl, piperidyl, and morpholino), an alkoxy group (e.g., methoxy, ethoxy, and butoxy), an aryloxy group (e.g., phenoxy and 2-naphthyloxy), a sulfamoyl group (e.g., unsubstituted sulfamoyl, N,N-dimethylsulfamoyl, and N-phenylsulfamoyl), an alkylene group (e.g., methylene, ethylene, —$(CH_2)_6$—and —$(CH_2)_8$-), and an arylene group (e.g., phenylene).

In the compounds shown by the formulae (II) to (X), the preferred compounds are those shown by the formulae (III), (VIII), (IX), and (X) and the more preferred compounds are those shown by the formulae (VIII), (IX), and (X).

Then, specific examples of the compounds shown by the formulae (II) to (X) are illustrated below but the invention is not limited to them.

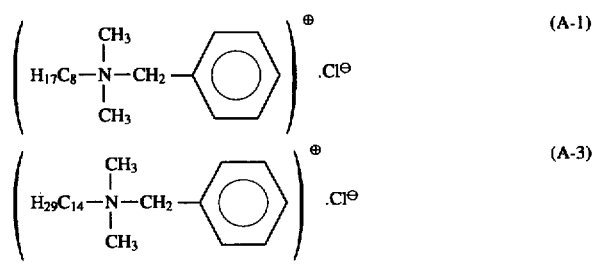

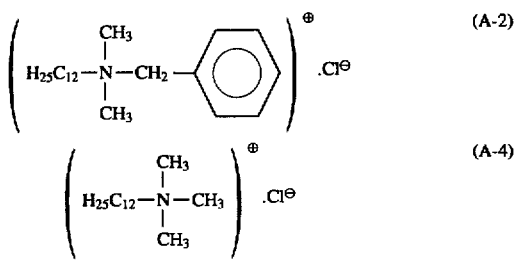

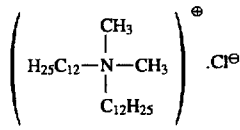

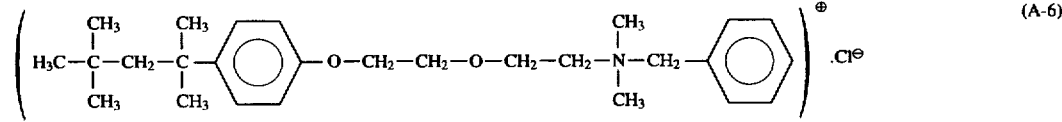

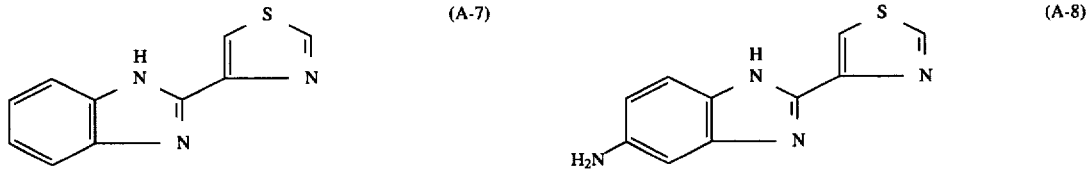

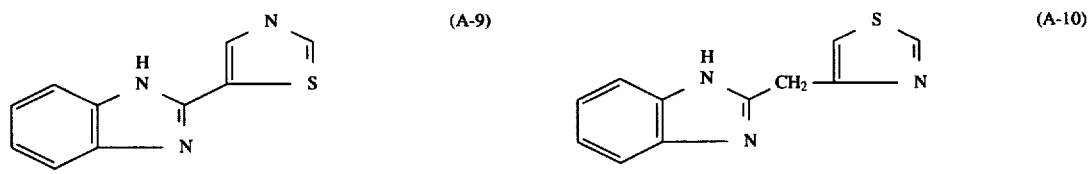

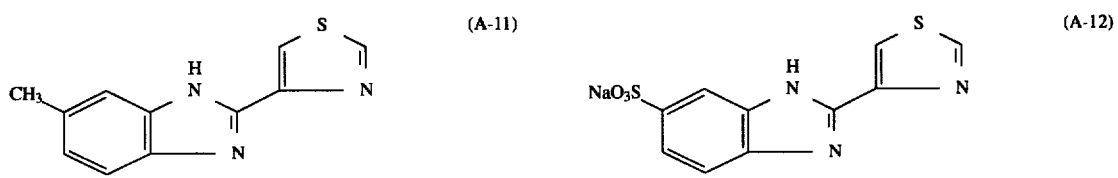

-continued

-continued

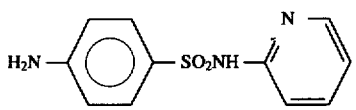 (A-34)

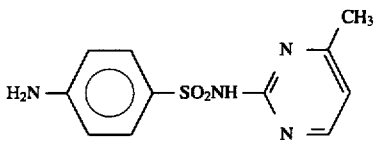 (A-35)

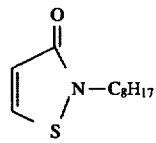 (A-36)

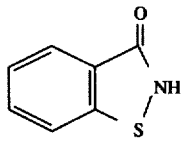 (A-37)

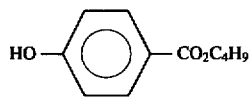 (A-38)

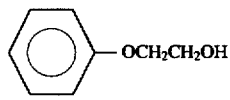 (A-39)

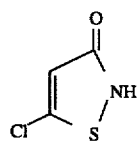 (A-40)

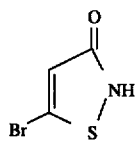 (A-41)

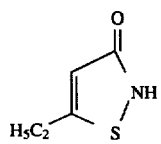 (A-42)

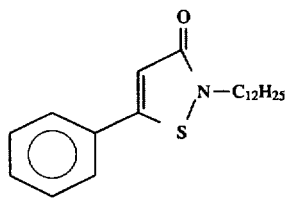 (A-43)

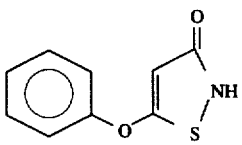 (A-44)

These compounds show excellent antibacterial and antifungal effects as disclosed, e.g., in JP-A-61-233743.

The compound shown by the formula (II) to (X) is incorporated in one or plural layers of silver halide emulsion layers and light insensitive layers such as interlayers, protective layers, etc.

The addition amount of the compound largely differs according to the kind of the light-sensitive material but is preferably from $5 \times 10^{-7}$ to $2 \times 10^{-3}$ mol/m$^2$.

The compound can be added to the layer(s) of a photographic light-sensitive material as a solution in an organic solvent such as methanol, ethanol, ethylene glycol, diethylene glycol, triethylene glycol, ethanolamine, diethanolamine, triethanolamine, etc., or as a dispersion in an aqueous solvent.

In the 1st or 3rd embodiment of the present invention, it is necessary that the content of calcium contained in the light-sensitive material is not more than 10 mg/m$^2$.

In this invention, the content of calcium is shown by the weight of the calcium ions, a calcium atom, and the calcium-containing compounds contained in 1 m$^2$ of a photographic light-sensitive material excluding the support converted into calcium atoms. As the determination method of the calcium content, a known analytical method is used. For example, the IPC analytical method described in detail in, e.g., *Kagaku no Ryouiki (Domain of Chemistry)*, Extra No. 127, published by Nankodo 1980 and V.A. Fassel, *Analytical Chemistry*, 46, 1110A(1974) can be used.

Calcium contained in a photographic light-sensitive material is usually carried in as an impurity in gelatin being used as a binder. Gelatin contains calcium salts originated in the raw materials and the production step thereof in an amount of several thousand ppm converted as a calcium atom. When a photographic light-sensitive material is prepared using such a gelatin, in the case of, for example, a color photographic paper, it contains about 20 mg/m$^2$ of calcium.

If the calcium content is over 10 mg/m$^2$, streaks undesirably form at continuous processing. By lowering the calcium content below 10 mg/m, a stable performance can be obtained even when continuous processing is carried out with a less replenishing amount of the developer. The calcium content is preferably not more than 8 mg/m$^2$, more preferably not more than 5 mg/m$^2$, and most preferably not more than 2 mg/m$^2$ (including 0 mg/m$^2$).

For reducing the calcium content in a photographic light-sensitive material, gelatin having a less calcium content is used as the binder or a method of removing calcium by treating a gelatin dispersed composition such as silver halide emulsions, coupler dispersions, etc., or a mixture thereof being used at the production of a photographic light-sensitive material with noodle water washing, a dialysis, a ultrafiltration, etc., can be used. In the present invention, it is preferred to use gelatin having a less calcium content. Also, in place of gelatin, other binder containing no calcium can be used.

For reducing the calcium content in gelatin, an ion-exchange treatment is generally preferably used. The ion-exchange treatment can be carried out by contacting an aqueous gelatin solution with an ion exchange resin, in particular, a cation exchange resin at the production or use of gelatin, as is disclosed in JP-A-63-296035.

Furthermore, as gelatin having a less calcium content, there is an acid-treated gelatin having less mixing of calcium at the production thereof.

In the present invention, it is preferred to use lime-treated gelatin subjected to an ion-exchange treatment for the preparation of various photographic compositions.

When the photographic light-sensitive material of the present invention is used as a color photographic paper, the color photographic material is constituted by successively forming at least one yellow coloring silver halide emulsion layer, at least one magenta coloring silver halide emulsion layer, and at least one cyan coloring silver halide emulsion layer on a reflective support.

In a general color photographic material, a color reproduction by a subtractive color process can be carried out by using color couplers each forming a dye in the complementary color relationship with a light sensitive to the silver halide emulsion containing the color coupler. In a general color photographic material, silver halide emulsions each is successively spectrally sensitized with a blue-sensitive spectral sensitizing dye, a green-sensitive spectral sensitizing dye, or a red-sensitive spectral sensitizing dye as the foregoing order of the colored layers and the color photographic material is formed by coating the silver halide emulsions in the order on a support. However, the disposition order of the silver halide emulsion layers may differ from the order described above in the present invention. That is, there are a case that it is preferred to dispose a light-sensitive emulsion layer containing silver halide grains having the largest mean grain size at the uppermost layer from the view point of quick processing and a case that it is preferred to dispose a magenta coloring light-sensitive layer at the lowermost layer from the view point of the storage stability under a light irradiation.

Also, the light-sensitive layers and the colored hues may not be a construction having the above-described correspondence and also at least one infrared sensitive silver halide emulsion can be used.

As the silver halide grains of at least one layer (preferably all the layers) of the silver halide emulsion layers being used in the present invention, silver chlorobromide grains containing at least 90 mol % silver chloride or silver chloride grains are preferred. In any cases, the content of silver chloride is preferably at least 95 mol %, and more preferably at least 98 mol %.

In the present invention, it is preferred that the silver halide emulsions contain substantially no silver iodide for quickening the development processing time. In the present invention, the term "containing substatially no silver iodide" means that the content of silver iodide is not more than 1 mol % and preferably not more than 0.2 mol %. On the other hand, for the purpose of increasing the high illumination sensitivity, increasing the spectral sensitizing sensitivity, or increasing the storage stability of the photographic light-sensitive material, there is a case of preferably using high silver chloride grains containing from 0.01 to 3 mol % silver iodide on the surface of the silver halide emulsion as described in JP-A-3-84545.

The halogen composition of the silver halide grains being used in the present invention may be different or same among the grains but by using the silver halide grains having the same halogen composition among the grains, it is easy to make the property of each silver halide grain homogeneous.

Also, as the distribution of the halogen composition in the inside of the silver halide grains, the silver halide grain of a so-called uniform-type structure wherein any portion of the silver halide grain has a same halogen composition, the silver halide grain of a so-called laminated layer-type structure wherein the halogen composition of the core of the inside of the silver halide grain is different from the halogen composition of the shell(s) (one layer or plural layers) surronding the core, or the silver halide grain of a structure having portions each having a different halogen composition in non-layer like at the inside or the surface of the silver halide grain (when such portions exist at the surface of the silver halide grain, the structure wherein the portions each having the different halogen composition junction to the corners, the edges, or the surface of the silver halide grain) can be properly selected for use.

For obtaining a high sensitivity, the use of one of the latter two types of the silver halide grains is more advantageous than the use of the silver halide grains of the uniform-type structure and also is preferred from the view point of the pressure resistance. When the silver halide grains have the foregoing structure, the boundary between the portions each having a different halogen composition may be a clear boundary or an indistinct boundary forming a mixed crystal by the differrence of halogen compositions, or may have a positively continuously changed structure.

In the high-silver chloride emulsion being used in the present invention, preferably a silver halide emulsion containing silver chlorobromide grains comprising at least 90 mol % silver chloride, the structure having a silver bromide locally rich phase (hereinafter, refer to "silver bromide local phase" or "silver bromide rich phase") in the inside and/or on the surface of the silver halide grain in the layer like or non-layer like as described above is preferred. The silver halide emulsion is more preferred which contains silver chlorobromide grains comprising at least 90 mol % silver chloride having a silver bromide rich phase on the surface of the grains. The halogen composition of the foregoing lacal phases is preferably at least 10 mol %, and more preferably from 20 mol % to 100 mol % in the silver bromide content.

The silver bromide content of the silver bromide local phase is analyzed by X-ray diffraction method disclosed, for example, in *Kozo Kaiseki (Structural Analysis)*, New Experimental Chemistry Course 6, edited by Japanese Chemical Society, publisehd by Maruzen, etc. The local phases may be exsist at the inside of the grain or at the edge, at the corner or on the phase of the grain surface. One preferred example thereof includes one formed on the corner portions of the grain by epitaxial growth.

It is also effective to increase the silver chloride content in the silver halide emulsion in order to reduce replenishing amount of the developing processing solution. In such a case, an emulsion comprising almost pure silver chloride, such as an emulsion having 98 to 100 mol % of silver choride content, is also preferably used.

The mean grain size of the silver halide grains (the diameter of a circle having the same area as the projected area of the silver halide grain is defined as the grain size and the number mean value of the grain sizes is defined as the mean grain size) contained in the silver halide emulsion being used in the present invention is preferably from 0.1 μm to 2 μm.

Also, the grain size distribution is preferably a so-called monodispersion that the coefficient of variation (the standard deviation of the grain size distribution divided by the mean grain size) is not more than 20%, preferably not more than 15%, and more preferably not more than 10%. In this case, for the purpose of obtaining a wide latitude, it is preferably carried out to use the foregoing monodisperse silver halide emulsion by blending in a same emulsion layer or by coating as double layers.

The form of the silver halide grains contained in the silver halide emulsion being used in the present invention may be a regular crystal form such as cubic, dodecahedral, octahedral, etc., an irregular crystal form such as spherical, tabular, etc., or a composite form thereof. Also, the silver halide grains may be composed of a mixture of the grains having various crystal forms. In the present invention, it is desirable that the content of the silver halide grains having the foregoing regular crystal form is at least 50%, preferably at least 70%, and more preferably at least 90%.

Furthermore, a silver halide emulsion wherein tabular silver halide grains having an average aspect ratio (circleconverted diameter/thickness) of at least 5, and preferably at least 8 account for over 50% of the total silver halide grains can be preferably used in the present invention.

The silver chlorobromide emulsion or the silver chloride emulsion being used in the present invention can be prepared using the methods described in P. Glafkides, *Chimie et Physique Photographique* (published by Paul Montel Co., 1067), G. F. Duffin, *Photographic Emulsion Chemistry* (published by Focal Press Co., 1966), V. L. Zelikman et al, *Making and Coating Photographic Emulsion* (published by Focal Press Co., 1964), etc.

That is, the silver halide emulsion can be prepared by an acidic method, a neutral method, an ammonia method, etc., and as a system for reacting a soluble silver salt and a soluble halide, a single jet method, a double jet method, or a combination thereof may be used. A so-called reverse mixing method of forming silver halide grains in the existence of excess silver ions can also be used. As one system of the double jet method, a so-called controlled double jet method of keeping a constant pAg in a liquid phase of forming silver halide grains can also be used. According to the method, a silver halide emulsion containing silver halide grains having a regular crystal form and substantially uniform grain size can be obtaiend.

It is preferred that the local phases of the silver halide grains being used in the present invention or the substrate thereof contains a different kind metal ion or the complex ion thereof. The preferred metal for the metal ion is selected from the metals belonging to group VIII and group IIb of the periodic table or the complexes of these metals and lead and thallium.

For the local phases, the metal ion selected from an iridium ion, a rhodium ion, an iron ion, etc., and the complex ions thereof can be mainly used and for the substrate thereof, a combination of the metal ions selected from an osmium ion, an iridium ion, a rhodium ion, a platinum ion, a ruthenium ion, a palladium ion, a cobalt ion, a nickel ion, an iron ion, etc., or the complex ions therof can be used.

Also, the kind and the concentration of the metal ion or ions may be changed between the local phases and the substrate thereof. Furthermore, plural kinds of these metals may be used. In particular, it is preferred that an iron compound or an iridium compound exists in the silver bromide local phases.

The metal compound(s) providing the metal ion(s) are incorporated in the local phases of silver halide grains being used in the present invention and/or other grain portions (substrate) by a mean of adding the metal compound to an aqueous solution of gelatin which becomes the dispersion medium at the formation of silver halide grains, an aqueous solution of a halide, an aqueous solution of a silver salt, or other aqueous solution or by adding thereto as the form of silver halide fine grains previously containing the metal ion and dissolving the fine grains.

The incorporation of the metal ion(s) being used in the present invention into the silver halide grains can be carried out before the formation of the metal ion incorporated in the grains, during the formation of the grains, or directly after the formation of the grains. The time for adding the metal ion can be selected according to the position of the metal ion incorporated in the silver halide grain.

The silver halide emulsions being used in the present invention are usually subjected to a chemical sensitization.

As the chemical sensitization method, a chemical sensitization using a chalcogen sensitizer (specifically, there are a sulfur sensitization by the addition of an unstable sulfur compound, a selenium sensitization with a selenium compound, and a tellurium sensitization with a tellurium compound, a noble metal sensitization such as a gold sensitization, and a reduction sensitization can be used singly or as a combination thereof. As the compounds being used for the chemical sensitizations, the compounds described in JP-A-62-215272, page 18, right lower column to page 22, right upper column are preferably used.

The silver halide emulsion being used in the present inventions are so-called surface latent image-type silver halide emulsions of forming latent images mainly on the surface of the silver halide grains.

To the silver halide emulsions being used in the present invention can be added various compounds or the precursors thereof for the purposes of preventing the formation of fog during the production, storage, or photographic processing of the photographic light-sensitive material, or stabilizing the photographic performance of the photographic light-sensitive material. Specific examples of the preferred compounds being used are described in JP-A-62-215272, pages 39 to 72. Furthermore, the 5-arylamino-1,2,3,4-thiatriazole compounds (said aryl residue has at least one electron attracting group) described in EPO 447,647 are also preferably used.

In the photographic light-sensitive material of the present invention, a spectral sensitizing dye which is used together with the methine sensitizing dye being used in this invention or which is used for the spectral sensitization of the blue, green, and red regions of light-sensitive emulsions contained in other sensitive layer(s) than the layer spectrally sensitized by the methine dye being used in this invention disclosed, for example, in F. M. Harmer, *Heterocyclic Compounds-Cyanine Dyes and Related Compounds* (published by John Wiley & Sons, New York, London, 1964) can be used. Specific examples of the compound and a spectral sensitizing method which are preferably used in the present invention are described in JP-A-62-215272, page 22, right upper column, to page 38. Also, in particular, as such a spectral sensitizing dye which can be used together with the methine dye being used in this invention as a red-sensitive spectral sensitizing dye for the silver halide grains having a high silver chloride content, the spectral sensitizing dyes described in JP-A-3-123340 are very preferable from the view point of the stability, the adsorptive strength, the temperature dependence of light exposure, etc.

In the case of spectral sensitizing an infrared region with a good efficiency in the photographic light-sensitive material, the sensitizing dyes described in JP-A-3-15049, page 12, left upper column to page 21, left lower column, JP-A-3-20730, page 4, left lower column to page 15, left lower column. EP 0,420,011, page 4, line 21 to page 6, line 54, EP 0,420,011, page 4, line 12 to page 10, line 33, EP 0,443,466, and U.S. Pat. No. 4,975,362 are preferably used.

For incorporating the foregoing spectral sensitizing dyes including the methine sensitizing dye of the formula (I) being used in the present invention in the silver halide emulsion, they may be directly dispersed in the emulsion or may be added to the emulsion as a solution thereof in a solvent such as water, methanol, ethanol, propanol, methyl cellosolve, 2,2,3,3-tetrafluoropropanol, etc., or as a mixture thereof. (hereinafter, "spectral sensitizing dye" includes both the methine sensitizing dye of formula (I) and other spectral sensitizing dye used in the present invention.) Also, these sensitizing dyes may be added to the solution as an aqueous solution thereof containing an acid or a base as described in JP-B-44-23389, JP-B-44-27555, JP-B-57-22089, etc., or may be added to the emulsion as an aqueous solution or a colloid dispersion thereof containing a surface active agent as described in U.S. Pat. Nos. 3,822,135, 4,006,025, etc. Also, a solution of the sensitizing dyes dissolved in a solvent substantially immiscible with water, such as phenoxy ethanol, etc., is dispersed in water or an aqueous hydrophilic colloid solution and the dispersion may be added to the emulsion. Furthermore, the sensitizing dyes are directly dispersed in an aqueous hydrophilic colloid solution and the dispersion may be added to the emulsion as disclosed in JP-A-53-102733 and JP-A-58-105141.

The time for adding the sensitizing dyes to the silver halide emulsion may be any time in the production of the emulsion, which is konwn to be useful. That is, the time can be selected from the step before the formation of the silver halide grains, the step of forming the silver halide grains, the step of from directly after the formation of the silver halide grains to before entering a water washing step, the step before the chemical sensitization of the silver halide emulsion, the step during the chemical sensitization, the step of from directly after the chemical sensitization to solidifying the emulsion by cooling, and the step of preparing the coating liquid of the silver halide emulsion.

Most usually, the addition of the sensitizing dyes is caried out in the step of from finishing the chemical sensitization of the silver halide emulsion to the step before coating the emulsion, but the sensitizing dyes can be added to the silver halide emulsion at the same time of carrying out a chemical sensitization to carry out the spectral sensitization simultaneously with the chemical sensitization as described in U.S. Pat. Nos. 3,628,969 and 4,225,666, the addition of the sensitizing dyes can be carried out prior to the chemical sensitization as described in JP-A-58-113928, and also the sensitizing dyes can be added to the silver halide emulsion before completing the formation of the precipitation of the silver halide grains to initiate the spectral sensitization. Furthermore, the sensitizing dyes can be separately added to the silver halide emulsion, that is, a part of the sensitizing dyes can be added thereto prior to the chemical sensitization and the residue can be added after the chemical sensitization as disclosed in U.S. Pat. No. 4,225,666, and also the addition of the sensitizing dyes may be any time during the formation of the silver halide grains, such as the method disclosed in U.S. Pat. No. 4,183,756.

In these methods, the method of adding the sensitizing dyes to the silver halide emulsion before the water-washing step or before the chemical sensitization of the emulsion is preferred.

The addition amount of these spectral sensitizing dyes is in a wide range according to a desired case and is in the range of preferably from $0.5 \times 10^{-6}$ mol to $1.0 \times 10^{-2}$ mol, and more preferably from $1.0 \times 10^{-6}$ mol to $5.0 \times 10^{-3}$ mol.

In the present invention, when a sensitizing dye having a spectral sensitizing sensitivity in from a red region to an infrared region, it is preferred to use together each of the compounds described in JP-A-2-157749, page 13, right lower column to page 22, right lower column 2. By using these compounds, the storage stability of the photographic light-sensitive material, the stability of processing, and the super-sensitization effect can be specifically increased.

In these compounds described in JP-A-2-157749, the use of the compounds shown by the formulae (IV), (V), and (VI) together with the sensitizing dyes is particularly preferred. The foergoing compound is used in an amount of from $0.5 \times 10^{-5}$ mol to $5.0 \times 10^{-2}$ mol, and preferably from $5.0 \times 10^5$ mol to $5.0 \times 10^{-3}$ mol per mol of the silver halide, and there is an advantageous using amount in the range of 0.1 times to 10,000 times, preferably from 0.5 times to 5,000 times per mol of the sensitizing dye.

The photographic light-sensitive material of the present invention may be exposed by a visible light or an infrared light. The light exposure method may be a low-illuminance exposure or a high-illuminance exposure. As a preferred exposure method of the high-illuminance exposure, there is a laser scanning exposure system wherein the exposure time per one pixel is shorter than $10^{-4}$ second, and more preferably shorter than $10^{-6}$ second.

Also, at the light exposure, it is preferred to use the band stop filter described in U.S. Pat. No. 4,880,726. By the use of the filter, a light color mixing is removed and the color reproducibility is greatly improved.

The image-exposed photographic light-sensitive material can be subjected to conventional color photographic processing but in the case of the color photographic light-sensitive material of the present invention, it is preferred to apply blix (bleach-fix) processing after a color development for the purpose of quick processing. In particular, in the case of using the foregoing high-silver chloride emulsion, pH of the blix liquid is preferably lower than about 6.5, and more preferably lower than about 6 for the purpose of the acceleration of desilvering, etc.

As the silver halide emulsions and other materials (additives, etc.), and also the photographic constituting layers (the layer disposition, etc.) being used for the photographic light-sensitive materials of the present invention, and the processing processes and additives for processing for processing the photographic light-sensitive materials, those described in the specifications of the patent applications shown in the following table (Table 1) are preferably used.

TABLE 1

| Photographic Element, etc. | JP-A-62-215272 | JP-A-2-3314 | EP 355.660A2 |
|---|---|---|---|
| Silver Halide Emulsion | p. 10, right upper col., line 6 to p. 12, left lower col. line 5, and p. 12, right lower col., line 4 up to left upper col., end line 17. | p. 28, right upper col., line 16 to p. 29, right lower col., line 11 and p. 30 lines 2 to 5. | p. 45, line 53 to p. 47, line 3 and pp. 47, lines 20 to 22 |
| Silver Halide Solvent | p. 12, left lower col., lines 6 to 14 and p. 13, left upper col., line 3 up to p. 18, left lower col., end line. | — | — |
| Chemical Sensitizer | p. 12, left lower col., line 3 up to right lower col., line 5 up and p. 18, right lower col., line 1 to p. 22, right upper col., line | p. 29, right lower col., lines 12 to end line. | p. 47. lines 4 to 9. |

TABLE 1-continued

| Photographic Element, etc. | JP-A-62-215272 | JP-A-2-3314 | EP 355.660A2 |
|---|---|---|---|
| Spectral Sensitizer (Spectral Sensitizing Method) | 9 up. p. 22, right upper col., line 8 up to p. 38, end line. | p. 30, left upper col., lines 1 to 13. | p. 47. lines 10 to 15 |
| Emulsion Stabilizer | p. 39, left upper col., line 1 to p. 72, right upper col., end line. | p. 30, left upper col. line 14 to right upper col. line 1. | p. 47, lines 16 to 19. |
| Development Accelerator | p. 72, left upper, line 1 to p. 91, right upper col., line 3. | — | — |
| Color Coupler (Cyan, Magenta, Yellow Coupler) | p. 91, right upper col., line 4 to p. 121, left upper col., end line 6. | p. 3, right upper col., line 14 to p. 18, left upper col., end line and p. 30, right upper col., line 6 to p. 35, right lower col., line 11. | p. 4, lines 15 to 27, p. 5, line 30 to p. 28 end line, p. 45, lines 29 to 31, p. 47, line 23 to p. 63 line 50. |
| Coloring Intensifier | p. 121, left upper col., line 7 to p. 125, right upper col., line 1. | — | — |
| U.V. Absorber | p. 125, right upper col., line 2 to p. 127, left lower col., end line. | p. 37, right lower col., line 14 to p. 38, left upper col., line 19. | 65, lines 22 to 31. |
| Fading preventing Agent (Image Stabilizer) | p. 127. right lower col., line 1 to p. 137, left lower col., line 8. | p. 36. right upper col., line 12 to p. 37, left upper col., line 19. | p. 4. line 30 to p. 5, line 23, p. 29. line 1 to p. 45, line 25, p. 45, lines 33 to 40, p. 65. lines 2 to 21. |
| High-Boiling and/or Low-Boiling Organic Solvent | p. 137, left lower col., line 9 to p. 144, left upper col., end line | p. 35, right lower col., line 14 to p. 36, left upper col., line 4 up. | p. 64, lines 1 to 51. |
| Dispersion Method of Photographic Additive | p. 144, left lower col., line 1 to p. 146, right upper col., line 7. | p. 27, right lower col., line 10 to p. 28, left upper col., end line and p. 35, right lower col., line 12 to p. 36, right upper col., line 7. | p. 63, line 51 to p. 65 line 56. |
| Hardening Agent | p. 146, right upper col., line 8 to p. 155, left lower col. line 4. | — | — |
| Developing Agent Precursor | p. 155, left lower col., line 5 to right lower col., line 2. | — | — |
| DIR Compound | p. 155, right lower col., lines 3 to 9. | — | — |
| Support | p. 155, right lower col., line 19 to p. 156, left upper col., line 14. | p. 38, right upper col., line 18 to p. 39, left upper col., line 3. | p. 66, line 29 to p. 67 line 13. |
| Photographic Layer Construction | p. 156, left upper col., 15 to right lower col., line 14. | p. 28, right upper col., lines 1 to 15. | p. 45, line 41 to p. 52 |
| Dye | p. 156, right lower col., line 15 to p. 184, right lower col., end line | p. 38, left upper col., line 12 to right upper col. line 7. | p. 66, lines 18 to 22. |
| Color Mixing Preventing Agent | p. 185, left upper col., line 1 to p. 188, right lower col., line 3. | p. 36, right upper col., lines 8 to 11. | p. 64, line 57 to p. 65 line 1. |
| Gradation Controlling Agent | p. 188, right lower col., lines 4 to 8. | — | — |
| Stain Preventing Agent | p. 188, right lower col., line 9 to p. 193, right lower col., line 10 | p. 37, left upper col., end line right lower col., line 13. | p. 65, line 32 to p. 66 line 17. |
| Surface Active Agent | p. 201, left lower col., line 1 to p. 210, right upper col., end line. | p. 18, right upper col., line 1 to p. 24, right lower col., end line and p. 27, left lower col., line 10 up to right lower col., line 9. | — |
| Fluorine-Containing Compound (Antistatic Agent, Coating Aid, Lubricant, Adhesion Preventing Agent, etc.) | p. 210, left lower col., line 1 to p. 222, left lower left lower col., line 5. | p. 25, left upper col., line 1 to p. 27, right lower col., 9. | — |
| Binder (Hydrophilic Colloid) | p. 222, left lower col., line 6 to p. 225, right upper col., end line. | p. 38, right upper col., lines 8 to 18. | p. 66, lines 23 to 28. |
| Tackifier | p. 225, right upper col., line 1 to p. 227, right upper col., line 2. | — | — |
| Antistatic Agent | p. 227, right upper col., line 3 to p. 230, left upper col., line 1. | — | — |
| Polymer Latex | p. 230, left upper col., line 2 to p. 239, end line. | — | — |
| Matting Agent | p. 240, left upper col., line 1 to right upper col., end line. | — | — |
| Photographic Processing Process (Processing Steps, Additives, etc.) | p. 3, right upper col., line 7 to p. 10, right upper col., line 5. | p. 39, left upper col., line 4 to p. 42, left upper col., end line. | p. 67, line 14 to p. 69 line 28. |

(Note in Table 1): The cited portions of JP-A-62-215272 include the amended contents by the "Amendment" dated March 16, 1987 described at the end of the publication.

Also, in the color couplers described above, as the yellow couplers, the use of so-called short wave-type yellow couplers described in JP-A-63-231451, JP-A-63-123047, JP-A-

63-241547, JP-A-1-173499, JP-A-1-213648, and JP-A-1-250944 is preferred.

As the high-boiling organic solvents, which can be used in the present invention, for photographic additives such as cyan couplers, magenta couplers, yellow couplers, etc., the compounds immiscible with water and having a melting point of not higher than 100° C. and a boiling point of at least 140° C., which are good solvent for couplers can be used. The melting point of the high-boiling organic solvent is preferably not higher than 80° C. and the boiling point of the high-boiling organic solvent is preferably at least 160° C., and more preferably at least 170° C.

The details of these high-boiling organic solvents are described in JP-A-62-215272, page 137, right lower column to page 144, right upper column.

Also, the cyan, magenta, or yellow coupler is impregnated in a loadable latex polymer (as described, e.g., in U.S. Pat. No. 4,203,716) in the presence or absence of the foregoing high-boiling organic solvent or is dissolved in the organic solvent together with a polymer which is insoluble in water and soluble in an organic solvent, and can be dispersed by emulsification in an aqueous solution of a hydrophilic colloid.

As such a polymer, the homopolymers or copolymers described in U.S. Pat. No. 4,857,449, columns 7 to 15 and PCT WO 88/00723, pages 12 to 30 are preferably used, the methacrylate series polymers or acrylamide series polymers are more preferred, and the acrylamide series polymers are particularly preferred in the point of the color image stability, etc.

It is preferred to use the color image storage stability improving compound as described in EP 0,277,589A2 together with each coupler for the color photographic light-sensitive material of the present invention. The use of the foregoing compound together with a pyrozoloazole coupler or a pyrrolotriazole coupler is particularly preferred.

That is, the use of the compound, which causes chemical bonding with an aromatic amino color developing agent remaining after color development processing to form a chemically inactive and substantially colorless compound, described in the foregoing EP patent specification and/or the compound, which causes chemical bonding with the oxidation product of an aromatic amino color developing agent remaining after color development processing to form a chemically inactive and substantially colorless compound, described in the foregoing EP patent specification is preferred for preventing the occurrence of stains by the formation of colored dyes formed by the reaction of couplers and the color developing agent or the oxidation product thereof remaining in the emulsion layers of the color photographic material during the storage thereof after photographic processing and the occurrence of other undesirable side reactions.

Also, as the cyan couplers being used in the present invention, in addition to the diphenylimidazole series cyan couplers described in JP-A-2-33144, the 3-hydroxypyridine series cyan couplers described in EP 0,333,185A2 (in particular, two-equivalent coupler formed by bonding a chlorine-releasing group to the four-equivalent coupler illustrated as Coupler (42) in the specification, and Couplers (6) and (9) are particularly preferred), the cyclic active methine series cyan couplers described in JP-A-64-32260 (in particular, Couplers 3, 8, and 34 illustrated as specific examples in the specification are preferred), the pyrrolopyrazole-type cyan couplers described in EP 0,456,226A1, the pyrroloimidazole-type cyan couplers described in EP 0,484,909, and the pyrrolotriazole-type cyan couplers described in EP 0,491,197A1 and EP 0,488,248 are preferably used. In these cyan couplers, the use of the pyrrolotriazole-type cyan couplers is particularly preferred.

As the yellow couplers being used in the present invention, in addition to the yellow couplers described in Table 1, the acrylacetamido-type yellow couplers having a 3membered to 5-membered cyclic structure at the acryl group described in EP 0,447,969A1, the malondianilido-type yellow couplers having a cyclic structure described in EP 0,482,552A1, and the acylacetamido-type yellow couplers having a dioxane structure described in U.S. Pat. No. 5,118,599 are preferably used. In these yellow couplers, the use of the acylacetamido-type yellow couplers wherein the acyl group is a 1-alkylcyclopropane-1-carbonyl group and the malondianilido-type yellow couplers wherein one of the anilidos constitutes an indoline ring is particularly preferred. These couplers can be used singly or as a combiantion thereof.

As the magenta coupler being used in the prsent invention, the 5-pyrazolone series magenta couplers and the pyrazoloazole series magenta couplers as described in Table 1 are used but in the point of the hue, the color image stability, the coloring property, etc., the use of the pyrazolotriazole-type magenta couplers wherein a secondary or tertiary alkyl group is directly bonded to the 2-, 3-, or 6-position of the pyrazolotriazole ring as described in JP-A-61-65245, the pyrazoloazole-type magenta coupler having a sulfonamido group in the molecule as described in JP-A-61-65246, the pyrazoloazole-type magenta couplers having an alkoxyphenylsulfonamido ballast group as described in JP-A-61-147254, and the pyrazoloazole-type magenta couplers having an alkoxy group or an aryloxy group at the 6-position thereof as described in EP 0,226,849A and EP 0,294,785A is preferred.

As the processing process for the color photographic light-sensitive materials of the present invention, in addition to the processing processes described in Table 1 above, the use of the processing materials and the processing processes described in JP-A-2-207250, page 26, right lower column, line 1 to page 34, right upper column, line 9 and JP-A-4-97355, page 5, left upper column, line 17 to page 18, right lower column, line 20 is preferred.

Then, the present invention is described practically by the following examples but the invention is not limited to these examples.

EXAMPLE 1

To an aqueous solution of 3% lime-treated gelatin was added 6.6 g of sodium chloride and then 3.2 ml of N,N'-dimethylimidazolidine-2-thion (1% aqueous solution) was added to the mixture. After adjusting pH of the solution thus formed to 3.5, an aqueous solution containing 0.2 mol of silver nitrate and an aqueous solution containing 0.12 mol of sodium chloride and 0.8 mol of potassium bromide were added to the solution with stirring vigorously at 72° C. followed by mixing. Then, an aqueous solution containing 0.8 mol of silver nitrate and an aqueous solution containing 0.48 mol of sodium chloride and 0.32 mol of potassium bromide were added to the mixture with stirring vigorously at 72° C. followed by mixing. In this case, over the period from the time when ⅞ of the addition amount of the reaction liquids being added in the 2nd addition step to finishing the addition of the total addition amount of them, $2 \times 10^{-8}$ mol of potassium hexachloroiridate(IV) and $6 \times 10^{-6}$ mol of potassium hexacyanoferrate(II) were introduced into the reaction vessel. After keeping the resultant mixture for 5 minutes at 72° C., desalting and water-washing were applied to the reaction mixture and further, 90.0 g of lime-treated gelatin was added thereto.

Then, after adjusting pH of the silver halide emulsion thus obtained to 6.5, spectral sensitizing dyes B (shown below) were added to the emulsion at 58° C. and further sodium thiosulfate and chloroauric acid were added to the emulsion, whereby a spectral sensitization, a sulfur sensitization, and a gold sensitization were applied to the silver halide emulsion. At finishing the chemical sensitization, 80 mg of 1-(3-methylureiodphenyl)-5-mercaptotetrazole was added to the emulsion for the purpose of stabilization and the prevention of the formation of fog.

The silver chlorobromide emulsion (cubic silver halide grains having a mean grain size of 0.79 μm and the variation coefficient of the grain size distribution of 7%, silver bromide 40 mol %) thus obtained was defined as emulsion 1B1.

Then, by following the same procedure as above while changing the ratio of sodium chloride and potassium bromide contained in the aqueous alkali halide solutions, a silver chlorobromide emulsion containing cubic silver halide grains having a mean grain size of 0.78 μm and the variation coefficient of the grain size distribution of 6% and containing 2 mol % silver bromide was prepared and defined as emulsion 1B2. In this case, however, the amounts of the sulfur sensitizing agent and the gold sensitizing agent were controlled such that the chemical sensitization became optimum.

Then, by following the same procedure as the case of preparing the emulsion 1B1 while changing the temperature at the formation of the silver halide grains, a silver halide emulsion containing silver halide grains having a mean grain size of 0.41 μm and the variation coefficient of the grain size distribution of 8% was prepared and then by sensitizing the emulsion by changing the spectral sensitizing dyes B to spectral sensitizing dyes G (shown below), an emulsion 1G1 was obtained.

Furthermore, by following the same procedure as the case of preparing the emulsion 1B2 while changing the temperature at the formation of the silver halide grains, a silver halide emulsion containing silver halide grains having a mean grain size of 0.40 μm and the variation coefficient of the grain size distribution of 7% was prepared and by sensitizing the emulsion by changing the spectral sensitizing dyes B to the spectral sensitizing dyes G, an emulsion 1G2 was obtained.

Then, by following the same procedure as the case of preparing the emulsion 1B1 while changing the temperature at the formation of the silver halide grains, a silver halide emulsion containing silver halide grains having a mean grain size of 0.51 μm and the variation cefficient of the grain size distribution of 8% was prepared and by sensitizing the emulsion by changing the spectral sensitizing dyes B to spectral sensitizing dye R-1 (shown below) and by adding a following compound S to the emulsion, an emulsion $1R_1$ was obtained.

Furthermore, by following the same procedure as the case of preparing the emulsion 1B2 while changing the temperature at the formation of silver halide grains, a silver halide emulsion containing silver halide grains havng a mean grain size of 0.52 μm and the variation coefficient of the grain size distribution of 7% was prepared and by sensitizing the emulsion while changing the spectral sensitizing dye B to the spectral sensitizing dye R -1 and by adding the compound S to the emulsion, an emulsion $1R_2$ was obtained.

Also, by following the same procedure as the case of preparing the emulsion $1R_1$ while changing the spectral sensitizing dye R-1 to each of the spectral sensitizing dyes A-1, G-3, and G-4 illustrated above (the addition amount thereof was the equimolar amount to the amount of the dye R-1), emulsions $1R_{11}$, $1R_{12}$, and $1R_{13}$ were obtained.

Similarly, by following the same procedure as the case of preparing the emulsion $1R_2$ while changing the spectral sensitizing dye R-1 to each of the spectral sensitizing dyes A-1, G-3, and G-4 (the addition amount thereof was the equimolar amount to the amount of the dye R-1), emulsions $1R_{21}$, $1R_{22}$, and $1R_{23}$ were obtained.

In the prepration of these silver halide emulsions, the amounts of potassium hexachloroiridate(IV) and potassium hexacyanoferrate(II) added at the formation of the silver halide grains were changed in inverse proportion to the grain volume of each silver halide grains.

Also, in the case of preparing each silver halide emulsion, the amounts of the sulfur sensitizer and the gold sensitizer were controlled such that the chemical sensitization becamn optimum.

The spectral sensitizing dyes, the compound S and the addition amounts thereof are shown below.

Sensitizing Dye B

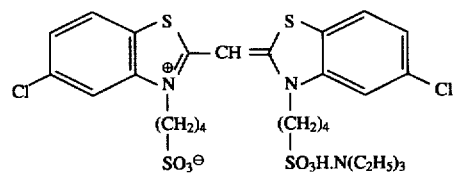

amount $2 \times 10^{-4}$ mol/mol-Ag and,

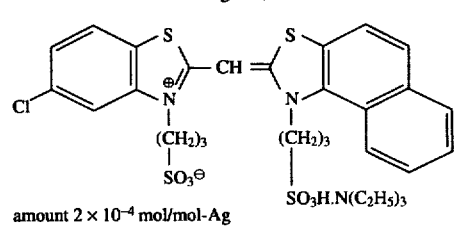

amount $2 \times 10^{-4}$ mol/mol-Ag

Sensitizing Dye G

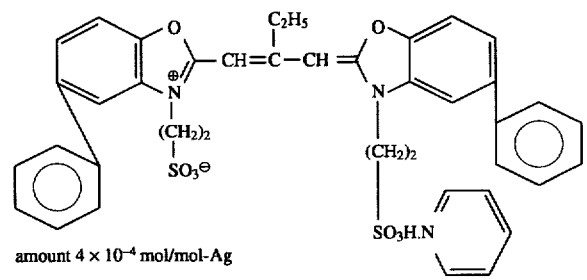

amount $4 \times 10^{-4}$ mol/mol-Ag

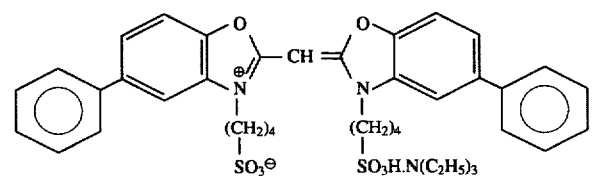

amount $8 \times 10^{-4}$ mol/mol-Ag

Sensitizing Dye R-1

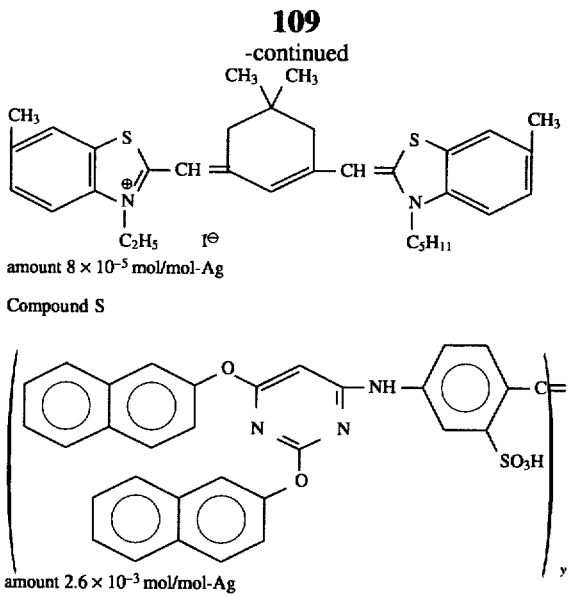

amount $8 \times 10^{-5}$ mol/mol-Ag

Compound S amount $2.6 \times 10^{-3}$ mol/mol-Ag

Multilayer color photographic papers were prepared by the following methods using these silver halide emulsions.

The support was the polyethylene-both suface laminated paper support prepared by the method shown in Example 1 of JP-A-3-156439 and contained 13% by weight titanium dioxide in the polyethylene layer of the side on which the silver halide emulsion layers were formed.

After applying a corona discharging treatment onto the surface of the paper support, a gelatin underlayer containing sodium dodecylbenzenesulfonate was formed thereon and further the photographic constituting layers shown below were coated thereon to provide multilayer color photographic papers, sample (101) to sample (108). The coating liquid for each layer was prepared by the following manner.

Preparation of Coating Liquid for Layer 1:

In a mixed solvent of 25 g of a solvent (Solv -1), 25 g of a solvent (Solv-2), and 180 ml of ethyl acetate were dissolved 153.0 g of a yellow coupler (Ex-Y), 150 g of a color image stabilizer (Cpd-1), 7.5 g of a color image stabilizer (Cpd-2), and 16.0 g of a color image stabilizer (Cpd-3), and the solution thus obtained was dispersed by emulsification in 1,000 g of an aqueous 10% gelatin solution containing 60 ml of an aqueous solution of 10% sodium dodecylbenzenesulfonate and 10 g of citric acid to provide an emulsified dispersion A.

Then, each silver chlorobromide emulsion prepared as described above was mixed with the emulsified dipsersion A to provide the coating liquid for layer 1 having the composition shown below.

The coating liquids for layer 2 to layer 7 were also prepared by the methods similar to the foregoing method for preparing the coating liquid for layer 1.

As a gelatin hardening agent for each layer, 1-oxy-3,5-dichloro-s-triazine sodium salt was used.

Also, to each of the blue-sensitive emulsion layer, the green-sensitive emulsion layer, and the red-sensitive emulsion layer was added 1-(5-methylureidophenyl)-5-mercaptotetrazole in an amount of $6 \times 10^{-5}$ mol, $7.8 \times 10^{-4}$ mol. and $2.2 \times 10^{-4}$ mol, respectively, per mol of the silver halide.

Also, to the blue-sensitive emulsion layer and the green-sensitive emulsion layer was added 4-hydroxy-6-methyl-1,3,3a,7-tetraazindene in an amount of $1 \times 10^{-4}$ mol and $2 \times 10^{-4}$ mol, respectively, per mol of the silver halide.

Furthermore, for the irradiation prevention, the following dyes (the amount shown in the parentheses showed the coated amount) were added to each silver halide emulsion layer.

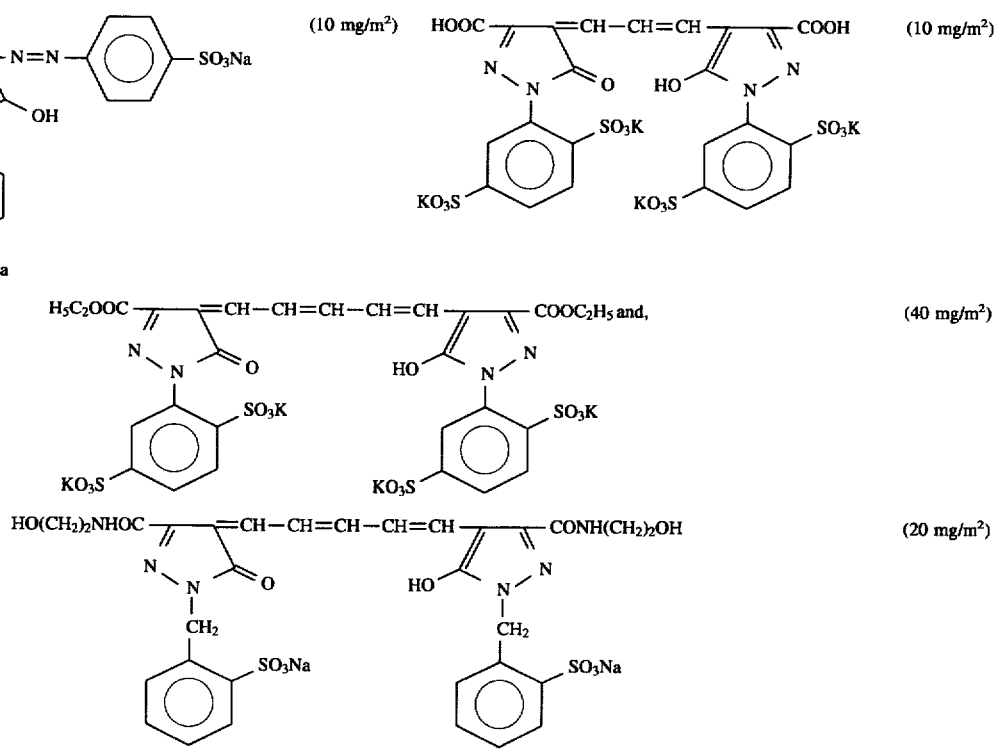

(Layer Construction)

The composition of each layer was shown below. The numeral was the coated amount (g/m²), wherein for the silver halide emulsion, the numeral was the coated amount converted to silver.

Support

Polyethylene laminated paper

[Polyethylene at the side of layer 1 continued a white pigment (TiO₂) and a bluish dye (ultramarine blue)].

| Layer 1 (Blue-Sensitive Emulsion Layer) | |
| --- | --- |
| Silver Chlorobromide Emulsion described above | 0.27 |
| Gelatin | 1.36 |
| Yellow Coupler (ExY) | 0.79 |
| Color Image Stabilizer (Cpd - 1) | 0.08 |
| Color Image Stabilizer (Cpd - 2) | 0.04 |
| Color Image Stabilizer (Cpd - 3) | 0.08 |
| Solvent (Solv - 1) | 0.13 |
| Solvent (Solv - 2) | 0.13 |
| Layer 2 (Color Mixing Preventing Layer) | |
| Gelatin | 1.00 |
| Color Mixing Preventing Agent (Cpd - 4) | 0.06 |
| Solvent (Solv - 2) | 0.25 |
| Solvent (Solv - 3) | 0.25 |
| Solvent (Solv - 7) | 0.03 |
| Layer 3 (Green-Sensitive Emulsion layer) | |
| Silver Chlorobromide Emulsion described above | 0.13 |
| Gelatin | 1.45 |
| Magenta Coupler (EXM) | 0.16 |
| Color Image Stabilizer (Cpd - 2) | 0.03 |
| Color Image Stabilizer (Cpd - 5) | 0.15 |
| Color Image Stabilizer (Cpd - 6) | 0.01 |
| Color Image Stabilizer (Cpd - 7) | 0.01 |
| Color Image Stabilizer (Cpd - 8) | 0.08 |
| Solvent (Solv - 3) | 0.50 |
| Solvent (Solv - 4) | 0.15 |
| Solvent (Solv - 5) | 0.15 |
| Layer 4 (Color Mixing Preventing Layer) | |
| Gelatin | 0.70 |
| Color Mixing Preventing Agent (Cpd - 4) | 0.04 |
| Solvent (Solv - 2) | 0.18 |
| Solvent (Solv - 3) | 0.18 |
| Solvent (Solv - 7) | 0.02 |
| Layer 5 (Red Sensitive Emulsion Layer) | |
| Silver Chlorobromide Emulsion described above | 0.20 |
| Gelatin | 0.85 |
| Cyan Coupler (ExC) | 0.33 |
| Ultraviolet Absorber (UV - 2) | 0.18 |
| Color Image Stabilizer (Cpd - 1) | 0.33 |
| Color Image Stabilizer (Cpd - 6) | 0.01 |
| Color Image Stabilizer (Cpd - 8) | 0.01 |
| Color Image Stabilizer (Cpd - 9) | 0.01 |
| Color Image Stabilizer (Cpd - 10) | 0.01 |
| Color Image Stabilizer (Cpd - 11) | 0.01 |
| Solvent (Solv - 1) | 0.01 |
| Solvent (Solv - 6) | 0.22 |
| Layer 6 (Ultraviolet Absorption Layer) | |
| Gelatin | 0.55 |
| Ultraviolet Absorber (UV - 1) | 0.38 |
| Color Image Stabilizer (Cpd - 5) | 0.02 |
| Color Image Stabilizer (Cpd - 12) | 0.15 |
| Layer 7 (Protective Layer) | |
| Gelatin | 1.13 |
| Acryl-Modified Copolymer of Polyvinyl Alcohol (Modified degree 17%) | 0.05 |
| Liquid Paraffin | 0.02 |
| Surface Active Agent (Cpd - 13) | 0.01 |

The compounds used for preparing the color photographic papers are shown below.

(ExY) Yellow Coupler
1:1 mixture (mol ratio) of

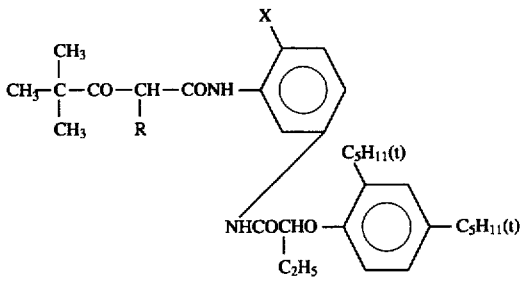

R = 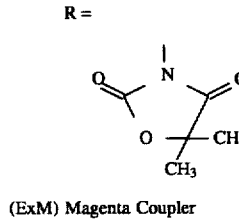 X = Cl and,

R = X = OCH₃

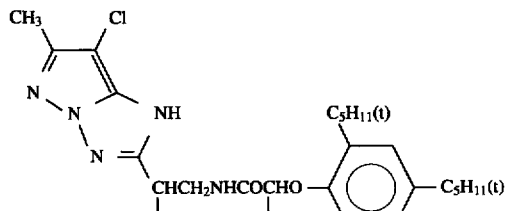

(ExM) Magenta Coupler

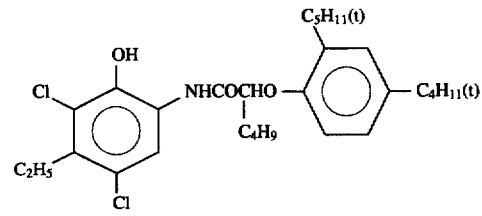

(ExC) Cyan Coupler
3:7 Mixture (mol ratio) of

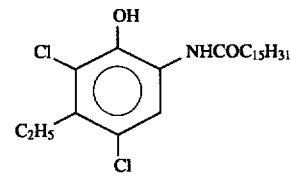

and,

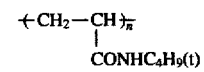

(Cpd-1) Color Image Stabilizer $+CH_2-CH\}_n$
|
CONHC₄H₉(t)

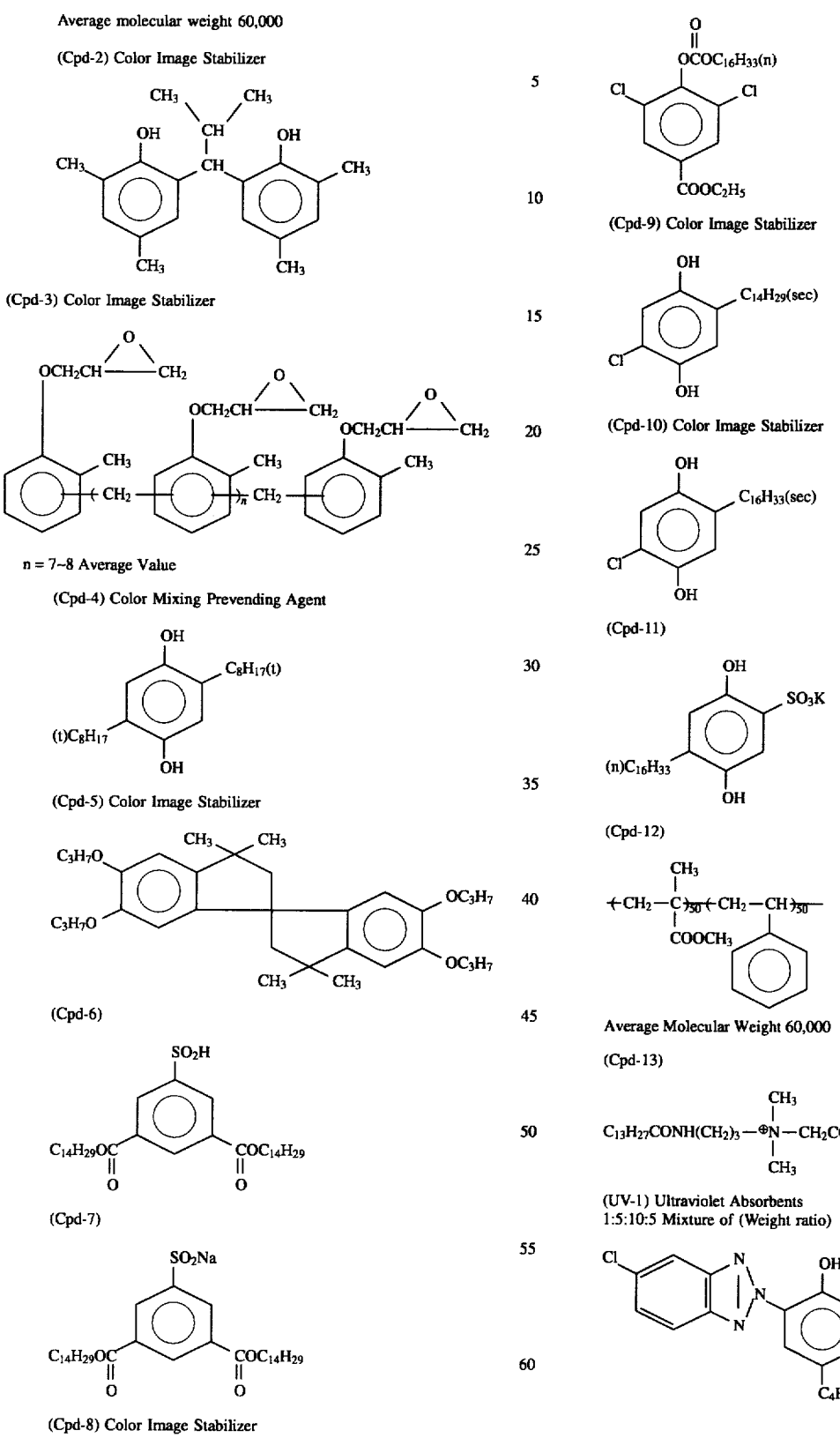

115
-continued

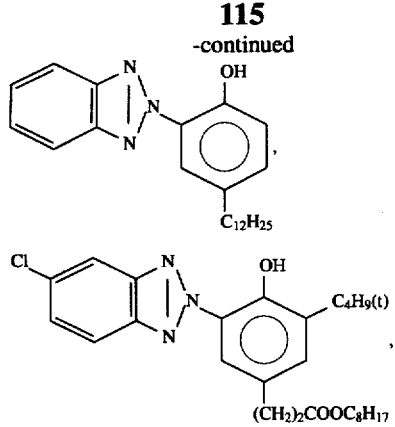

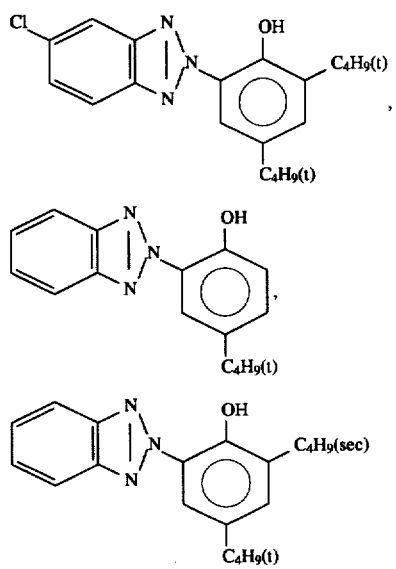

(UV-2) Ultraviolet Absorbents
1:2:2 Mixture of (Weight ratio)

Solvent (Solv-1)

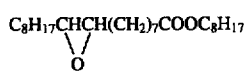

Solvent (Solv-2)

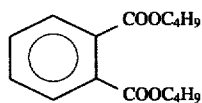

Solvent (Solv-3)

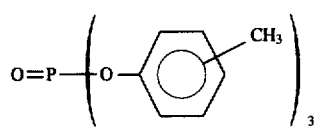

116
-continued

Solvent (Solv-4)

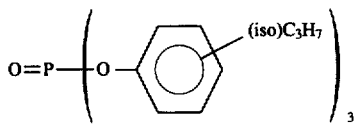

Solvent (Solv-5)

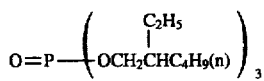

Solvent (Solv-6)

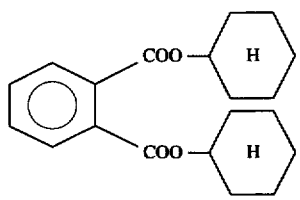

Solvent (Solv-7)

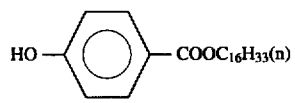

In this case, for the purpose of determining the performance stability at the production of the color photographic papers, 2 kinds of samples, i.e., a sample obtained by coating the coating liquids after keeping 20 minutes at 40° C. since the preparation of the coating liquids and a sample obtained by coating the coating liquids after keeping 8 hours at 40° C. were prepared per each color photographic paper.

Also, for the purpose of preventing the trouble caused by the putrefaction, etc., occurred at the continuous production of the color photographic paper, the same test was carried out using the light-sensitive materials [Sample (109) to Sample (116)] prepared by adding Compound A-37 to each silver halide emulsion layer such that the total amount thereof became 50 mg/m². Furthermore, the same test was carried out using the light-sensitive materials [Sample (117) to Sample (124)] prepared by changing the foregoing antiseptic to Compound A-38 (addition amount 50 mg/m²).

The total content of calcium contained in the photographic constituting layers of these samples was 16 mg for each sample. By replacing gelatin used for each emulsion layer of Samples (101) to (124) with gelatin wherein the content of clacium was reduced with ion exchange, Samples (101a) to (124a) each having the calcium content of 8 mg and Samples (10lb) to (124b) each having the calcium content of 2 mg were prepared.

The silver halide emulsions, the spectral sensitizing dyes, the antiseptics, and the calcium contents used for the color photographic papers prepared are summarized in following Table 2.

TABLE 2

| Sample No. | Blue-Sensitive Emulsion | Spectral Sensitizing Dye | Green-Sensitive Emulsion | Spectral Sensitizing Dye | Red-Sensitive Emulsion | Spectral Sensitizing Dye | Halogen Composition | Antiseptic | Calcium Content | Note |
|---|---|---|---|---|---|---|---|---|---|---|
| 101 | 1B1 | B | 1G1 | G | 1R1 | R-1 | $AgBr_{40}Cl_{60}$ | — | 16 mg/m$^2$ | Comp. |
| 102 | 1B1 | B | 1G1 | G | 1R11 | A-1 | $AgBr_{40}Cl_{60}$ | — | 16 mg/m$^2$ | Inv. |
| 103 | 1B1 | B | 1G1 | G | 1R12 | G-3 | $AgBr_{40}Cl_{60}$ | — | 16 mg/m$^2$ | Inv. |
| 104 | 1B1 | B | 1G1 | G | 1R13 | G-4 | $AgBr_{40}Cl_{60}$ | — | 16 mg/m$^2$ | Inv. |
| 105 | 1B2 | B | 1G2 | G | 1R2 | R-1 | $AgBr_2Cl_{98}$ | — | 16 mg/m$^2$ | Comp. |
| 106 | 1B2 | B | 1G2 | G | 1R21 | A-1 | $AgBr_2Cl_{98}$ | — | 16 mg/m$^2$ | Inv. |
| 107 | 1B2 | B | 1G2 | G | 1R22 | G-3 | $AgBr_2Cl_{98}$ | — | 16 mg/m$^2$ | Inv. |
| 108 | 1B2 | B | 1G2 | G | 1R23 | G-4 | $AgBr_2Cl_{98}$ | — | 16 mg/m$^2$ | Inv. |
| 109 | 1B1 | B | 1G1 | G | 1R1 | R-1 | $AgBr_{40}Cl_{60}$ | A-37 | 16 mg/m$^2$ | Comp. |
| 110 | 1B1 | B | 1G1 | G | 1R11 | A-1 | $AgBr_{40}Cl_{60}$ | A-37 | 16 mg/m$^2$ | Inv. |
| 111 | 1B1 | B | 1G1 | G | 1R12 | G-3 | $AgBr_{40}Cl_{60}$ | A-37 | 16 mg/m$^2$ | Inv. |
| 112 | 1B1 | B | 1G1 | G | 1R13 | G-4 | $AgBr_{40}Cl_{60}$ | A-37 | 16 mg/m$^2$ | Inv. |
| 113 | 1B2 | B | 1G2 | G | 1R2 | R-1 | $AgBr_2Cl_{98}$ | A-37 | 16 mg/m$^2$ | Comp. |
| 114 | 1B2 | B | 1G2 | G | 1R21 | A-1 | $AgBr_2Cl_{98}$ | A-37 | 16 mg/m$^2$ | Inv. |
| 115 | 1B2 | B | 1G2 | G | 1R22 | G-3 | $AgBr_2Cl_{98}$ | A-37 | 16 mg/m$^2$ | Inv. |
| 116 | 1B2 | B | 1G2 | G | 1R23 | G-4 | $AgBr_2Cl_{98}$ | A-37 | 16 mg/m$^2$ | Inv. |
| 117 | 1B1 | B | 1G1 | G | 1R1 | R-1 | $AgBr_{40}Cl_{60}$ | A-38 | 16 mg/m$^2$ | Comp. |
| 118 | 1B1 | B | 1G1 | G | 1R11 | A-1 | $AgBr_{40}Cl_{60}$ | A-38 | 16 mg/m$^2$ | Inv. |
| 119 | 1B1 | B | 1G1 | G | 1R12 | G-3 | $AgBr_{40}Cl_{60}$ | A-38 | 16 mg/m$^2$ | Inv. |
| 120 | 1B1 | B | 1G1 | G | 1R13 | G-4 | $AgBr_{40}Cl_{60}$ | A-38 | 16 mg/m$^2$ | Inv. |
| 121 | 1B2 | B | 1G2 | G | 1R2 | R-1 | $AgBr_2Cl_{98}$ | A-38 | 16 mg/m$^2$ | Comp. |
| 122 | 1B2 | B | 1G2 | G | 1R21 | A-1 | $AgBr_2Cl_{98}$ | A-38 | 16 mg/m$^2$ | Inv. |
| 123 | 1B2 | B | 1G2 | G | 1R22 | G-3 | $AgBr_2Cl_{98}$ | A-38 | 16 mg/m$^2$ | Inv. |
| 124 | 1B2 | B | 1G2 | G | 1R23 | G-4 | $AgBr_2Cl_{98}$ | A-38 | 16 mg/m$^2$ | Inv. |
| 101a | 1B1 | B | 1G1 | G | 1R1 | R-1 | $AgBr_{40}Cl_{60}$ | — | 8 mg/m$^2$ | Comp. |
| 102a | 1B1 | B | 1G1 | G | 1R11 | A-1 | $AgBr_{40}Cl_{60}$ | — | 8 mg/m$^2$ | Inv. |
| 103a | 1B1 | B | 1G1 | G | 1R12 | G-3 | $AgBr_{40}Cl_{60}$ | — | 8 mg/m$^2$ | Inv. |
| 104a | 1B1 | B | 1G1 | G | 1R13 | G-4 | $AgBr_{40}Cl_{60}$ | — | 8 mg/m$^2$ | Inv. |
| 105a | 1B2 | B | 1G2 | G | 1R2 | R-1 | $AgBr_2Cl_{98}$ | — | 8 mg/m$^2$ | Comp. |
| 106a | 1B2 | B | 1G2 | G | 1R21 | A-1 | $AgBr_2Cl_{98}$ | — | 8 mg/m$^2$ | Inv. |
| 107a | 1B2 | B | 1G2 | G | 1R22 | G-3 | $AgBr_2Cl_{98}$ | — | 8 mg/m$^2$ | Inv. |
| 108a | 1B2 | B | 1G2 | G | 1R23 | G-4 | $AgBr_2Cl_{98}$ | — | 8 mg/m$^2$ | Inv. |
| 109a | 1B1 | B | 1G1 | G | 1R1 | R-1 | $AgBr_{40}Cl_{60}$ | A-37 | 8 mg/m$^2$ | Comp. |
| 110a | 1B1 | B | 1G1 | G | 1R11 | A-1 | $AgBr_{40}Cl_{60}$ | A-37 | 8 mg/m$^2$ | Inv. |
| 111a | 1B1 | B | 1G1 | G | 1R12 | G-3 | $AgBr_{40}Cl_{60}$ | A-37 | 8 mg/m$^2$ | Inv. |
| 112a | 1B1 | B | 1G1 | G | 1R13 | G-4 | $AgBr_{40}Cl_{60}$ | A-37 | 8 mg/m$^2$ | Inv. |
| 113a | 1B2 | B | 1G2 | G | 1R2 | R-1 | $AgBr_2Cl_{98}$ | A-37 | 8 mg/m$^2$ | Comp. |
| 114a | 1B2 | B | 1G2 | G | 1R21 | A-1 | $AgBr_2Cl_{98}$ | A-37 | 8 mg/m$^2$ | Inv. |
| 115a | 1B2 | B | 1G2 | G | 1R22 | G-3 | $AgBr_2Cl_{98}$ | A-37 | 8 mg/m$^2$ | Inv. |
| 116a | 1B2 | B | 1G2 | G | 1R23 | G-4 | $AgBr_2Cl_{98}$ | A-37 | 8 mg/m$^2$ | Inv. |
| 117a | 1B1 | B | 1G1 | G | 1R1 | R-1 | $AgBr_{40}Cl_{60}$ | A-38 | 8 mg/m$^2$ | Comp. |
| 118a | 1B1 | B | 1G1 | G | 1R11 | A-1 | $AgBr_{40}Cl_{60}$ | A-38 | 8 mg/m$^2$ | Inv. |
| 119a | 1B1 | B | 1G1 | G | 1R12 | G-3 | $AgBr_{40}Cl_{60}$ | A-38 | 8 mg/m$^2$ | Inv. |
| 120a | 1B1 | B | 1G1 | G | 1R13 | G-4 | $AgBr_{40}Cl_{60}$ | A-38 | 8 mg/m$^2$ | Inv. |
| 121a | 1B2 | B | 1G2 | G | 1R2 | R-1 | $AgBr_2Cl_{98}$ | A-38 | 8 mg/m$^2$ | Comp. |
| 122a | 1B2 | B | 1G2 | G | 1R21 | A-1 | $AgBr_2Cl_{98}$ | A-38 | 8 mg/m$^2$ | Inv. |
| 123a | 1B2 | B | 1G2 | G | 1R22 | G-3 | $AgBr_2Cl_{98}$ | A-38 | 8 mg/m$^2$ | Inv. |
| 124a | 1B2 | B | 1G2 | G | 1R23 | G-4 | $AgBr_2Cl_{98}$ | A-38 | 8 mg/m$^2$ | Inv. |
| 101b | 1B1 | B | 1G1 | G | 1R1 | R-1 | $AgBr_{40}Cl_{60}$ | — | 2 mg/m$^2$ | Comp. |
| 102b | 1B1 | B | 1G1 | G | 1R11 | A-1 | $AgBr_{40}Cl_{60}$ | — | 2 mg/m$^2$ | Inv. |
| 103b | 1B1 | B | 1G1 | G | 1R12 | G-3 | $AgBr_{40}Cl_{60}$ | — | 2 mg/m$^2$ | Inv. |
| 104b | 1B1 | B | 1G1 | G | 1R13 | G-4 | $AgBr_{40}Cl_{60}$ | — | 2 mg/m$^2$ | Inv. |
| 105b | 1B2 | B | 1G2 | G | 1R2 | R-1 | $AgBr_2Cl_{98}$ | — | 2 mg/m$^2$ | Comp. |
| 106b | 1B2 | B | 1G2 | G | 1R21 | A-1 | $AgBr_2Cl_{98}$ | — | 2 mg/m$^2$ | Inv. |
| 107b | 1B2 | B | 1G2 | G | 1R22 | G-3 | $AgBr_2Cl_{98}$ | — | 2 mg/m$^2$ | Inv. |
| 108b | 1B2 | B | 1G2 | G | 1R23 | G-4 | $AgBr_2Cl_{98}$ | — | 2 mg/m$^2$ | Inv. |
| 109b | 1B1 | B | 1G1 | G | 1R1 | R-1 | $AgBr_{40}Cl_{60}$ | A-37 | 2 mg/m$^2$ | Comp. |
| 110b | 1B1 | B | 1G1 | G | 1R11 | A-1 | $AgBr_{40}Cl_{60}$ | A-37 | 2 mg/m$^2$ | Inv. |
| 111b | 1B1 | B | 1G1 | G | 1R12 | G-3 | $AgBr_{40}Cl_{60}$ | A-37 | 2 mg/m$^2$ | Inv. |
| 112b | 1B1 | B | 1G1 | G | 1R13 | G-4 | $AgBr_{40}Cl_{60}$ | A-37 | 2 mg/m$^2$ | Inv. |
| 113b | 1B2 | B | 1G2 | G | 1R2 | R-1 | $AgBr_2Cl_{98}$ | A-37 | 2 mg/m$^2$ | Comp. |
| 114b | 1B2 | B | 1G2 | G | 1R21 | A-1 | $AgBr_2Cl_{98}$ | A-37 | 2 mg/m$^2$ | Inv. |
| 115b | 1B2 | B | 1G2 | G | 1R22 | G-3 | $AgBr_2Cl_{98}$ | A-37 | 2 mg/m$^2$ | Inv. |
| 116b | 1B2 | B | 1G2 | G | 1R23 | G-4 | $AgBr_2Cl_{98}$ | A-37 | 2 mg/m$^2$ | Inv. |
| 117b | 1B1 | B | 1G1 | G | 1R1 | R-1 | $AgBr_{40}Cl_{60}$ | A-38 | 2 mg/m$^2$ | Comp. |
| 118b | 1B1 | B | 1G1 | G | 1R11 | A-1 | $AgBr_{40}Cl_{60}$ | A-38 | 2 mg/m$^2$ | Inv. |
| 119b | 1B1 | B | 1G1 | G | 1R12 | G-3 | $AgBr_{40}Cl_{60}$ | A-38 | 2 mg/m$^2$ | Inv. |
| 120b | 1B1 | B | 1G1 | G | 1R13 | G-4 | $AgBr_{40}Cl_{60}$ | A-38 | 2 mg/m$^2$ | Inv. |
| 121b | 1B2 | B | 1G2 | G | 1R2 | R-1 | $AgBr_2Cl_{98}$ | A-38 | 2 mg/m$^2$ | Comp. |
| 122b | 1B2 | B | 1G2 | G | 1R21 | A-1 | $AgBr_2Cl_{98}$ | A-38 | 2 mg/m$^2$ | Inv. |
| 123b | 1B2 | B | 1G2 | G | 1R22 | G-3 | $AgBr_2Cl_{98}$ | A-38 | 2 mg/m$^2$ | Inv. |
| 124b | 1B2 | B | 1G2 | G | 1R23 | G-4 | $AgBr_2Cl_{98}$ | A-38 | 2 mg/m$^2$ | Inv. |

The stability of the photographic performance of each color photographic paper prepared was evaluated as follows.

Since the performace deviation of the coating liquids with the passage of time at the production of the light-sensitive material is largest in the red-sensitive emulsion layer, after subjecting each sample to a sensitometric exposure of 250 CMS and 1 second using an actinometer (Type FWH, manufactured by Fuji Photo Film Co., Ltd., color temperature of the light source was 3,200K) through an optical wedge and a red filter, each sample was subjected to color photographic processing using the following processing steps and processing liquids and the cyan colored density was measured, whereby the characteristic curve corresponding to each of the red-sensitive emulsion layers was obtained.

| Processing Steps | Temperature | Processing Time (sec.) | Replenishing Amount* | Tank Volume (l) |
|---|---|---|---|---|
| Color Development | 38° C. | 20, 45 | 90 ml | 1 |
| Blix | 30 to 36° C. | 45 | 161 ml | 2 |
| Rinse 1 | 30 to 35° C. | 30 | — | 2 |
| Rinse 2 | 30 to 35° C. | 30 | — | 2 |
| Rinse 3 | 30 to 35° C. | 30 | 200 ml | 2 |
| Drying | 70 to 80° C. | 60 | | |

(*): Replishing amount per 1 m² of the light-sensitive material.

| Color Developer | Tank Liquid | Replenisher |
|---|---|---|
| Water | 800 ml | 800 ml |
| Ethylenediamine-N,N,N,N-tetramethylenephosphonic Acid | 3.0 g | 6.0 g |
| Potassium Bromide | 0.015 g | — |
| Triethanolamine | 10.0 g | 10.0 g |
| Sodium Chloride | 4.2 g | — |
| Potassium Carbonate | 25 g | 25 g |
| N-Ethyl-N-(A-methanesufonamidoethyl)-3-methyl-4-aminoaniline Sulfate | 5.0 g | 11.0 g |
| N,N-Bis(carboxymethyl)hydrazine | 4.4 g | 10.4 g |
| N,N-Di(sulfoethyl)hydroxylamine-1 Na | 4.0 g | 8.0 g |
| Fluorescent Brightening Agent (WHITEX 4B, made by Sumitomo Chemical Company, Limited) | 2.0 g | 4.0 g |
| Water to make | 1,000 ml | 1,000 ml |
| pH | 10.20 | 10.85 |

| Blix Liquid (tank liquid = replenisher) | |
|---|---|
| Water | 400 ml |
| Ammonium Thiosulfate (700 g/liter) | 100 ml |
| Sodium Sulfite | 17 g |
| Ethylenediaminetetraacetic Acid Iron (III) Ammonium | 55 g |
| Ethylenediaminetetraacetic Acid Di-Sodium | 5 g |
| Ammonium Bromide | 40 g |
| Glacial Acetic Acid | 9 g |
| Water to make | 1,000 ml |
| pH | 5.40 |

Rinse Liquid (tank liquid = replenisher)
Ion-exchanged water (calcium and magnesium each <3 ppm)

From the characteristic curve thus obtained, the exposure amount giving the density of 0.5 higher than the fog density was read and the resiprocal thereof was defined as the sensitivity. About Samples 101 to 124, the sensitivity was shown by the relative value with the sensitivity of Sample 101 developed for 45 seconds being defined as 100. About Samples 101a to 124a, the sensitivity was shown by the relative value with the sensitivity of Sample 101a developed for 45 seconds being defined as 100. About Samples 101b to 124b, the sensitivity was shown by the relative value with the sensitivity of Sample 101b developed for 45 seconds being defined as 100.

Also, the difference between the colored density corresponding to the exposure amount for obtaining the sensitivity and the colored density corresponding to the exposure amount of 0.5 logE larger than the foregoing exposure amount was determined and defined as a contrast.

Furthermore, the difference between the sensitivity of the sample obtained by coating after 20 minutes since the preparation of the coating liquids and the sensitivity of the sample obtained by coating after storing 8 hours at 40° C. since the preparation of the coating liquids was determined and used as the indicator for the production stability.

The results obtained are shown in Table 3 below.

TABLE 3

| Sample No. | Performance of Coated Sample* | | | | Difference of Sensitivity** (Lowering of sensitivity) | Remarks |
|---|---|---|---|---|---|---|
| | 20 sec. Development | | 45 sec. Development | | | |
| | Sensitivity | Contrast | Sensitivity | Contrast | | |
| 101 | 51 | 0.82 | 100 | 1.44 | −17 | Comp. |
| 102 | 50 | 0.83 | 98 | 1.46 | −4 | Inv. |
| 103 | 52 | 0.81 | 102 | 1.43 | −4 | Inv. |
| 104 | 52 | 0.84 | 102 | 1.47 | −2 | Inv. |
| 105 | 82 | 1.39 | 98 | 1.56 | −26 | Comp. |
| 106 | 80 | 1.42 | 96 | 1.57 | −4 | Inv. |
| 107 | 84 | 1.41 | 100 | 1.54 | −4 | Inv. |
| 108 | 85 | 1.42 | 100 | 1.58 | −4 | Inv. |
| 109 | 46 | 0.81 | 94 | 1.43 | −19 | Comp. |
| 110 | 45 | 0.79 | 93 | 1.44 | −4 | Inv. |
| 111 | 47 | 0.80 | 96 | 1.42 | −4 | Inv. |
| 112 | 47 | 0.78 | 96 | 1.45 | −2 | Inv. |
| 113 | 78 | 1.40 | 92 | 1.55 | −29 | Comp. |
| 114 | 76 | 1.37 | 89 | 1.56 | −7 | Inv. |
| 115 | 79 | 1.38 | 92 | 1.53 | −7 | Inv. |
| 116 | 80 | 1.39 | 93 | 1.56 | −4 | Inv. |
| 117 | 45 | 0.77 | 92 | 1.42 | −19 | Comp. |
| 118 | 43 | 0.79 | 91 | 1.45 | −4 | Inv. |
| 119 | 46 | 0.77 | 94 | 1.43 | −4 | Inv. |
| 120 | 46 | 0.76 | 94 | 1.44 | −4 | Inv. |

TABLE 3-continued

| Sample No. | Performance of Coated Sample* | | | | Difference of Sensitivity** (Lowering of sensitivity) | Remarks |
|---|---|---|---|---|---|---|
| | 20 sec. Development | | 45 sec. Development | | | |
| | Sensitivity | Contrast | Sensitivity | Contrast | | |
| 121 | 77 | 1.39 | 89 | 1.56 | −31 | Comp. |
| 122 | 78 | 1.37 | 90 | 1.55 | −7 | Inv. |
| 123 | 80 | 1.38 | 92 | 1.54 | −7 | Inv. |
| 124 | 79 | 1.36 | 92 | 1.57 | −7 | Inv. |
| 101a | 52 | 0.81 | 100 | 1.43 | −23 | Comp. |
| 102a | 51 | 0.82 | 99 | 1.45 | −6 | Inv. |
| 103a | 51 | 0.82 | 103 | 1.44 | −5 | Inv. |
| 104a | 53 | 0.83 | 102 | 1.46 | −4 | Inv. |
| 105a | 83 | 1.37 | 99 | 1.57 | −31 | Comp. |
| 106a | 79 | 1.41 | 97 | 1.56 | −5 | Inv. |
| 107a | 83 | 1.42 | 100 | 1.55 | −6 | Inv. |
| 108a | 86 | 1.41 | 101 | 1.57 | −5 | Inv. |
| 109a | 45 | 0.80 | 93 | 1.42 | −25 | Comp. |
| 110a | 46 | 0.78 | 94 | 1.43 | −5 | Inv. |
| 111a | 48 | 0.81 | 97 | 1.43 | −6 | Inv. |
| 112a | 46 | 0.77 | 96 | 1.44 | −4 | Inv. |
| 113a | 77 | 1.41 | 93 | 1.56 | −35 | Comp. |
| 114a | 75 | 1.38 | 90 | 1.55 | −8 | Inv. |
| 115a | 80 | 1.37 | 91 | 1.52 | −8 | Inv. |
| 116a | 81 | 1.38 | 92 | 1.57 | −5 | Inv. |
| 117a | 46 | 0.76 | 93 | 1.43 | −26 | Comp. |
| 118a | 44 | 0.78 | 92 | 1.44 | −6 | Inv. |
| 119a | 45 | 0.78 | 95 | 1.43 | −6 | Inv. |
| 120a | 45 | 0.77 | 93 | 1.43 | −5 | Inv. |
| 121a | 78 | 1.38 | 88 | 1.57 | −37 | Comp. |
| 122a | 77 | 1.38 | 91 | 1.56 | −8 | Inv. |
| 123a | 81 | 1.39 | 93 | 1.55 | −9 | Inv. |
| 124a | 78 | 1.37 | 91 | 1.57 | −8 | Inv. |
| 101b | 52 | 0.83 | 100 | 1.45 | −24 | Comp. |
| 102b | 51 | 0.83 | 99 | 1.45 | −7 | Inv. |
| 103b | 51 | 0.82 | 101 | 1.42 | −6 | Inv. |
| 104b | 51 | 0.83 | 101 | 1.46 | −5 | Inv. |
| 105b | 83 | 1.38 | 99 | 1.55 | −36 | Comp. |
| 106b | 81 | 1.41 | 97 | 1.58 | −6 | Inv. |
| 107b | 83 | 1.40 | 102 | 1.55 | −7 | Inv. |
| 108b | 84 | 1.41 | 101 | 1.59 | −6 | Inv. |
| 109b | 47 | 0.80 | 93 | 1.42 | −28 | Comp. |
| 110b | 46 | 0.78 | 94 | 1.43 | −8 | Inv. |
| 111b | 46 | 0.81 | 95 | 1.43 | −8 | Inv. |
| 112b | 48 | 0.79 | 95 | 1.44 | −5 | Inv. |
| 113b | 79 | 1.41 | 93 | 1.55 | −39 | Comp. |
| 114b | 77 | 1.37 | 88 | 1.57 | −8 | Inv. |
| 115b | 80 | 1.37 | 93 | 1.54 | −8 | Inv. |
| 116b | 81 | 1.38 | 94 | 1.55 | −7 | Inv. |
| 117b | 44 | 0.78 | 93 | 1.43 | −29 | Comp. |
| 118b | 44 | 0.79 | 92 | 1.44 | −7 | Inv. |
| 119b | 45 | 0.78 | 95 | 1.44 | −7 | Inv. |
| 120b | 47 | 0.75 | 94 | 1.42 | −5 | Inv. |
| 121b | 78 | 1.38 | 88 | 1.54 | −39 | Comp. |
| 122b | 79 | 1.38 | 91 | 1.57 | −9 | Inv. |
| 123b | 81 | 1.39 | 93 | 1.56 | −8 | Inv. |
| 124b | 78 | 1.37 | 91 | 1.54 | −8 | Inv. |

*Performance of Sample coated after 20 minutes since the preparation of the coating liquid.
**Lowering of sensitivity is obtained by the difference between the sensitivity of Sample coated 20 minutes after the preparation of coating liquid and the sensitivity of Sample coated at 40° C. 8 hours after the preparation of coating liquid.

Also, for the purpose of determining the occurrence of streaks at continous processing, each of Samples 105, 106, 113, 114, 105a, 106a, 113a, 114a, 105b, 106b, 113b, and 114b was subjected to running processing until the replenished amount became twice the amount of the tank liquid.

As the results thereof, about Samples 105, 106, 113, and 114 wherein the calcium content was over 10 mg/m$^2$, the formation of stripe-like scratches were observed from about that the replenished amount with processing reached 1.5 times the amount of the tank liquid. On the other hand, about the Samples 105a, 106a, 113a, 114a, 105b, 106b, 113b, and 114b wherein the calcium content was lower than 10 mg/m$^2$, the formation of streaks was not observed. Thus, from the results obtained, the following matters are seen. By using the spectral sensitizing dyes A-1, G-3, and G-4 being used in the present invention, lowering of the sensitivity in the case of using coating liquids stored for a long time is remarkably improved as compared with the case of using the comparison spectral sensitizing dye R-1 but when the calcium content in the light-sensitive material is over 10 mg/m$^2$, streaks occur at continuous processing, which is a problem. On the other hand, in the samples wherein the calcium content in the light-sensitive material is reduced and the spectral sensitizing dyes A-1, G-3, and G-4 being used in the present invention are used, the production stability can be remarkably increased and further the formation of streaks occurring at continuous processing can be markedly restrained.

Also, When the antiseptic A-37 or A-38 is used for preventing the putrefaction occurring at the steps of producing the photographic light-sensitive materials, lowering of the sensitivity of coating liquids with the passage of time is increased in the system of using the comparison spectral sensitizing dye but by using the spectral sensitizing dye being used in the present invention, the deterioration of the sensitivity can be restrained.

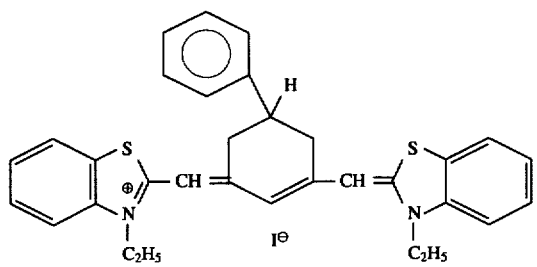

The results obtained are shown in Table 4.

TABLE 4

| Sample No. | Performance of Coated Sample* | | | | Difference of Sensitivity** | |
|---|---|---|---|---|---|---|
| | 20 sec. Development | | 45 sec. Development | | | |
| | Sensitivity | Contrast | Sensitivity | Contrast | (Lowering of sensitivity) | Remarks |
| 113 | 78 | 1.40 | 92 | 1.55 | −29 | Comp. |
| 114 | 76 | 1.37 | 93 | 1.56 | −7 | Inv. |
| 115 | 79 | 1.38 | 92 | 1.53 | −7 | Inv. |
| 116 | 80 | 1.39 | 91 | 1.56 | −4 | Inv. |
| 125 | 53 | 1.31 | 63 | 1.48 | −12 | Comp. |
| 113a | 77 | 1.41 | 93 | 1.56 | −35 | Comp. |
| 114a | 75 | 1.38 | 90 | 1.55 | −8 | Inv. |
| 115a | 80 | 1.37 | 91 | 1.52 | −8 | Inv. |
| 116a | 81 | 1.38 | 92 | 1.57 | −5 | Inv. |
| 117a | 51 | 1.30 | 60 | 1.47 | −15 | Comp. |
| 113b | 79 | 1.41 | 93 | 1.55 | −39 | Comp. |
| 114b | 77 | 1.37 | 88 | 1.57 | −8 | Inv. |
| 115b | 80 | 1.37 | 93 | 1.54 | −8 | Inv. |
| 116b | 81 | 1.38 | 94 | 1.55 | −7 | Inv. |
| 117b | 51 | 1.29 | 58 | 1.45 | −18 | Comp. |

*Performance of Sample coated after 20 minutes since the preparation of the coating liquid.
**Lowering of sensitivity is obtained by the difference between the sensitivity of Sample coated 20 minutes after the preparation of coating liquid and the sensitivity of Sample coated at 40° C. 8 hours after the preparation of coating liquid.

As to the halogen composition of the silver halide emulsions being used, by comparing the samples 101 to 104, 109 to 112, 117 to 120, 101a to 104a, 109a to 112a, 117a to 120a, 101b to 104b, 109b to 112b, and 117b to 120b prepared using the silver halide emulsion having a silver chloride content of 60 mol % with the samples 105 to 108, 113 to 116, 121 to 124, 105a to 108a, 113a to 116a, 121a to 124a, 105b to 108b, 113b to 116b, and 112b to 124b prepared using the silver halide emulsion having a silver chloride content of 98 mol %, it is clear that quick processing becomes possible by using a high-silver chloride emulsion.

EXAMPLE 2

By following the same procedure as the case of preparing the samples 113, 113a, and 113b prepared in Example 1 while replacing the sensitizing dye for the red-sensitizing layer of the present invention with the comparison sensitizing dye shown below (the addition amount per mol of silver halide was same as the amount of the dye R-1), comparison samples 125, 125a, and 125b, respectively, were prepared. On these samples and on the samples 114, 114a, 114b, 115, 115a, 115b, 116, 116a, and 116b in Example 1, the same test as in Example 1 was carried out.

As is clear from the results shown in Table 4, it can be seen that in the Samples 125, 125a, and 125b using the comparison sensitizing dye described above, the sensitivity and the contrast are low and further lowering of the sensitivity by the passage of time of the coating liquids used is large as compared with the samples using the spectal sensitizing dyes being used in the present invention.

As described above in detail, a silver halide photographic material having the excellent stability at the production thereof and causing less streaks at continuous processing is obtained in the present invention.

While the invention has been described in detail and with reference to specific embodiments thereof, it will be apparent to one skilled in the art that various changes and modifications can be made therein without departing from the spirits and scope thereof.

What is claimed is:

1. A silver halide photographic material comprising a support having thereon a photographic constituting layer containing at least one light-sensitive silver halide emulsion layer, wherein the silver halide emulsion layer contains a silver halide emulsion sensitized by a methine dye represented by following formula (I) and wherein a total content of calcium contained in the photographic constituting layer is not more than 10 mg/m$^2$;

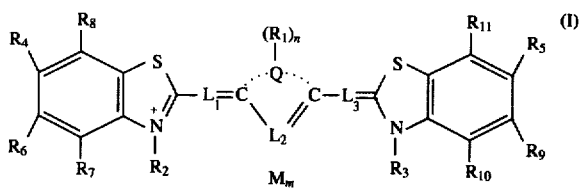

wherein Q represents a non-metallic atomic group necessary for forming a 5-membered to 6-membered ring; $R_1$, $R_2$, $R_3$, $R_4$, $R_5$, $R_6$, $R_7$, $R_8$, $R_9$, $R_{10}$ and $R_{11}$ each independently represents a hydrogen atom or a substituent, provided that $R_1$ represents a group containing an aromatic carbon ring and $R_2$ and $R_3$ represents a hydrogen atom or a substituent, or $R_1$ and $R_3$ (or $R_2$) each represents a hydrogen atom or a substituent and $R_2$ (or $R_3$) represents a group selected from the group consisting of phenoxyethyl, 1-naphthoxyethyl, 2-naphthoxyethyl and 4-phenylphenoxyethyl, and $R_4$ and $R_5$ each does not represent a hydrogen atom; $L_1$, $L_2$ and $L_3$ each represents a methine group; n represents an integer of from 0 to 6; M represents a counter ion for neutralizing an electrostatic charge; and m represents 0 or 1;

wherein said silver halide emulsion contains silver chloride grains or silver chlorobromide grains having at least 90 mol % silver chloride.

2. A silver halide photographic material of claim 1, wherein $R_1$ represents a hydrogen atom, an alkyl group having not more than 18 carbon atoms, an aryl group having not more than 18 carbon atoms, a heterocyclic group having not more than 18 carbon atoms, an alkenyl group having not more than 10 carbon atoms, or an alkynyl group having not more than 6 carbon atoms; $R_2$ and $R_3$ each represents an alkyl group having not more than 18 carbon atoms; $R_4$ and $R_5$ each represents a hydroxy group, a cyano group, a halogen atom, a sulfonic acid group, a carboxy group, a nitro group, an alkyl group, an alkenyl group, an acyl group, an acyloxy group, an alkoxycarbonyl group, a carbamoyl group, a sulfamoyl group, an acylamino group, an alkoxy group, an aryloxy group, an alkylthio group, an arylthio group, an alkylsulfonamido group, an arylsulfonamido group, a ureido group, an alkylsulfonyl group, an arylsulfonyl group, an aryl group, or a heterocyclic group $R_6$, $R_7$, $R_8$, $R_9$, $R_{10}$ and $R_{11}$ each represents a hydrogen atom in addition to the foregoing groups shown by $R_4$ and $R_5$; and said $R_4$ and $R_6$ or $R_8$, or said $R_5$ and $R_9$ or $R_{11}$ may combine with each other to form a cyclohexane ring, an aromatic ring or a heterocyclic ring.

3. A silver halide photographic material of claim 1, wherein $R_1$ represents an unsubstituted alkyl group having not more than 18 carbon atoms, or an unsubstituted aryl group having not more than 18 carbon atoms; $R_2$ and $R_3$ each represents methyl group, ethyl group, phenoxyethyl group, 1-naphthoxyethyl, 2-naphthoxyethyl, 4-phenylphenoxyethyl group or methoxyethyl group; $R_4$ and $R_5$ each represents hydroxy group, a cyano group, a halogen atom, a sulfonic acid group, a carboxy group, a nitro group, an alkyl group having not more than 18 carbon atoms, an alkenyl group having not more than 18 carbon atoms, an acyl group having not more than 8 carbon atoms, an acyloxy group having not more than 8 carbon atoms, an alkoxycarbonyl group having not more than 8 carbon atoms, a carbamoyl group having not more than 8 carbon atoms, a sulfamoyl group having not more than 8 carbon atoms, an alkylsulfonamido group having not more than 8 carbon atoms, an acylamino group having not more than 8 carbon atoms, an alkoxy group having not more than 15 carbon atoms, an aryloxy group having not more than 15 carbon atoms, an alkylthio group having not more than 8 carbon atoms, an arylthio group having not more than 15 carbon atoms, an arylsulfonamido group having not more than 12 carbon atoms, a ureido group, an alkylsulfonyl group having not more than 8 carbon atoms, an arylsulfonyl group having not more than 15 carbon atoms, an aryl group having not more than 15 carbon atoms, or a heterocyclic group having not more than 15 carbon atoms, the groups represented by $R_4$ and $R_5$ being substituted or unsubstituted; $R_6$, $R_7$, $R_8$, $R_9$, $R_{10}$ and $R_{11}$ each represents a hydrogen atom, methyl, ethyl, methoxy or ethoxy groups; and said $R_4$ and $R_6$ or $R_8$, or said $R_5$ and $R_9$ or $R_{11}$ may combine with each other to form a cyclohexane ring, an aromatic ring or a heterocyclic ring.

4. A silver halide photographic material of claim 2, wherein $R_4$ and $R_5$ each represents a methyl group, an ethyl group, a methoxy group or an ethoxy group.

5. A silver halide photographic material of claim 2, wherein $R_1$ represents said alkyl group having not more than 18 carbon atoms and which is substituted by a substituent selected from the group consisting of a carboxy group, a sulfonic acid group, a cyano group, a nitro group, a halogen atom, a hydroxy group, an alkoxy group having not more than 8 carbon atoms, an aryloxy group having not more than 15 carbon atoms, an acyloxy group having not more than 8 carbon atoms, a sulfamoyl group, a carbamoyl group, and an aryl group having not more than 15 carbon atoms.

6. A silver halide photographic material of claim 1, wherein the calcium content is not more than 8 mg/m$^2$.

7. A silver halide photographic material of claim 1, wherein the silver halide emulsion contains substantially no silver iodide.

8. A silver halide photographic material of claim 1, wherein the silver chlorobromide grains containing at least 90 mol % silver chloride have a silver bromide rich phase on the surface of the grains or at the inside thereof.

9. A silver halide photographic material of claim 1, wherein the silver chlorobromide grains containing at least 90 mol % silver chloride have a silver bromide rich phase on the surface of the grains.

10. A silver halide photographic material of claim 1, wherein $R_2$ or $R_3$ represents phenoxyethyl, 1-naphthoxyethyl, 2-naphthoxyethyl, and 4-phenylphenoxyethyl.

11. A silver halide photographic material comprising a support having thereon a photographic constituting layer containing at least one light-sensitive silver halide emulsion layer and optionally at least one light-insensitive layer, wherein the silver halide emulsion layer contains a silver halide emulsion sensitized by a methine dye represented by following formula (I) and at least one layer on said support contains at least one compound represented by one of following formulae (II) to (X);

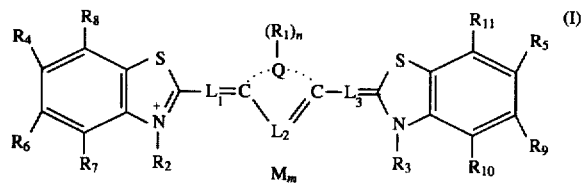

wherein Q represents a non-metallic atomic group necessary for forming a 5-membered or 6-membered ring; $R_1$, $R_2$, $R_3$, $R_4$, $R_5$, $R_6$, $R_7$, $R_8$, $R_9$, $R_{10}$ and $R_{11}$ each independently represents a hydrogen atom or a substituent, provided that $R_1$ represents a group containing an aromatic carbon ring and $R_2$ and $R_3$ represents a hydrogen atom or a substituent, or $R_1$ and $R_3$ (or $R_2$) each represents a hydrogen atom or a substituent and $R_2$ (or $R_3$) represents a group selected from the group consisting of phenoxyethyl, 1-naphthoxyethyl, 2-naphthoxyethyl and 4-phenylphenoxyethyl, and $R_4$ and $R_5$ each does not represent a hydrogen atom; $L_1$, $L_2$ and $L_3$ each represents a methine group; n represents an integer of from 0 to 6; M represents a counter ion for neutralizing an electrostatic charge; and m represents 0 or 1;

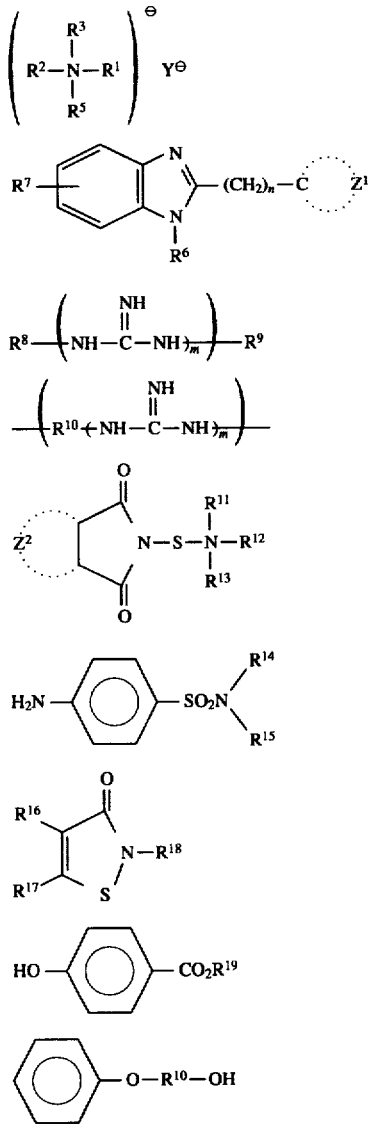

wherein $R^2$, $R^3$, $R^4$, $R^5$, $R^6$, $R^8$, and $R^9$ each represents a hydrogen atom, an alkyl group, or an aryl group; $R^7$ represents a hydrogen atom, an alkyl group, an aryl group, a nitro group, a carboxy group, a sulfo group, a sulfamoyl group, a hydroxy group, a halogen atom, an alkoxy group, or a thiazolyl group; $R^{10}$ represents an alkylene group or an arylene group; $R^{11}$, $R^{12}$, and $R^{13}$ each represents a halogen atom or an alkyl group; $R^{14}$ and $R^{15}$ each represents a hydrogen atom, an alkyl group, an aryl group, or a nitrogen-containing heterocyclic residue; $R^{16}$ and $R^{17}$ each represents a hydrogen atom, a halogen atom, an alkyl group, an aryl group, or an aralkyl group; said $R^{16}$ and $R^{17}$ may combine with each other to form a benzene ring; $R^{18}$ represents a hydrogen atom or an alkyl group; $R^{19}$ represents an alkyl group or an aryl group; Y represents a halogen atom; $Z^1$ represents a non-metallic atomic group necessary for forming a thiazolyl ring; $Z^2$ represents a non-metallic atomic group necessary for forming a 6-membered ring; n represents 0 or 1; and m represents 1 or 2;

wherein said silver halide emulsion contains silver chloride grains or silver chlorobromide grains having at least 90 mol % silver chloride, and a total content of calcium contained in said photographic constituting layer is not more than 10 mg/m².

12. A silver halide photographic material of claim 11, wherein at least one of the compounds represented by the formulae (III), (VIII), (IX) and (X) is incorporated into one of the layers of the photographic material.

13. A silver halide photographic material of claim 11, wherein at least one of the compounds represented by the formulae (VIII), (IX) and (X) is incorporated into one of the layers of the photographic material.

14. A silver halide photographic material of claim 11, wherein the compound of the formula (II) to (X) is incorporated in an amount $5 \times 10^{-7}$ to $2 \times 10^{-3}$ mol/m².

15. A silver halide photographic material of claim 11, wherein $R^2$ or $R^3$ represents phenoxyethyl, 1-naphthoxyethyl, 2-naphthoxyethyl, and 4-phenylphenoxyethyl.

16. A silver halide photographic material comprising a support having thereon a photographic constituting layer containing at least one light-sensitive silver halide emulsion layer, wherein the silver halide emulsion layer contains a silver halide emulsion sensitized by a methine dye represented by following formula (I) and wherein a total content of calcium contained in the photographic constituting layer is not more than 10 mg/m²;

wherein Q represents a non-metallic atomic group necessary for forming a 5-membered or 6-membered ring; $R_1$, $R_2$, $R_3$, $R_4$, $R_5$, $R_6$, $R_7$, $R_8$, $R_9$, $R_{10}$ and $R_{11}$ each independently represents a hydrogen atom or a substituent, provided that $R_1$ represents a group containing an aromatic carbon ring or $R_2$ represents a group selected from the group consisting of phenoxyethyl, 1-naphthoxyethyl, 2-naphthoxyethyl, 4-phenylphenoxyethyl, and methoxyethyl, or $R_3$ represents a group selected from the group consisting of phenoxyethyl, 1-naphthoxyethyl, 2-naphthoxyethyl, 4-phenylphenoxyethyl, and methoxyethyl, and $R_4$ and $R_5$ each does not represent a hydrogen atom; $L_1$, $L_2$ and $L_3$ each represents a methine group; n represents an integer of from 0 to 6; M represents a counter ion for neutralizing an electrostatic charge; and m represents 0 or 1;

wherein said silver halide emulsion contains silver chloride grains or silver chlorobromide grains having at least 90 mol % silver chloride.

* * * * *